US012175713B2

(12) United States Patent
Wu et al.

(10) Patent No.: US 12,175,713 B2
(45) Date of Patent: Dec. 24, 2024

(54) IMAGE ENCODING/DECODING METHOD AND APPARATUS BASED ON WAVELET TRANSFORM

(71) Applicants: Huawei Technologies Co., Ltd., Shenzhen (CN); University of Science and Technology of China, Hefei (CN)

(72) Inventors: Feng Wu, Hefei (CN); Haichuan Ma, Hefei (CN); Dong Liu, Hefei (CN); Haitao Yang, Shenzhen (CN)

(73) Assignees: Huawei Technologies Co., Ltd., Shenzhen (CN); University of Science and Technology of China, Hefei (CN)

( * ) Notice: Subject to any disclaimer, the term of this patent is extended or adjusted under 35 U.S.C. 154(b) by 436 days.

(21) Appl. No.: 17/576,575

(22) Filed: Jan. 14, 2022

(65) Prior Publication Data

US 2022/0138992 A1 May 5, 2022

Related U.S. Application Data

(63) Continuation of application No. PCT/CN2020/095228, filed on Jun. 9, 2020.

(30) Foreign Application Priority Data

Jul. 15, 2019 (CN) ......................... 201910639304.5

(51) Int. Cl.
*G06T 9/00* (2006.01)
*G06T 3/40* (2006.01)

(52) U.S. Cl.
CPC ................ *G06T 9/002* (2013.01); *G06T 3/40* (2013.01)

(58) Field of Classification Search
CPC ... G06T 9/002; G06T 3/40; G06T 2201/0051; G06T 2201/0052; G06T 2201/0061;
(Continued)

(56) References Cited

U.S. PATENT DOCUMENTS 5,825,936 A 10/1998 Clarke et al.
6,560,369 B1 * 5/2003 Sato ....................... H04N 19/40
375/E7.198

(Continued)

FOREIGN PATENT DOCUMENTS

CN 101754021 A 6/2010
CN 105611303 A 5/2016

(Continued)

OTHER PUBLICATIONS

Zhou et al, "Image Compression Algorithm Based on Improved Wavelet Neural Network," Journal of Xi'an University (Natural Science Edition), vol. 19, No. 2, total 5 pages (Mar. 2016). With an English Abstract.

(Continued)

*Primary Examiner* — Jose L Couso

(74) *Attorney, Agent, or Firm* — Leydig, Voit & Mayer, Ltd.

(57) ABSTRACT

The present disclosure provides an image decoding method based on a wavelet transform. The method includes: performing entropy decoding on the compressed bitstream to obtain a reconstructed wavelet coefficient; dequantizing the reconstructed wavelet coefficient to obtain a dequantized wavelet coefficient; and performing N inverse wavelet transforms on the dequantized wavelet coefficient based on the wavelet transform model to obtain a reconstructed image, where the wavelet transform model is implemented based on a convolutional neural network (CNN).

15 Claims, 20 Drawing Sheets

(58) Field of Classification Search

CPC ........... G06T 2201/0065; G06T 1/0028; G06T 1/005; G06T 1/0057; G06T 2201/0083; G06T 11/006; G06T 11/008; G06T 2221/441; G06T 3/4046; G06T 5/60; G06T 2207/20076; G06T 2207/20081; G06T 2207/20084; G06N 3/045; G06N 3/044; G06N 3/047; G06N 3/048; G06N 3/063; G06N 3/02; G06N 3/08–088; G06N 3/0445; G06N 3/0454; G06N 3/4046; G06N 7/00; G06N 7/01; G06N 20/00; H04N 19/63; H04N 19/91; H04N 19/124; H04N 19/132; H04N 19/64; H04N 19/13; H04N 19/146; H04N 19/18; H04N 19/186; H04N 19/60; H04N 19/61; H04N 19/12; H04N 19/1883; H04N 19/94; H04N 19/115; H04N 19/40; H04N 19/645; G06K 7/1482; G06V 10/454; G06V 10/54; G06V 10/774; G06V 10/82; G06V 30/18057; G06V 10/50; G06F 18/214; G06F 18/22; G06F 18/241; G06F 18/2415; G06F 17/147; Y10S 128/925

See application file for complete search history.

(56) References Cited

U.S. PATENT DOCUMENTS

| | | | | |
|---|---|---|---|---|
| 6,990,246 | B1 * | 1/2006 | Ferguson | H04N 19/129 375/E7.064 |
| 7,590,298 | B2 * | 9/2009 | Fan | H04N 19/63 382/233 |
| 11,166,022 | B2 * | 11/2021 | Alakuijala | H04N 19/124 |
| 2002/0184272 | A1 * | 12/2002 | Burges | H04N 19/61 341/200 |
| 2006/0251330 | A1 * | 11/2006 | Toth | G06N 3/084 375/E7.113 |
| 2008/0193031 | A1 * | 8/2008 | Shi | G06T 1/0028 382/250 |
| 2009/0024547 | A1 | 1/2009 | Lu et al. | |
| 2018/0242017 | A1 * | 8/2018 | Van Leuven | H04N 19/40 |
| 2018/0288420 | A1 * | 10/2018 | Yu | H04N 19/172 |
| 2019/0014320 | A1 * | 1/2019 | Navarrete Michelini | H04N 19/124 |
| 2019/0066346 | A1 * | 2/2019 | Ye | G06T 11/006 |
| 2019/0141353 | A1 * | 5/2019 | Michelini | H04N 19/126 |
| 2020/0236349 | A1 * | 7/2020 | Zhai | H04N 19/61 |
| 2020/0349411 | A1 * | 11/2020 | Luo | G06N 3/04 |
| 2021/0074036 | A1 * | 3/2021 | Fuchs | G06T 11/006 |
| 2021/0120247 | A1 * | 4/2021 | Galpin | G06N 3/02 |
| 2021/0168223 | A1 * | 6/2021 | Sarikaya | H04L 69/04 |

FOREIGN PATENT DOCUMENTS

| | | | |
|---|---|---|---|
| CN | 106991648 | A | 7/2017 |
| CN | 107123114 | A | 9/2017 |
| CN | 108765320 | A | 11/2018 |
| CN | 109996071 | A | 7/2019 |
| JP | 2001309898 | A | 11/2001 |
| JP | 2006074733 | A | 3/2006 |
| JP | 2007503784 | A | 2/2007 |
| KR | 101246115 | B1 | 3/2013 |
| WO | 2014051712 | A1 | 4/2014 |

OTHER PUBLICATIONS

Zheng Yi, "Adaptive Lifting Scheme via BP Neural Networks," Master's Dissertation of Chengdu University of Technology, total 49 pages (May 2010). With an English Abstract.

Jianguo et al., "The Research on Application of Wavelet Network in Image Coding" total 74 pages (Mar. 2007). With an English Abstract.

Zhang et al., "An Image Compression Method Based on Wavelet Transform and Neural Network," TELKOMNIKA, vol. 13, No. 2, pp. 587-596 (Jun. 2015).

Yang et al., "Deep Image Compression in the Wavelet Transform Domain Based on High Frequency Sub-Band Prediction," IEEE Access, vol. 7, pp. 52484-52497, Institute of Electrical and Electronics Engineers, New York, New York (Apr. 16, 2019).

Yin et al., "CE10-1.7: Adaptive convolutional neural network loop filter," Joint Video Experts Team (JVET) of ITU-T SG 16 WP 3 and ISO/IEC JTC 1/SC 29/WG 11 15th Meeting: Gothenburg, Document: JVET-O0063, Total 6 pages, Geneva, Switzerland (Jul. 2019).

Ma et al., "iWave: CNN-Based Wavelet-Like Transform for Image Compression," IEEE Transactions on Multimedia, vol. 22, No. 7, pp. 1667-1679, XP011797120, Institute of Electrical and Electronics Engineers, New York, New York (Jul. 2020).

Claypoole et al., "Nonlinear Wavelet Transforms for Image Coding via Lifting," IEEE Transactions on Image Processing, vol. 12, No. 12, pp. 1449-1459, XP011105312, Institute of Electrical and Electronics Engineers, New York, New York (Dec. 2003).

GAETANO IMPOCO, "JPEG2000—A Short Tutorial," pp. 1-16, XP055940385 (Apr. 1, 2004).

V. Mohan et al., "Compression of Iris images Using DTCNN based Wavelet Decomposition and Directional Filter Bank Analysis," total 5 pages, Institute of Electrical and Electronics Engineers, New York, New York (Feb. 2011).

Ahanonu et al., "Lossless Image Compression Using Reversible Integer Wavelet Transforms and Convolutional Neural Networks," 2018 Data Compression Conference, p. 395, XP033376077, Institute of Electrical and Electronics Engineers, New York, New York (Mar. 2018).

Liu et al., "Multi-level Wavelet-CNN for Image Restoration," 2018 IEEE/CVF Conference on Computer Vision and Pattern Recognition Workshops, pp. 886-895, XP033475414, Institute of Electrical and Electronics Engineers, New York, New York (Jun. 2018).

Toderici et al., "Full Resolution Image Compression with Recurrent Neural Networks," 2017 IEEE Conference on Computer Vision and Pattern Recognition, pp. 5435-5443, XP033249903, Institute of Electrical and Electronics Engineers, New York, New York (Jul. 2017).

Cui et al., "Decoder Side Color Image Quality Enhancement using a Wavelet Transform based 3-stage Convolutional Neural Network," Proceedings of the IEEE/CVF Conference on Computer Vision and Pattern Recognition (CVPR) Workshops, Total 6 pages, XP055819561 (Jun. 2019).

* cited by examiner

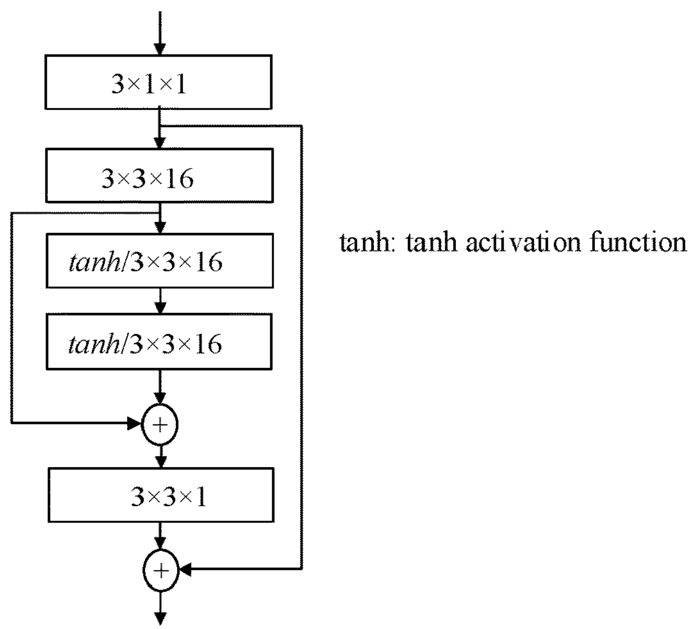
FIG. 14
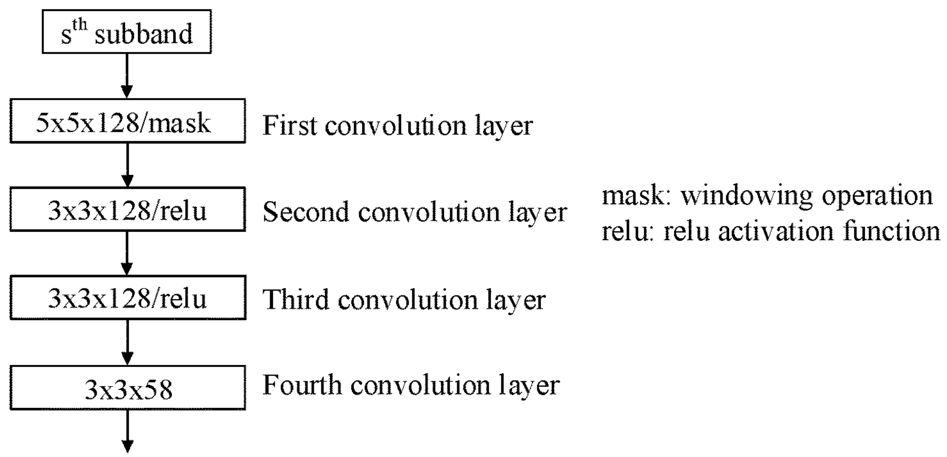
FIG. 15
| | | | | |
|---|---|---|---|---|
| 1 | 1 | 1 | 1 | 1 |
| 1 | 1 | 1 | 1 | 1 |
| 1 | 1 | 0 | 0 | 0 |
| 0 | 0 | 0 | 0 | 0 |
| 0 | 0 | 0 | 0 | 0 |
FIG. 16A
| | | |
|---|---|---|
| 1 | 1 | 1 |
| 1 | 1 | 0 |
| 0 | 0 | 0 |
FIG. 16B

| | | | | |
|---|---|---|---|---|
| 1 | 1 | 1 | 1 | 1 |
| 1 | 1 | 1 | 1 | 1 |
| 1 | 1 | 0 | 0 | 0 |
| 0 | 0 | 0 | 0 | 0 |
| 0 | 0 | 0 | 0 | 0 |

First window function

| | | | | |
|---|---|---|---|---|
| 0 | 0 | 0 | 0 | 0 |
| 0 | 0 | 0 | 0 | 0 |
| 0 | 0 | 1 | 1 | 1 |
| 1 | 1 | 1 | 1 | 1 |
| 1 | 1 | 1 | 1 | 1 |

Second window function

IMAGE ENCODING/DECODING METHOD AND APPARATUS BASED ON WAVELET TRANSFORM

CROSS-REFERENCE TO RELATED APPLICATIONS

This application is a continuation of International Patent Application No. PCT/CN2020/095228, filed on Jun. 9, 2020, which claims priority to Chinese Patent Application No. 201910639304.5, filed on Jul. 15, 2019. The disclosures of the aforementioned applications are hereby incorporated by reference in their entireties.

TECHNICAL FIELD

The present disclosure relates to the image encoding/decoding field, and in particular, to an image encoding/decoding method and apparatus based on a wavelet transform.

BACKGROUND

A digital image is image information recorded in a form of a digital signal. The digital image (hereinafter referred to as the image) may be considered as a two-dimensional array of M rows and N columns, including M×N samples, where a position of each sample is referred to as a sample position, and a value of each sample is referred to as a sample value.

In applications such as image storage and transmission, an image encoding operation usually needs to be performed to reduce a storage capacity and a transmission bandwidth. Atypical image encoding process generally includes three steps: transform, quantization, and entropy encoding. For a to-be-encoded image, the first step is to decorrelate the to-be-encoded image by performing a transform, to obtain a transform coefficient with a more concentrated energy distribution. The second step is to quantize the transform coefficient to obtain a quantized coefficient. The third step is to perform entropy encoding on the quantized coefficient to obtain a compressed bitstream.

Common transform modes used in image encoding are: discrete cosine transform, wavelet transform, and the like. The wavelet transform is a local transform method that is capable of performing localization and multi-scale analysis on an image and focusing on details of signal changes, and is very suitable for an image encoding task.

Different wavelet transforms refer to different filter coefficients. A filter coefficient for a conventional wavelet transform is generally designed from a perspective of signal processing under an ideal assumption. The wavelet transform obtained in this way cannot adapt to complexity and diversity of natural images. In addition, a two-dimensional wavelet transform includes a combination of one-dimensional wavelet transforms in row and column directions, and is suitable for processing features of row and column directions, but is less capable of processing features of other directions and non-directional features.

In view of the foregoing disadvantages, some solutions are proposed in the prior art. For example, in the signal processing field, a plurality of directional wavelets such as Curvelet, Ridgelet, Contourlet, Bandelet, and Shearlet are proposed and designed. During encoding, a wavelet transform is first performed on an image by using a directional wavelet, to obtain a wavelet coefficient; and then quantization and entropy encoding are performed on the wavelet coefficient to obtain a compressed bitstream. During image decoding, entropy decoding and dequantization are first performed on the compressed bitstream to obtain a reconstructed wavelet coefficient; and then an inverse directional wavelet transform is performed to obtain a reconstructed image. A basic idea of the directional wavelet is to design a group of finite directional basis functions. However, spatial correlation in arbitrary directions cannot be compactly expressed in essence. Moreover, the directional wavelet generally generates a quantity of redundant coefficients, and applying the directional wavelet to image encoding is not conducive to improving a compression ratio. Finally, the directional wavelet only processes different directional features in the image, and does not resolve a contradiction between diversity and complexity of natural image features and ideality and simplicity of artificially designed wavelet basis functions. Therefore, when the directional wavelet is applied to image encoding, image encoding efficiency is not high.

Another example is an image encoding method based on an adaptive directional wavelet. The method uses an idea of block partitioning in image encoding, and when encoding an image block, selects a direction parameter most suitable for the image block by trying wavelet transforms in a plurality of directions. Then a wavelet basis function is rotated to a corresponding direction to process a feature of the specific direction in the image block, a transform step is implemented to obtain a wavelet coefficient, and a compressed bitstream is obtained by encoding the wavelet coefficient by using a subband encoding method. In addition, the direction parameter is written into the compressed bitstream to support a normal decoding process. During decoding, entropy decoding and dequantization are first performed on the compressed bitstream to obtain a reconstructed wavelet coefficient, and the direction parameter is extracted from the compressed bitstream. An adaptive inverse directional wavelet transform is performed by using the reconstructed wavelet coefficient and the direction parameter, to obtain a reconstructed image. Although the adaptive directional wavelet can adaptively select a wavelet basis function in a corresponding direction based on a directional feature of the image itself, a disadvantage that the directional wavelet can use only finite basis functions is overcome. However, the direction parameter selection based on block partitioning depends on a plurality of encoding decision processes. Therefore, encoding complexity is greatly increased. In addition, the adaptive directional wavelet still does not resolve the contradiction between the diversity and complexity of natural image features and the ideality and simplicity of artificially designed wavelet basis functions.

In summary, efficiency of image encoding/decoding in the prior art is low, and the contradiction between the diversity and complexity of natural image features and the ideality and simplicity of artificially designed wavelet basis functions cannot be resolved.

SUMMARY

Embodiments of the present disclosure provide an image encoding/decoding method and apparatus based on a wavelet transform. The embodiments of the present disclosure are used to improve efficiency of image encoding/decoding, and resolve a contradiction between diversity and complexity of natural image features and ideality and simplicity of artificially designed wavelet basis functions.

According to a first aspect, an embodiment of the present disclosure provides an image encoding method based on a wavelet transform, where the method includes:

performing N wavelet transforms on a to-be-encoded image based on a wavelet transform model to obtain a wavelet coefficient, where the wavelet transform model is implemented based on a convolutional neural network (CNN), and N is an integer greater than 0; quantizing the wavelet coefficient to obtain a quantized wavelet coefficient; and performing entropy encoding on the quantized wavelet coefficient to obtain a compressed bitstream.

The wavelet transform model implemented based on the CNN is used to perform the wavelet transform on the to-be-encoded image. Because a wavelet transform model based on a deep neural network is obtained through optimization by using a large quantity of natural images by using a training method, the wavelet transform model based on the deep neural network can provide a more compact transform domain expression than a conventional wavelet transform, thereby significantly improving encoding/decoding performance.

In a feasible embodiment, the wavelet coefficient includes 3N+1 subbands, and the performing N wavelet transforms on a to-be-encoded image based on a wavelet transform model to obtain a wavelet coefficient includes:

when performing an $i^{th}$ wavelet transform, decomposing a subband X to obtain an odd sample component and an even sample component, where the odd sample component includes an odd row coefficient or an odd column coefficient in the subband X, and the even sample component includes an even row coefficient or an even column coefficient in the subband X;

performing an update operation and a prediction operation on the even sample component and the odd sample component to obtain an intermediate approximation component and an intermediate detail component;

decomposing the intermediate approximation component to obtain a first sample component and a second sample component, where the first sample component includes an odd column coefficient or an odd row coefficient of the intermediate approximation component, and the second sample component includes an even column coefficient or an even row coefficient of the intermediate approximation component;

decomposing the intermediate detail component to obtain a third sample component and a fourth sample component, where the third sample component includes an odd row coefficient or an odd column coefficient of the intermediate detail component, and the fourth sample component includes an even column coefficient or an even row coefficient of the intermediate detail component;

performing the update operation and the prediction operation on the first sample component and the second sample component to obtain an approximation subband $P_i$ and a detail subband $I_{i1}$; and performing the update operation and the prediction operation on the third sample component and the fourth sample component to obtain a detail subband $I_{i2}$ and a detail subband $I_{i3}$, where the wavelet coefficient includes the approximation subband $P_i$, the detail subband $I_{i1}$, the detail subband $I_{i2}$, and the detail subband $I_{i3}$; and when the $i^{th}$ wavelet transform is a first wavelet transform, the subband X is the to-be-encoded image; or when the $i^{th}$ wavelet transform is not a first wavelet transform, the subband X is an approximation subband $P_{i-1}$, and the approximation subband $P_{i-1}$ is an approximation subband obtained by performing an $(i-1)^{th}$ wavelet transform.

The wavelet transform model implemented based on the CNN is used to perform the wavelet transform on the to-be-encoded image. When a function of the wavelet transform model is implemented by using a GPU, the wavelet transform model has a speed equivalent to that of the conventional wavelet transform. Compared with an adaptive directional wavelet that selects an optimal direction parameter through a plurality of encoding attempts, the wavelet transform model has an advantage of low time complexity and resolves a contradiction between diversity and complexity of natural image features and ideality and simplicity of artificially designed wavelet basis functions.

In a feasible embodiment, the prediction operation is implemented based on the CNN; the update operation is implemented based on the CNN; or both the prediction operation and the update operation are implemented based on the CNN.

In a feasible embodiment, the performing entropy encoding on the quantized wavelet coefficient to obtain a compressed bitstream includes:

encoding the quantized wavelet coefficient based on an entropy encoding model to obtain the compressed bitstream, where the entropy encoding model is implemented based on a deep neural network.

In a feasible embodiment, the wavelet coefficient includes 3N+1 subbands, and the encoding the quantized wavelet coefficient based on an entropy encoding model to obtain the compressed bitstream includes:

inputting an $s^{th}$ subband into the entropy encoding model to obtain a parameter of a cumulative probability distribution function of a to-be-encoded coefficient through calculation, where the to-be-encoded coefficient is any coefficient in the $s^{th}$ subband, and the $s^{th}$ subband is any one of the 3N+1 subbands; obtaining the cumulative probability distribution function based on the parameter of the cumulative probability distribution function of the to-be-encoded coefficient; obtaining a probability distribution of the to-be-encoded coefficient based on the to-be-encoded coefficient and the cumulative probability distribution function of the to-be-encoded coefficient; and performing entropy encoding on the to-be-encoded coefficient based on the probability distribution of the to-be-encoded coefficient by using an arithmetic encoder, to obtain a bitstream corresponding to the to-be-encoded coefficient, where the compressed bitstream includes the bitstream corresponding to the to-be-encoded coefficient.

When the quantized wavelet coefficient is encoded, an entropy encoding model based on the deep neural network is used for encoding. In comparison with the prior art, compression ratio performance of the image can be improved.

In a feasible embodiment, when the $s^{th}$ subband is a first subband of the 3N+1 subbands, the entropy encoding model is implemented based on a pixel convolutional neural network (pixelCNN), the entropy encoding model includes M convolution layers, M is an integer greater than 0, and the inputting an $s^{th}$ subband into the entropy encoding model to obtain a parameter of a cumulative probability distribution function of a to-be-encoded coefficient through calculation includes:

when M is equal to 1, performing, based on a window function corresponding to a first convolution layer, a windowing operation on a convolution kernel corresponding to the first convolution layer, to obtain a first windowed convolution kernel; and performing a convolution operation on the $s^{th}$ subband based on the first windowed convolution kernel to obtain the parameter of the cumulative probability distribution function of the to-be-encoded coefficient; or when M is greater than 1, during an operation of a $j^{th}$ convolution layer, performing, based on a window function corresponding to the $j^{th}$ convolution layer, a windowing operation on a convolution kernel corresponding to the $j^{th}$ convolution layer, to obtain a second windowed convolution kernel; and performing a convolution operation on input data of the $j^{th}$ convolution layer based on the second windowed convolution kernel to obtain $j^{th}$ output data, where when j is equal to 1, the input data of the $j^{th}$ convolution layer is the first subband; when j is greater than 1 and not greater than M, the input data of the $j^{th}$ convolution layer is output data of a $(j-1)^{th}$ convolution layer; or when j is equal to M, the $j^{th}$ output data includes the parameter of the cumulative probability distribution function of the to-be-encoded coefficient.

In a feasible embodiment, when the $s^{th}$ subband is not a first subband of the 3N+1 subbands, the entropy encoding model includes a first entropy encoding model, a second entropy encoding model, and a third entropy encoding model, both the first entropy encoding model and the second entropy encoding model are implemented based on a pixel convolutional neural network, the third entropy encoding model is implemented based on a recurrent neural network (RNN), the first entropy encoding model includes T1 convolution layers, the second entropy encoding model includes T2 convolution layers, both T1 and T2 are integers greater than 0, and the inputting an $s^{th}$ subband into the entropy encoding model to obtain a parameter of a cumulative probability distribution function of a to-be-encoded coefficient through calculation includes:

inputting an $(s-1)^{th}$ subband into the third entropy encoding model for calculation, to obtain a first output result, where the first output result is input data of the second entropy encoding model, and the $s^{th}$ subband is input data of the first entropy encoding model; and when both T1 and T2 are equal to 1, performing a combination operation on the first output result and the $s^{th}$ subband based on a convolution layer C1 and a convolution layer C2 to obtain a second output result, where the second output result is the parameter of the cumulative probability distribution function of the to-be-encoded coefficient, and the convolution layer C1 and the convolution layer C2 are convolution layers in the first entropy encoding model and the second entropy encoding model respectively; or when T1 is greater than 1 and T2 is equal to 1, performing a combination operation on the first output result and the $s^{th}$ subband based on a convolution layer C1 and a convolution layer C2 to obtain a second output result, where the convolution layer C1 is a $q^{th}$ convolution layer in the first entropy encoding model, the convolution layer C2 is a convolution layer in the second entropy encoding model, and if q is equal to T1, the second output result is the parameter of the cumulative probability distribution function of the to-be-encoded coefficient, or if q is greater than 0 and less than T1, the second output result is input data of a $(q+1)^{th}$ convolution layer in the first entropy encoding model; or when both T1 and T2 are greater than 1, performing a combination operation on the first output result and the $s^{th}$ subband based on a convolution layer C1 and a convolution layer C2 to obtain a second output result, where the convolution layer C1 is a $q1^{th}$ convolution layer in the first entropy encoding model, the convolution layer C2 is a $q2^{th}$ convolution layer in the second entropy encoding model, and if q1 is equal to T1 and q2 is equal to T2, the second output result is the parameter of the cumulative probability distribution function of the to-be-encoded coefficient, or if q1 is greater than 0 and less than T1 and q2 is greater than 0 and less than T2, the second output result is input data of a $(q1+1)^{th}$ convolution layer in the first entropy encoding model, and an output result of the convolution layer C2 is input data of a $(q2+1)^{th}$ convolution layer in the second entropy encoding model.

In a feasible embodiment, when a resolution of the $(s-1)^{th}$ subband is different from a resolution of the $s^{th}$ subband, the inputting an $(s-1)^{th}$ subband into the third entropy encoding model for calculation, to obtain a first output result includes:

performing a convolution operation on the $(s-1)^{th}$ subband based on the third entropy encoding model and a state variable of the third entropy encoding model to obtain a convolution result; and performing upsampling on the convolution result to obtain the first output result, where a resolution of the first output result is the same as the resolution of the $s^{th}$ subband; and after the performing upsampling on the convolution result to obtain the first output result, the method further includes:

performing upsampling on a convolved state variable to obtain a sampled state variable, where a resolution of the sampled state variable is the same as the resolution of the $s^{th}$ subband.

In a feasible embodiment, the performing a combination operation on the first output result and the $s^{th}$ subband based on a convolution layer C1 and a convolution layer C2 includes:

performing a windowing operation on a first convolution kernel based on a first window function to obtain a windowed first convolution kernel, where the first convolution kernel is a convolution kernel corresponding to the convolution layer C1; performing a convolution operation on first input data based on the windowed first convolution kernel to obtain a first convolution result, where when the convolution layer C1 is a first convolution layer in the first entropy encoding model, the first input data is the $s^{th}$ subband, or when the convolution layer C1 is a non-first convolution layer in the first entropy encoding model, the first input data is obtained by performing a convolution operation on the $s^{th}$ subband; inputting second input data into a second sub convolution layer and performing a convolution operation to obtain a second convolution result, where when the convolution layer C2 is a first convolution layer in the second entropy encoding model, the second input data is the first output result, or when the convolution layer C2 is a non-first convolution layer in the second entropy encoding model, the second input data is obtained by performing a convolution operation on the first output result; and performing an addition or concatenation operation on the first convolution result and the second convolution result to obtain the second output result.

In a feasible embodiment, the performing a combination operation on the first output result and the $s^{th}$ subband based on a convolution layer C1 and a convolution layer C2 to obtain a second output result includes:

- performing a windowing operation on a first convolution kernel based on a first window function to obtain a windowed first convolution kernel, where the first convolution kernel is a convolution kernel corresponding to the convolution layer C1;
- performing a windowing operation on a second convolution kernel based on a second window function to obtain a windowed second convolution kernel, where the second convolution kernel is a convolution kernel corresponding to the convolution layer C2, and the first window function and the second window function are complementary to each other;

performing a convolution operation on first input data based on the windowed first convolution kernel to obtain a first convolution result, where when the convolution layer C1 is a first convolution layer in the first entropy encoding model, the first input data is the $s^{th}$ subband, or when the convolution layer C1 is a non-first convolution layer in the first entropy encoding model, the first input data is obtained by performing a convolution operation on the $s^{th}$ subband; performing a convolution operation on the second input data based on the windowed second convolution kernel to obtain a second convolution result, where when the convolution layer C2 is a first convolution layer in the second entropy encoding model, the second input data is the first output result, or when the convolution layer C2 is a non-first convolution layer in the second entropy encoding model, the second input data is obtained by performing a convolution operation on the first output result; and performing an addition or concatenation operation on the first convolution result and the second convolution result to obtain the second output result.

According to a second aspect, an embodiment of the present disclosure provides an image decoding method based on a wavelet transform, where the method includes:

performing entropy decoding on a compressed bitstream to obtain a reconstructed wavelet coefficient; dequantizing the reconstructed wavelet coefficient to obtain a dequantized wavelet coefficient; and performing N inverse wavelet transforms on the dequantized wavelet coefficient based on a wavelet transform model to obtain a reconstructed image, where the wavelet transform model is implemented based on a convolutional neural network (CNN), and N is an integer greater than 0.

In a feasible embodiment, the performing entropy decoding on a compressed bitstream to obtain a reconstructed wavelet coefficient includes:

performing entropy decoding on the compressed bitstream based on an entropy decoding model to obtain the reconstructed wavelet coefficient, where the entropy decoding model is implemented based on a deep neural network.

In a feasible embodiment, the compressed bitstream includes bitstreams of 3N+1 subbands, the reconstructed wavelet coefficient includes 3N+1 reconstructed subbands, and the performing entropy decoding on the compressed bitstream based on an entropy decoding model to obtain the reconstructed wavelet coefficient includes:

inputting a reconstructed subband corresponding to an $s^{th}$ subband into the entropy decoding model to obtain a parameter of a cumulative probability distribution function of a to-be-decoded coefficient through calculation, where a bitstream of the to-be-decoded coefficient is a part of a bitstream of the $s^{th}$ subband, and the reconstructed subband corresponding to the $s^{th}$ subband is any one of the 3N+1 reconstructed subbands; obtaining the cumulative probability distribution function of the to-be-decoded coefficient based on the parameter of the cumulative probability distribution function of the to-be-decoded coefficient; obtaining a probability distribution of the to-be-decoded coefficient based on the to-be-decoded coefficient and the cumulative probability distribution function of the to-be-decoded coefficient; and performing, based on the probability distribution of the to-be-decoded coefficient, entropy decoding on the bitstream of the to-be-decoded coefficient by using an arithmetic decoder, to obtain the to-be-decoded coefficient, where the 3N+1 reconstructed subbands include the to-be-decoded coefficient.

In a feasible embodiment, when the $s^{th}$ subband is a first subband of the 3N+1 subbands, the entropy decoding model is implemented based on a pixel convolutional neural network (pixelCNN), the entropy decoding model includes M convolution layers, M is an integer greater than 0, and the inputting a reconstructed subband corresponding to an $s^{th}$ subband into the entropy decoding model to obtain a parameter of a cumulative probability distribution function of a to-be-decoded coefficient through calculation includes:

when M is equal to 1, performing, based on a window function corresponding to a first convolution layer, a windowing operation on a convolution kernel corresponding to the first convolution layer, to obtain a first windowed convolution kernel; and performing, based on the first windowed convolution kernel, a convolution operation on the reconstructed subband corresponding to the $s^{th}$ subband, to obtain the parameter of the cumulative probability distribution function of the to-be-decoded coefficient; or when M is greater than 1, during an operation of a $j^{th}$ convolution layer, performing, based on a window function corresponding to the $j^{th}$ convolution layer, a windowing operation on a convolution kernel corresponding to the $j^{th}$ convolution layer, to obtain a second windowed convolution kernel; and performing a convolution operation on input data of the $j^{th}$ convolution layer based on the second windowed convolution kernel to obtain $j^{th}$ output data, where when j is equal to 1, the input data of the $j^{th}$ convolution layer is a reconstructed subband corresponding to the first subband; when j is greater than 1 and not greater than M, the input data of the $j^{th}$ convolution layer is output data of a $(j-1)^{th}$ convolution layer; or when j is equal to M, the $j^{th}$ output data includes the parameter of the cumulative probability distribution function of the to-be-decoded coefficient.

In a feasible embodiment, when the $s^{th}$ subband is not a first subband of the 3N+1 subbands, the entropy decoding model includes a first entropy decoding model, a second entropy decoding model, and a third entropy decoding model, both the first entropy decoding model and the second entropy decoding model are implemented based on a pixel convolutional neural network, the third entropy decoding model is implemented based on a recurrent neural network (RNN), the first entropy decoding model includes T1 convolution layers, the second entropy decoding model includes T2 convolution layers, both T1 and T2 are integers greater than 0, and the inputting a reconstructed subband corresponding to an $s^{th}$ subband into the entropy decoding model to obtain a parameter of a cumulative probability distribution function of a to-be-decoded coefficient through calculation includes:

inputting a reconstructed subband corresponding to an $(s-1)^{th}$ subband into the third entropy decoding model for calculation, to obtain a first output result, where the reconstructed subband corresponding to the $(s-1)^{th}$ subband is obtained by performing entropy decoding on a bitstream of the $(s-1)^{th}$ subband, the first output result is input data of the second entropy decoding model, and the reconstructed subband corresponding to the $s^{th}$ subband is input data of the first entropy decoding model; and when both T1 and T2 are equal to 1, performing, based on a convolution layer C1 and a convolution layer C2, a combination operation on the first output result and the reconstructed subband corresponding to the $s^{th}$ subband, to obtain a second output result, where the second output result is the parameter of the cumulative probability distribution function of the to-be-decoded coefficient, and the convolution layer C1 and the convolution layer C2 are convolution layers in the first entropy decoding model and the second entropy decoding model respectively; or when T1 is greater than 1 and T2 is equal to 1, performing, based on a convolution layer C1 and a convolution layer C2, a combination operation on the first output result and the reconstructed subband corresponding to the $s^{th}$ subband, to obtain a second output result, where the convolution layer C1 is a $q^{th}$ convolution layer in the first entropy decoding model, the convolution layer C2 is a convolution layer in the second entropy decoding model, and if q is equal to T1, the second output result is the parameter of the cumulative probability distribution function of the to-be-decoded coefficient, or if q is greater than 0 and less than T1, the second output result is input data of a $(q+1)^{th}$ convolution layer in the first entropy decoding model; or when both T1 and T2 are greater than 1, performing, based on a convolution layer C1 and a convolution layer C2, a combination operation on the first output result and the reconstructed subband corresponding to the $s^{th}$ subband, to obtain a second output result, where the convolution layer C1 is a $q1^{th}$ convolution layer in the first entropy decoding model, the convolution layer C2 is a $q2^{th}$ convolution layer in the second entropy decoding model, and if q1 is equal to T1 and q2 is equal to T2, the second output result is the parameter of the cumulative probability distribution function of the to-be-decoded coefficient, or if q1 is greater than 0 and less than T1 and q2 is greater than 0 and less than T2, the second output result is input data of a $(q1+1)^{th}$ convolution layer in the first entropy decoding model, and an output result of the convolution layer C2 is input data of a $(q2+1)^{th}$ convolution layer in the second entropy decoding model.

In a feasible embodiment, when a resolution of the reconstructed subband corresponding to the $(s-1)^{th}$ subband is different from a resolution of the reconstructed subband corresponding to the $s^{th}$ subband, the inputting a reconstructed subband corresponding to an $(s-1)^{th}$ subband into the third entropy decoding model for calculation, to obtain a first output result includes:

performing, based on the third entropy decoding model and a state variable of the third entropy decoding model, a convolution operation on the reconstructed subband corresponding to the $(s-1)^{th}$ subband, to obtain a convolution result; and performing upsampling on the convolution result to obtain the first output result, where a resolution of the first output result is the same as the resolution of the reconstructed subband corresponding to the $s^{th}$ subband; and after the performing upsampling on the convolution result to obtain the first output result, the method further includes:

performing upsampling on a convolved state variable to obtain a sampled state variable, where a resolution of the sampled state variable is the same as the resolution of the $s^{th}$ subband.

In a feasible embodiment, the performing, based on a convolution layer C1 and a convolution layer C2, a combination operation on the first output result and the reconstructed subband corresponding to the $s^{th}$ subband, to obtain a second output result includes:

- performing a windowing operation on a first convolution kernel based on a first window function to obtain a windowed first convolution kernel, where the first convolution kernel is a convolution kernel corresponding to the convolution layer C1;
- performing a convolution operation on first input data based on the windowed first convolution kernel to obtain a first convolution result, where when the convolution layer C1 is a first convolution layer in the first entropy decoding model, the first input data is the reconstructed subband corresponding to the $s^{th}$ subband, or when the convolution layer C1 is a non-first convolution layer in the first entropy decoding model, the first input data is obtained by performing a convolution operation on the reconstructed subband corresponding to the $s^{th}$ subband;
- inputting second input data into a second sub convolution layer and performing a convolution operation to obtain a second convolution result, where when the convolution layer C2 is a first convolution layer in the second entropy decoding model, the second input data is the first output result, or when the convolution layer C2 is a non-first convolution layer in the second entropy decoding model, the second input data is obtained by performing a convolution operation on the first output result; and performing an addition or concatenation operation on the first convolution result and the second convolution result to obtain the second output result.

In a feasible embodiment, the performing, based on a convolution layer C1 and a convolution layer C2, a combination operation on the first output result and the reconstructed subband corresponding to the $s^{th}$ subband, to obtain a second output result includes:

- performing a windowing operation on a first convolution kernel based on a first window function to obtain a windowed first convolution kernel, where the first convolution kernel is a convolution kernel corresponding to the convolution layer C1; performing a windowing operation on a second convolution kernel based on a second window function to obtain a windowed second convolution kernel, where the second convolution kernel is a convolution kernel corresponding to the convolution layer C2, and the first window function and the second window function are complementary to each other;
- performing a convolution operation on first input data based on the windowed first convolution kernel to obtain a first convolution result, where when the convolution layer C1 is a first convolution layer in the first entropy decoding model, the first input data is the reconstructed subband corresponding to the $s^{th}$ subband, or when the convolution layer C1 is a non-first convolution layer in the first entropy decoding model, the first input data is obtained by performing a convolution operation on the reconstructed subband corresponding to the $s^{th}$ subband;
- performing a convolution operation on second input data based on the windowed second convolution kernel to obtain a second convolution result, where when the convolution layer C2 is a first convolution layer in the second entropy decoding model, the second input data is the first output result, or when the convolution layer C2 is a non-first convolution layer in the second entropy decoding model, the second input data is obtained by performing a convolution operation on the first output result; and performing an addition or concatenation operation on the first convolution result and the second convolution result to obtain the second output result.

In a feasible embodiment, the performing N inverse wavelet transforms on the dequantized wavelet coefficient based on a wavelet transform model to obtain a reconstructed image includes:

when performing a $t^{th}$ inverse wavelet transform, performing an update operation and a prediction operation on an approximation subband $P_{N+1-t}$ and a detail subband $I_{(N+1-t)1}$ to obtain a first processed subband and a second processed subband, and obtaining an intermediate approximation component based on the first processed subband and the second processed subband, where an odd column coefficient or an odd row coefficient of the intermediate approximation component comes from the first processed subband, and an even column coefficient or an even row coefficient of the intermediate approximation component comes from the second processed subband;

performing the update operation and the prediction operation on a detail subband $I_{(N+1-t)2}$ and a detail subband $I_{(N+1-t)3}$ to obtain a third processed subband and a fourth processed subband, and obtaining an intermediate detail component based on the third processed subband and the fourth processed subband, where an odd column coefficient or an odd row coefficient of the intermediate detail component comes from the third processed subband, and an even column coefficient or an even row coefficient of the intermediate detail component comes from the fourth processed subband; and performing the update operation and the prediction operation on the intermediate detail component and the intermediate approximation component to obtain a fifth processed subband and a sixth processed subband, and obtaining an approximation subband $P_{t-1}$ based on the fifth processed subband and the sixth processed subband, where an odd row coefficient or an odd column coefficient of the approximation subband $P_{t-1}$ comes from the fifth processed subband, and an even row coefficient or an even column coefficient of the approximation subband $P_{t-1}$ comes from the sixth processed subband, where resolutions of the detail subband $I_{(N+1-t)1}$, the detail subband $I_{(N+1-t)2}$, and the detail subband $I_{(N+1-t)3}$ are the same as a resolution of the approximation subband $P_{N+1-t}$, and when the $t^{th}$ inverse wavelet transform is a last wavelet transform, the approximation subband $P_{t-1}$ is the reconstructed image.

In a feasible embodiment, the prediction operation is implemented based on the CNN;

the update operation is implemented based on the CNN; or both the update operation and the prediction operation are implemented based on the CNN.

In a feasible embodiment, after the performing N inverse wavelet transforms on the dequantized wavelet coefficient based on a wavelet transform model to obtain a reconstructed image, the method further includes:

performing post-processing on the reconstructed image based on a post-processing model to obtain a processed reconstructed image, where the post-processing model is implemented based on a deep neural network.

Because post-processing is performed on the reconstructed image based on the deep neural network, quality of the reconstructed image can be further improved, and decoding performance can be improved.

According to a third aspect, an embodiment of the present disclosure further provides a training method, including:

training a wavelet transform model, where the training a wavelet transform model includes:

initializing the wavelet transform model;

performing N wavelet transforms on a training image based on the initialized wavelet transform model to obtain 3N+1 subbands;

performing inverse wavelet transforms on a first subband, a second subband, a third subband, . . . , and a $3N^{th}$ subband sequentially based on the initialized wavelet transform model to obtain 3N reconstructed images;

calculating a loss value based on the training image and the 3N reconstructed images, where the loss value $L=\Sigma_i^{3N}\|R_i-I\|_2^2$, $R_i$ is an $i^{th}$ image of the 3N reconstructed images, and I is the training image; and repeating the foregoing method for several times, and if a fluctuation range of the loss value L is very small, determining that training of the wavelet transform model is completed; otherwise, continuing to train the wavelet transform model according to the foregoing method.

According to a fourth aspect, an embodiment of the present disclosure provides an image encoding apparatus based on a wavelet transform, where the apparatus includes:

a transform module, configured to perform N wavelet transforms on a to-be-encoded image based on a wavelet transform model to obtain a wavelet coefficient, where the wavelet transform model is implemented based on a convolutional neural network (CNN), and N is an integer greater than 0;

a quantization module, configured to quantize the wavelet coefficient to obtain a quantized wavelet coefficient; and an entropy encoding module, configured to perform entropy encoding on the quantized wavelet coefficient to obtain a compressed bitstream.

In a feasible embodiment, the transform module is specifically configured to:

when performing an $i^{th}$ wavelet transform, decompose a subband X to obtain an odd sample component and an even sample component, where the odd sample component includes an odd row coefficient or an odd column coefficient in the subband X, and the even sample component includes an even row coefficient or an even column coefficient in the subband X;

perform an update operation and a prediction operation on the even sample component and the odd sample component to obtain an intermediate approximation component and an intermediate detail component;

decompose the intermediate approximation component to obtain a first sample component and a second sample component, where the first sample component includes an odd column coefficient or an odd row coefficient of the intermediate approximation component, and the second sample component includes an even column coefficient or an even row coefficient of the intermediate approximation component;

decompose the intermediate detail component to obtain a third sample component and a fourth sample component, where the third sample component includes an odd row coefficient or an odd column coefficient of the intermediate detail component, and the fourth sample component includes an even column coefficient or an even row coefficient of the intermediate detail component;

perform the update operation and the prediction operation on the first sample component and the second sample component to obtain an approximation subband $P_i$ and a detail subband $I_{i1}$; and perform the update operation and the prediction operation on the third sample component and the fourth sample component to obtain a detail subband $I_{i2}$ and a detail subband $I_{i3}$, where the wavelet coefficient includes the approximation subband $P_i$, the detail subband $I_{i1}$, the detail subband $I_{i2}$, and the detail subband $I_{i3}$; and when the $i^{th}$ wavelet transform is a first wavelet transform, the subband X is the to-be-encoded image; or when the $i^{th}$ wavelet transform is not a first wavelet transform, the subband X is an approximation subband $P_{i-1}$, and the approximation subband $P_{i-1}$ is an approximation subband obtained by performing an $(i-1)^t$h wavelet transform.

In a feasible embodiment, the prediction operation is implemented based on the CNN; the update operation is implemented based on the CNN; or both the prediction operation and the update operation are implemented based on the CNN.

In a feasible embodiment, the entropy encoding module is specifically configured to:

encode the quantized wavelet coefficient based on an entropy encoding model to obtain the compressed bitstream, where the entropy encoding model is implemented based on a deep neural network.

In a feasible embodiment, the wavelet coefficient includes 3N+1 subbands, and the entropy encoding module is specifically configured to:

input an $s^{th}$ subband into the entropy encoding model to obtain a parameter of a cumulative probability distribution function of a to-be-encoded coefficient through calculation, where the to-be-encoded coefficient is any coefficient in the $s^{th}$ subband, and the $s^{th}$ subband is any one of the 3N+1 subbands; obtain the cumulative probability distribution function based on the parameter of the cumulative probability distribution function of the to-be-encoded coefficient; obtain a probability distribution of the to-be-encoded coefficient based on the to-be-encoded coefficient and the cumulative probability distribution function of the to-be-encoded coefficient; and perform entropy encoding on the to-be-encoded coefficient based on the probability distribution of the to-be-encoded coefficient by using an arithmetic encoder, to obtain a bitstream corresponding to the to-be-encoded coefficient, where the compressed bitstream includes the bitstream corresponding to the to-be-encoded coefficient.

In a feasible embodiment, when the $s^{th}$ subband is a first subband of the 3N+1 subbands, the entropy encoding model is implemented based on a pixel convolutional neural network (pixelCNN), the entropy encoding model includes M convolution layers, M is an integer greater than 0, and when inputting the $s^{th}$ subband into the entropy encoding model to obtain the parameter of the cumulative probability distribution function of the to-be-encoded coefficient through calculation, the entropy encoding module is specifically configured to:

when M is equal to 1, perform, based on a window function corresponding to a first convolution layer, a windowing operation on a convolution kernel corresponding to the first convolution layer, to obtain a first windowed convolution kernel; and perform a convolution operation on the $s^{th}$ subband based on the first windowed convolution kernel to obtain the parameter of the cumulative probability distribution function of the to-be-encoded coefficient; or when M is greater than 1, during an operation of a $j^{th}$ convolution layer, perform, based on a window function corresponding to the $j^{th}$ convolution layer, a windowing operation on a convolution kernel corresponding to the $j^{th}$ convolution layer, to obtain a second windowed convolution kernel; and perform a convolution operation on input data of the $j^{th}$ convolution layer based on the second windowed convolution kernel to obtain $j^{th}$ output data, where when j is equal to 1, the input data of the $j^{th}$ convolution layer is the first subband; when j is greater than 1 and not greater than M, the input data of the $j^{th}$ convolution layer is output data of a $(j-1)^{th}$ convolution layer; or when j is equal to M, the $j^{th}$ output data includes the parameter of the cumulative probability distribution function of the to-be-encoded coefficient.

In a feasible embodiment, when the $s^{th}$ subband is not a first subband of the 3N+1 subbands, the entropy encoding model includes a first entropy encoding model, a second entropy encoding model, and a third entropy encoding model, both the first entropy encoding model and the second entropy encoding model are implemented based on a pixel convolutional neural network, the third entropy encoding model is implemented based on an RNN, the first entropy encoding model includes T1 convolution layers, the second entropy encoding model includes T2 convolution layers, both T1 and T2 are integers greater than 0, and when inputting the $s^{th}$ subband into the entropy encoding model to obtain the parameter of the cumulative probability distribution function of the to-be-encoded coefficient through calculation, the entropy encoding module is specifically configured to:

input an $(s-1)^{th}$ subband into the third entropy encoding model for calculation, to obtain a first output result, where the first output result is input data of the second entropy encoding model, and the $s^{th}$ subband is input data of the first entropy encoding model; and when both T1 and T2 are equal to 1, perform a combination operation on the first output result and the $s^{th}$ subband based on a convolution layer C1 and a convolution layer C2 to obtain a second output result, where the second output result is the parameter of the cumulative probability distribution function of the to-be-encoded coefficient, and the convolution layer C1 and the convolution layer C2 are convolution layers in the first entropy encoding model and the second entropy encoding model respectively; or when T1 is greater than 1 and T2 is equal to 1, perform a combination operation on the first output result and the $s^{th}$ subband based on a convolution layer C1 and a convolution layer C2 to obtain a second output result, where the convolution layer C1 is a $q^{th}$ convolution layer in the first entropy encoding model, the convolution layer C2 is a convolution layer in the second entropy encoding model, and if q is equal to T1, the second output result is the parameter of the cumulative probability distribution function of the to-be-encoded coefficient, or if q is greater than 0 and less than T1, the second output result is input data of a $(q+1)^{th}$ convolution layer in the first entropy encoding model; or when both T1 and T2 are greater than 1, perform a combination operation on the first output result and the $s^{th}$ subband based on a convolution layer C1 and a convolution layer C2 to obtain a second output result, where the convolution layer C1 is a $q1^{th}$ convolution layer in the first entropy encoding model, the convolution layer C2 is a $q2^{th}$ convolution layer in the second entropy encoding model, and if q1 is equal to T1 and q2 is equal to T2, the second output result is the parameter of the cumulative probability distribution function of the to-be-encoded coefficient, or if q1 is greater than 0 and less than T1 and q2 is greater than 0 and less than T2, the second output result is input data of a $(q1+1)^{th}$ convolution layer in the first entropy encoding model, and an output result of the convolution layer C2 is input data of a $(q2+1)^{th}$ convolution layer in the second entropy encoding model.

In a feasible embodiment, when a resolution of the $(s-1)^{th}$ subband is different from a resolution of the $s^{th}$ subband, when inputting the $(s-1)^{th}$ subband into the third entropy encoding model for calculation, to obtain the first output result, the entropy encoding module is specifically configured to:

perform a convolution operation on the $(s-1)^{th}$ subband based on the third entropy encoding model and a state variable of the third entropy encoding model to obtain a convolution result; and perform upsampling on the convolution result to obtain the first output result, where a resolution of the first output result is the same as the resolution of the $s^{th}$ subband; and after performing upsampling on the convolution result to obtain the first output result, the entropy encoding module is further configured to:

perform upsampling on a convolved state variable to obtain a sampled state variable, where a resolution of the sampled state variable is the same as the resolution of the $s^{th}$ subband.

In a feasible embodiment, when performing the combination operation on the first output result and the $s^{th}$ subband based on the convolution layer C1 and the convolution layer C2, the entropy encoding module is specifically configured to:

perform a windowing operation on a first convolution kernel based on a first window function to obtain a windowed first convolution kernel, where the first convolution kernel is a convolution kernel corresponding to the convolution layer C1;

perform a convolution operation on first input data based on the windowed first convolution kernel to obtain a first convolution result, where when the convolution layer C1 is a first convolution layer in the first entropy encoding model, the first input data is the $s^{th}$ subband, or when the convolution layer C1 is a non-first convolution layer in the first entropy encoding model, the first input data is obtained by performing a convolution operation on the $s^{th}$ subband;

input second input data into a second sub convolution layer and perform a convolution operation to obtain a second convolution result, where when the convolution layer C2 is a first convolution layer in the second entropy encoding model, the second input data is the first output result, or when the convolution layer C2 is a non-first convolution layer in the second entropy encoding model, the second input data is obtained by performing a convolution operation on the first output result; and perform an addition or concatenation operation on the first convolution result and the second convolution result to obtain the second output result.

In a feasible embodiment, when performing the combination operation on the first output result and the $s^{th}$ subband based on the convolution layer C1 and the convolution layer C2 to obtain the second output result, the entropy encoding module is specifically configured to:

perform a windowing operation on a first convolution kernel based on a first window function to obtain a windowed first convolution kernel, where the first convolution kernel is a convolution kernel corresponding to the convolution layer C1;

perform a windowing operation on a second convolution kernel based on a second window function to obtain a windowed second convolution kernel, where the second convolution kernel is a convolution kernel corresponding to the convolution layer C2, and the first window function and the second window function are complementary to each other;

perform a convolution operation on first input data based on the windowed first convolution kernel to obtain a first convolution result, where when the convolution layer C1 is a first convolution layer in the first entropy encoding model, the first input data is the $s^{th}$ subband, or when the convolution layer C1 is a non-first convolution layer in the first entropy encoding model, the first input data is obtained by performing a convolution operation on the $s^{th}$ subband;

perform a convolution operation on second input data based on the windowed second convolution kernel to obtain a second convolution result, where when the convolution layer C2 is a first convolution layer in the second entropy encoding model, the second input data is the first output result, or when the convolution layer C2 is a non-first convolution layer in the second entropy encoding model, the second input data is obtained by performing a convolution operation on the first output result; and perform an addition or concatenation operation on the first convolution result and the second convolution result to obtain the second output result.

According to a fifth aspect, an embodiment of the present disclosure provides an image decoding apparatus based on a wavelet transform, where the apparatus includes:

an entropy decoding module, configured to perform entropy decoding on a compressed bitstream to obtain a reconstructed wavelet coefficient;

a dequantization module, configured to dequantize the reconstructed wavelet coefficient to obtain a dequantized wavelet coefficient; and an inverse transform module, configured to perform N inverse wavelet transforms on the dequantized wavelet coefficient based on a wavelet transform model to obtain a reconstructed image, where the wavelet transform model is implemented based on a convolutional neural network (CNN), and N is an integer greater than 0.

In a feasible embodiment, the entropy decoding module is specifically configured to:

perform entropy decoding on the compressed bitstream based on an entropy decoding model to obtain the reconstructed wavelet coefficient, where the entropy decoding model is implemented based on a deep neural network.

In a feasible embodiment, the compressed bitstream includes bitstreams of 3N+1 subbands, the reconstructed wavelet coefficient includes 3N+1 reconstructed subbands, and the entropy decoding module is specifically configured to:

input a reconstructed subband corresponding to an $s^{th}$ subband into the entropy decoding model to obtain a parameter of a cumulative probability distribution function of a to-be-decoded coefficient through calculation, where a bitstream of the to-be-decoded coefficient is a part of a bitstream of the $s^{th}$ subband, and the reconstructed subband corresponding to the $s^{th}$ subband is any one of the 3N+1 reconstructed subbands; obtain the cumulative probability distribution function of the to-be-decoded coefficient based on the parameter of the cumulative probability distribution function of the to-be-decoded coefficient; obtain a probability distribution of the to-be-decoded coefficient based on the to-be-decoded coefficient and the cumulative probability distribution function of the to-be-decoded coefficient; and perform, based on the probability distribution of the to-be-decoded coefficient, entropy decoding on the bitstream of the to-be-decoded coefficient by using an arithmetic decoder, to obtain the to-be-decoded coefficient, where the 3N+1 reconstructed subbands include the to-be-decoded coefficient.

In a feasible embodiment, when the $s^{th}$ subband is a first subband of the 3N+1 subbands, the entropy decoding model is implemented based on a pixel convolutional neural network (pixelCNN), the entropy decoding model includes M convolution layers, M is an integer greater than 0, and when inputting the reconstructed subband corresponding to the $s^{th}$ subband into the entropy decoding model to obtain the parameter of the cumulative probability distribution function of the to-be-decoded coefficient through calculation, the entropy decoding module is specifically configured to:

when M is equal to 1, perform, based on a window function corresponding to a first convolution layer, a windowing operation on a convolution kernel corresponding to the first convolution layer, to obtain a first windowed convolution kernel; and perform, based on the first windowed convolution kernel, a convolution operation on the reconstructed subband corresponding to the $s^{th}$ subband, to obtain the parameter of the cumulative probability distribution function of the to-be-decoded coefficient; or when M is greater than 1, during an operation of a $j^{th}$ convolution layer, perform, based on a window function corresponding to the $j^{th}$ convolution layer, a windowing operation on a convolution kernel corresponding to the $j^{th}$ convolution layer, to obtain a second windowed convolution kernel; and perform a convolution operation on input data of the $j^{th}$ convolution layer based on the second windowed convolution kernel to obtain $j^{th}$ output data, where when j is equal to 1, the input data of the $j^{th}$ convolution layer is a reconstructed subband corresponding to the first subband; when j is greater than 1 and not greater than M, the input data of the $j^{th}$ convolution layer is output data of a $(j-1)^{th}$ convolution layer; or when j is equal to M, the $j^{th}$ output data includes the parameter of the cumulative probability distribution function of the to-be-decoded coefficient.

In a feasible embodiment, when the $s^{th}$ subband is not a first subband of the 3N+1 subbands, the entropy decoding model includes a first entropy decoding model, a second entropy decoding model, and a third entropy decoding model, both the first entropy decoding model and the second entropy decoding model are implemented based on a pixel convolutional neural network, the third entropy decoding model is implemented based on a recurrent neural network (RNN), the first entropy decoding model includes T1 convolution layers, the second entropy decoding model includes T2 convolution layers, both T1 and T2 are integers greater than 0, and when inputting the reconstructed subband corresponding to the $s^{th}$ subband into the entropy decoding model to obtain the parameter of the cumulative probability distribution function of the to-be-decoded coefficient through calculation, the entropy decoding module is specifically configured to:

input a reconstructed subband corresponding to an $(s-1)^{th}$ subband into the third entropy decoding model for calculation, to obtain a first output result, where the reconstructed subband corresponding to the $(s-1)^{th}$ subband is obtained by performing entropy decoding on a bitstream of the $(s-1)^{th}$ subband, the first output result is input data of the second entropy decoding model, and the reconstructed subband corresponding to the $s^{th}$ subband is input data of the first entropy decoding model; and when both T1 and T2 are equal to 1, perform, based on a convolution layer C1 and a convolution layer C2, a combination operation on the first output result and the reconstructed subband corresponding to the $s^{th}$ subband, to obtain a second output result, where the second output result is the parameter of the cumulative probability distribution function of the to-be-decoded coefficient, and the convolution layer C1 and the convolution layer C2 are convolution layers in the first entropy decoding model and the second entropy decoding model respectively; or when T1 is greater than 1 and T2 is equal to 1, perform, based on a convolution layer C1 and a convolution layer C2, a combination operation on the first output result and the reconstructed subband corresponding to the $s^{th}$ subband, to obtain a second output result, where the convolution layer C1 is a $q^{th}$ convolution layer in the first entropy decoding model, the convolution layer C2 is a convolution layer in the second entropy decoding model, and if q is equal to T1, the second output result is the parameter of the cumulative probability distribution function of the to-be-decoded coefficient, or if q is greater than 0 and less than T1, the second output result is input data of a $(q+1)^{th}$ convolution layer in the first entropy decoding model; or when both T1 and T2 are greater than 1, perform, based on a convolution layer C1 and a convolution layer C2, a combination operation on the first output result and the reconstructed subband corresponding to the $s^{th}$ subband, to obtain a second output result, where the convolution layer C1 is a $q1^{th}$ convolution layer in the first entropy decoding model, the convolution layer C2 is a $q2^{th}$ convolution layer in the second entropy decoding model, and if q1 is equal to T1 and q2 is equal to T2, the second output result is the parameter of the cumulative probability distribution function of the to-be-decoded coefficient, or if q1 is greater than 0 and less than T1 and q2 is greater than 0 and less than T2, the second output result is input data of a $(q1+1)^{th}$ convolution layer in the first entropy decoding model, and an output result of the convolution layer C2 is input data of a $(q2+1)^{th}$ convolution layer in the second entropy decoding model.

In a feasible embodiment, when a resolution of the reconstructed subband corresponding to the $(s-1)^{th}$ subband is different from a resolution of the reconstructed subband corresponding to the $s^{th}$ subband, when inputting the reconstructed subband corresponding to the $(s-1)^{th}$ subband into the third entropy decoding model for calculation, to obtain the first output result, the entropy decoding module is specifically configured to:

perform, based on the third entropy decoding model and a state variable of the third entropy decoding model, a convolution operation on the reconstructed subband corresponding to the $(s-1)^{th}$ subband, to obtain a convolution result; and perform upsampling on the convolution result to obtain the first output result, where a resolution of the first output result is the same as the resolution of the reconstructed subband corresponding to the $s^{th}$ subband; and after performing upsampling on the convolution result to obtain the first output result, the entropy decoding module is specifically further configured to:

perform upsampling on a convolved state variable to obtain a sampled state variable, where a resolution of the sampled state variable is the same as the resolution of the $s^{th}$ subband.

In a feasible embodiment, when performing, based on the convolution layer C1 and the convolution layer C2, the combination operation on the first output result and the reconstructed subband corresponding to the $s^{th}$ subband, to obtain the second output result, the entropy decoding module is specifically configured to:

perform a windowing operation on a first convolution kernel based on a first window function to obtain a windowed first convolution kernel, where the first convolution kernel is a convolution kernel corresponding to the convolution layer C1;

perform a convolution operation on first input data based on the windowed first convolution kernel to obtain a first convolution result, where when the convolution layer C1 is a first convolution layer in the first entropy decoding model, the first input data is the reconstructed subband corresponding to the $s^{th}$ subband, or when the convolution layer C1 is a non-first convolution layer in the first entropy decoding model, the first input data is obtained by performing a convolution operation on the reconstructed subband corresponding to the $s^{th}$ subband;

input second input data into a second sub convolution layer and perform a convolution operation to obtain a second convolution result, where when the convolution layer C2 is a first convolution layer in the second entropy decoding model, the second input data is the first output result, or when the convolution layer C2 is a non-first convolution layer in the second entropy decoding model, the second input data is obtained by performing a convolution operation on the first output result; and perform an addition or concatenation operation on the first convolution result and the second convolution result to obtain the second output result.

In a feasible embodiment, when performing, based on the convolution layer C1 and the convolution layer C2, the combination operation on the first output result and the reconstructed subband corresponding to the $s^{th}$ subband, to obtain the second output result, the entropy decoding module is specifically configured to:

- perform a windowing operation on a first convolution kernel based on a first window function to obtain a windowed first convolution kernel, where the first convolution kernel is a convolution kernel corresponding to the convolution layer C1;
- perform a windowing operation on a second convolution kernel based on a second window function to obtain a windowed second convolution kernel, where the second convolution kernel is a convolution kernel corresponding to the convolution layer C2, and the first window function and the second window function are complementary to each other;
- perform a convolution operation on first input data based on the windowed first convolution kernel to obtain a first convolution result, where when the convolution layer C1 is a first convolution layer in the first entropy decoding model, the first input data is the reconstructed subband corresponding to the $s^{th}$ subband, or when the convolution layer C1 is a non-first convolution layer in the first entropy decoding model, the first input data is obtained by performing a convolution operation on the reconstructed subband corresponding to the $s^{th}$ subband;
- perform a convolution operation on second input data based on the windowed second convolution kernel to obtain a second convolution result, where when the convolution layer C2 is a first convolution layer in the second entropy decoding model, the second input data is the first output result, or when the convolution layer C2 is a non-first convolution layer in the second entropy decoding model, the second input data is obtained by performing a convolution operation on the first output result; and perform an addition or concatenation operation on the first convolution result and the second convolution result to obtain the second output result.

In a feasible embodiment, the inverse transform module is specifically configured to: when performing a $t^{th}$ inverse wavelet transform, perform an update operation and a prediction operation on an approximation subband $P_{N+1-t}$ and a detail subband $I_{(N+1-t)1}$ to obtain a first processed subband and a second processed subband, and obtain an intermediate approximation component based on the first processed subband and the second processed subband, where an odd column coefficient or an odd row coefficient of the intermediate approximation component comes from the first processed subband, and an even column coefficient or an even row coefficient of the intermediate approximation component comes from the second processed subband;

perform the update operation and the prediction operation on a detail subband $I_{(N+1-t)2}$ and a detail subband $I_{(N+1-t)3}$ to obtain a third processed subband and a fourth processed subband, and obtain an intermediate detail component based on the third processed subband and the fourth processed subband, where an odd column coefficient or an odd row coefficient of the intermediate detail component comes from the third processed subband, and an even column coefficient or an even row coefficient of the intermediate detail component comes from the fourth processed subband; and perform the update operation and the prediction operation on the intermediate detail component and the intermediate approximation component to obtain a fifth processed subband and a sixth processed subband, and obtain an approximation subband $P_{t-1}$ based on the fifth processed subband and the sixth processed subband, where an odd row coefficient or an odd column coefficient of the approximation subband $P_{t-1}$ comes from the fifth processed subband, and an even row coefficient or an even column coefficient of the approximation subband $P_{t-1}$ comes from the sixth processed subband, where resolutions of the detail subband $I_{(N+1-t)1}$, the detail subband $I_{(N+1-t)2}$, and the detail subband $I_{(N+1-t)3}$ are the same as a resolution of the approximation subband $P_{N+1-t}$, and when the $t^{th}$ inverse wavelet transform is a last wavelet transform, the approximation subband $P_{t-1}$ is the reconstructed image.

In a feasible embodiment, the prediction operation is implemented based on the CNN; the update operation is implemented based on the CNN; or both the update operation and the prediction operation are implemented based on the CNN.

In a feasible embodiment, the image encoding apparatus further includes:

a post-processing module, configured to perform post-processing on the reconstructed image based on a post-processing model to obtain a processed reconstructed image after the inverse transform module performs the N inverse wavelet transforms on the dequantized wavelet coefficient based on the wavelet transform model to obtain the reconstructed image, where the post-processing model is implemented based on a deep neural network.

According to a sixth aspect, an embodiment of the present disclosure provides a training apparatus, including:

an initialization module, configured to initialize a wavelet transform model; and a training module, configured to: perform N wavelet transforms on a training image based on the initialized wavelet transform model to obtain 3N+1 subbands; perform inverse wavelet transforms on a first subband, a second subband, a third subband, . . . , and a $3N^{th}$ subband sequentially based on the initialized wavelet transform model to obtain 3N reconstructed images; calculate a loss value based on the training image and the 3N reconstructed images, where the loss value $L=\sum_{i=1}^{3N}\|R_i-I\|_2^2$, $R_i$ is an $i^{th}$ image of the 3N reconstructed images, and I is the training image; and repeat the foregoing method for several times, and if a fluctuation range of the loss value L is very small, determine that training of the wavelet transform model is completed; otherwise, continue to train the wavelet transform model according to the foregoing method.

According to a seventh aspect, an embodiment of the present disclosure provides an apparatus, including:

a memory that stores executable program code; and a processor coupled to the memory, where when invoking the executable program code stored in the memory, the processor performs some or all steps of the method according to the first aspect, the second aspect, or the third aspect.

According to an eighth aspect, an embodiment of the present disclosure further provides a computer storage medium, where the computer storage medium may store a program, and when the program is executed by a computing platform or processor with a processing capability, some or all steps of the method according to the first aspect, the second aspect, or the third aspect are implemented.

These aspects or other aspects of the present disclosure are clearer and more comprehensible in description of the following embodiments.

BRIEF DESCRIPTION OF DRAWINGS

To describe technical solutions in the embodiments of the present disclosure more clearly, the following briefly describes the accompanying drawings that need to be used in the description of the embodiments. It is clear that the accompanying drawings in the following description show merely some embodiments of the present disclosure, and a person of ordinary skill in the art may derive other drawings from these accompanying drawings without creative efforts.

FIG. 14 is a diagram of a structure of a prediction model and an update model according to an embodiment of the present disclosure;

FIG. 15 is a schematic diagram of a structure of an entropy decoding according to an embodiment of the present disclosure;

FIG. 16A and FIG. 16B are schematic diagrams of window functions according to an embodiment of the present disclosure;

DESCRIPTION OF EMBODIMENTS

The following describes in detail a specific process of image encoding/decoding based on a wavelet transform in this application with reference to the accompanying drawings.

It should be noted herein that numbers used in this application may start from 1, or may start from 0, and a maximum value changes accordingly. Numbers starting from 1 are used for description hereinafter.

Figure 1:
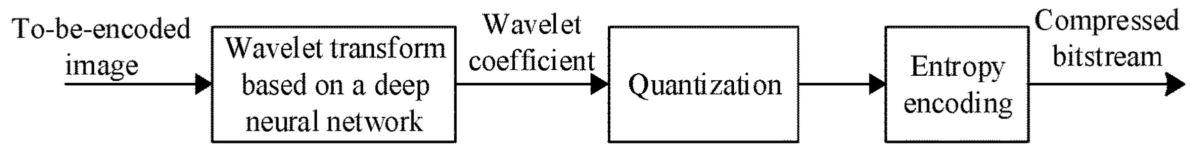
FIG. 1 is a schematic flowchart of image encoding according to an embodiment of the present disclosure.
Figure 2:
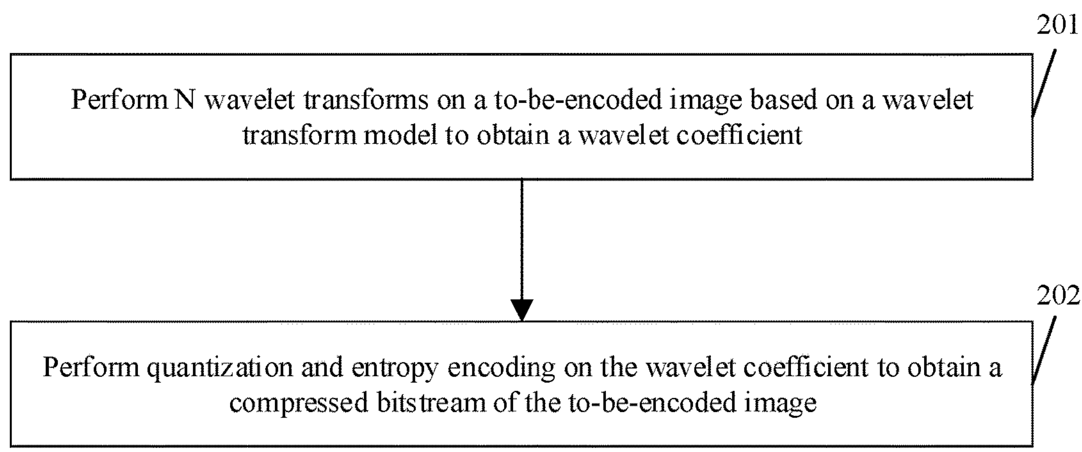
FIG. 2 is another schematic flowchart of image encoding according to an embodiment of the present disclosure.

First, a process of image encoding based on a wavelet transform is described. As shown in FIG. 1, a wavelet transform based on a deep neural network is performed on a to-be-encoded image to obtain a wavelet coefficient; and quantization and entropy encoding are performed on the wavelet coefficient to obtain a compressed bitstream. For details, refer to FIG. 2. FIG. 2 is a schematic flowchart of an image encoding method based on a wavelet transform according to an embodiment of this application. As shown in FIG. 2, the method includes the following steps.

S201. Perform N wavelet transforms on a to-be-encoded image based on a wavelet transform model to obtain a wavelet coefficient.

The wavelet transform model is implemented based on a convolutional neural network (CNN). The wavelet coefficient includes 3N+1 subbands.

Figure 3:
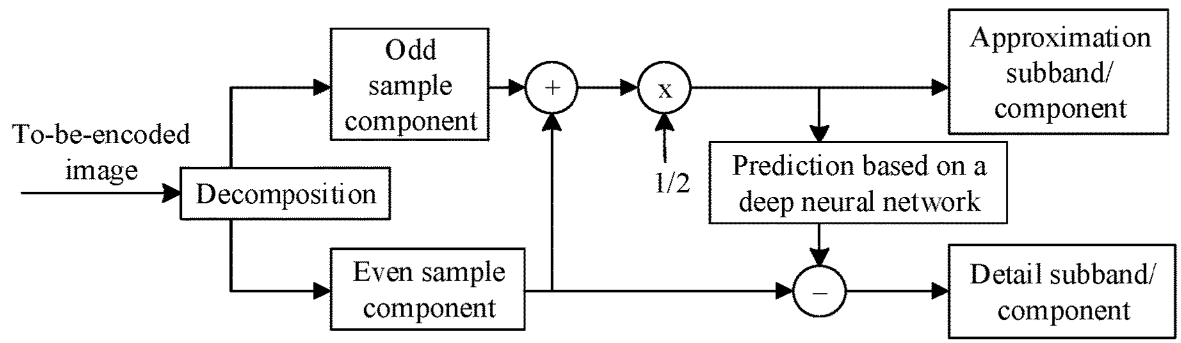
FIG. 3 is a schematic diagram of an image encoding architecture according to an embodiment of the present disclosure.

Specifically, as shown in FIG. 3, performing an $i^{th}$ wavelet transform on the to-be-encoded image based on the wavelet transform model specifically includes:

decomposing a subband X to obtain an odd sample component and an even sample component, where the odd sample component includes an odd row (or column) pixel in the subband X, and the even sample component includes an even row (or column) pixel in the subband X; obtaining an intermediate approximation component based on the odd sample component and the even sample component, where a resolution of the intermediate approximation component is consistent with resolutions of the odd sample component and the even sample component, and each coefficient in the intermediate approximation component is ½ of a sum of coefficients at corresponding positions in the odd sample component and the even sample component; predicting the even sample component by using the intermediate approximation component based on the wavelet transform model, to obtain a first predicted component, where a resolution of the first predicted component is consistent with the resolution of the intermediate approximation component; and obtaining an intermediate detail component based on the even sample component and the first predicted component, where each coefficient in the intermediate detail component is a difference between coefficients at corresponding positions in the even sample component and the first predicted component;

decomposing the intermediate approximation component to obtain a first approximation sample component and a second approximation sample component, where the first approximation sample component includes an odd column coefficient or an odd row coefficient of the intermediate approximation component, and the second approximation sample component includes an even column coefficient or an even row coefficient of the intermediate approximation component; obtaining an approximation subband $P_i$ based on the first approximation sample component and the second approximation sample component, where a resolution of the approximation subband $P_1$ is the same as resolutions of the first approximation sample component and the second approximation sample component, and each coefficient in the approximation subband $P_i$ is ½ of a sum of coefficients at corresponding positions in the first approximation sample component and the second approximation sample component; predicting the second approximation sample component by using the approximation subband $P_i$ based on the wavelet transform model, to obtain a second predicted component, where a resolution of the second predicted component is consistent with the resolution of the approximation subband $P_i$; and obtaining a detail subband $I_{i1}$ based on the second approximation sample component and the second predicted component, where a resolution of the detail subband $I_{i1}$ is the same as resolutions of the second approximation sample component and the second predicted component, and each coefficient in the detail subband $I_{i1}$ is a difference between coefficients at corresponding positions in the second approximation sample component and the second predicted component.

Similarly, the intermediate detail component is processed according to the method for processing the intermediate approximation component, so that a detail subband $I_{i2}$ and a detail subband $I_{i3}$ are obtained. Resolutions of the detail subband $I_{i2}$ and the detail subband $I_{i3}$ are consistent with the resolution of the detail subband $I_{i1}$.

When i is equal to 1, the subband X is the to-be-encoded image. When i is greater than 1, the subband X is an approximation subband $P_{i-1}$, and the approximation subband $P_{i-1}$ is an approximation subband obtained by performing an $(i-1)^{th}$ wavelet transform on the to-be-encoded image.

It should be noted herein that i may start from 0. In this case, a maximum value is N−1. For example, when i is equal to 0, the subband X is the to-be-encoded image.

It should be noted herein that, because the to-be-encoded image and the approximation subband are both two-dimensional data, the wavelet transform is a wavelet transform that is based on a deep neural network and that needs to be performed in a row direction and a column direction separately. Therefore, it can be learned from the foregoing process that, when a complete wavelet transform based on the deep neural network is performed on the to-be-encoded image, the CNN-based wavelet transform model is used for three times in total.

It should be noted herein that after a first wavelet transform is performed on the to-be-encoded image, one approximation subband and three detail subbands are obtained; performing a second wavelet transform on the to-be-encoded image is specifically performing a wavelet transform on an approximation subband $P_1$ to obtain an approximation subband $P_2$, a detail subband $I_{21}$, a detail subband $I_{22}$, and a detail subband $I_{23}$, and up to now, a total of one approximation subband and six detail subbands are obtained; and performing a third wavelet transform on the to-be-encoded image is specifically performing a wavelet transform on the approximation subband $P_2$ obtained by performing the second wavelet transform, to obtain an approximation subband $P_3$, a detail subband $I_{31}$, a detail subband $I_{32}$, and a detail subband $I_{33}$, and up to now, a total of one approximation subband and nine detail images are obtained. By analogy, after the N wavelet transforms are performed on the to-be-encoded image, a total of one approximation subband and 3*N detail subbands are obtained. Therefore, after the N wavelet transforms are performed on the to-be-encoded image, a total of 3*N+1 subbands are obtained.

Figure 4:
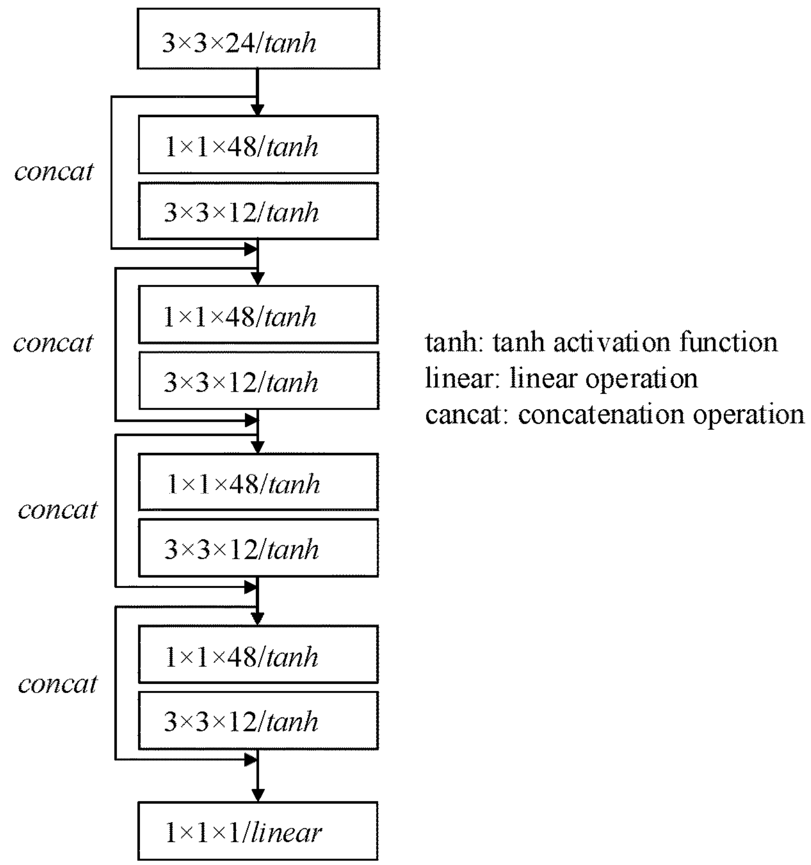
FIG. 4 is a diagram of a structure of a prediction module based on a deep neural network in a wavelet transform model according to an embodiment of the present disclosure.

FIG. 4 is a diagram of a structure of a prediction module based on a deep neural network in a wavelet transform model. In FIG. 4, "3×3×24/tan h" indicates that a current convolution layer uses a convolution kernel of a size 3×3 to generate 24 feature maps, and then uses a tan h activation function; "3×3×12/tan h" indicates that a current convolution layer uses a convolution kernel of a size 3×3 to generate 12 feature maps, and then uses a tan h activation function; "1×1×48/tan h" indicates that a current convolution layer uses a convolution kernel of a size 1×1 to generate 48 feature maps, and then uses a tan h activation function; "1×1×1/linear" indicates that a current convolution layer uses a convolution kernel of a size 1×1 to generate one feature map, and then performs a linear operation on the feature map; and "concat" indicates a concatenation operation performed on the feature maps.

In an embodiment, parameters of the wavelet transform model are embedded in an encoder and a decoder, and do not need to be transmitted.

S202. Perform quantization and entropy encoding on the wavelet coefficient to obtain a compressed bitstream of the to-be-encoded image.

It should be noted herein that a subband encoding method for wavelet coefficients includes two steps: quantization and entropy encoding. Common subband encoding methods include embedded zerotree wavelet transform (EZW) encoding, a set partitioning in hierarchical trees (SPIHT) algorithm, embedded block coding with optimized truncation (EBCOT), and the like. A selection may be made with reference to a specific requirement. A specific quantization and entropy encoding process is not described herein again.

Figure 5:
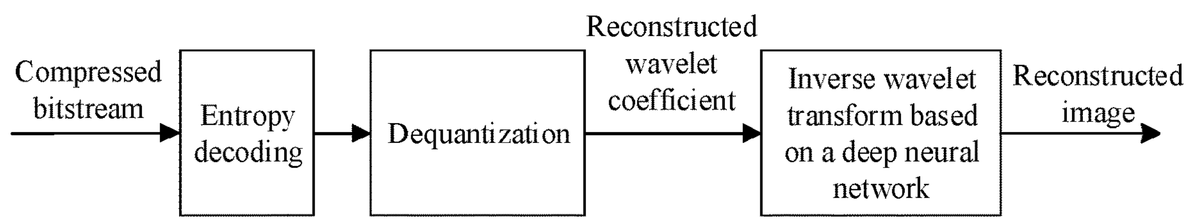
FIG. 5 is a schematic flowchart of image decoding according to an embodiment of the present disclosure.
Figure 6:
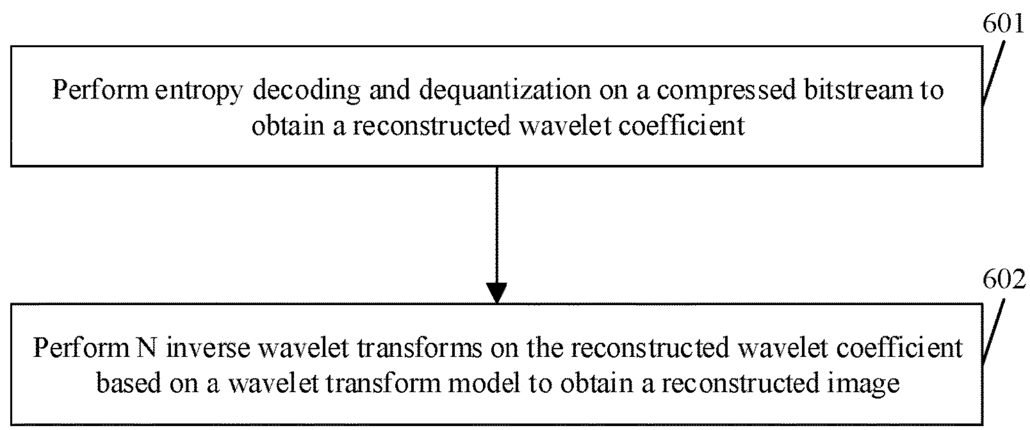
FIG. 6 is another schematic flowchart of image decoding according to an embodiment of the present disclosure.

The following describes a process of image decoding based on a wavelet transform. As shown in FIG. 5, entropy decoding and dequantization are performed on a compressed bitstream to obtain a reconstructed wavelet coefficient; and an inverse wavelet transform based on a deep neural network is performed on the reconstructed wavelet coefficient to obtain a reconstructed image. For details, refer to FIG. 6. FIG. 6 is a schematic flowchart of an image decoding method based on a wavelet transform according to an embodiment of this application. As shown in FIG. 6, the method includes the following steps.

S601. Perform entropy decoding and dequantization on a compressed bitstream to obtain a reconstructed wavelet coefficient.

It should be noted herein that a subband decoding method for the compressed bitstream includes two steps: entropy decoding and dequantization. The subband decoding method corresponds to the subband encoding method on the encoder side, and is not described in detail herein.

S602. Perform N inverse wavelet transforms on the reconstructed wavelet coefficient based on a wavelet transform model to obtain a reconstructed image. The reconstructed wavelet coefficient includes 3N+1 subbands, and the 3N+1 subbands include one approximation subband and 3N detail subbands.

Figure 7:
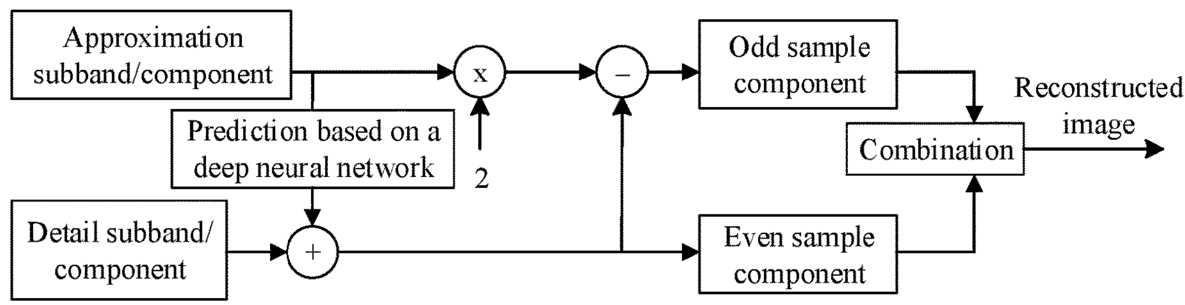
FIG. 7 is a schematic diagram of an image decoding architecture according to an embodiment of the present disclosure.

Specifically, as shown in FIG. 7, performing a $t^{th}$ inverse wavelet transform on the reconstructed wavelet coefficient based on the wavelet transform model specifically includes: obtaining an approximation subband $P_{N+1-t}$ and three detail subbands whose resolutions are the same as that of the approximation subband $P_{N+1-t}$, where the three detail subbands are respectively a detail subband $I_{(N+1-t)1}$, a detail subband $I_{(N+1-t)2}$, and a detail subband $I_{(N+1-t)3}$, and the detail subband $I_{(N+1-t)1}$ and the approximation subband $P_{N+1-t}$ are generated simultaneously at an encoding stage; obtaining a first amplified component based on the approximation subband $P_{N+1-t}$, where each coefficient in the first amplified component is twice a coefficient at a corresponding position in the approximation subband $P_{N+1-t}$; performing a prediction by using the approximation subband $P_{N+1-t}$ based on the wavelet transform model, to obtain a first predicted approximation component; obtaining a first even sample component based on the first predicted approximation component and the detail subband $I_{(N+1-t)1}$, where each coefficient in the first even sample component is a sum of coefficients at corresponding positions in the first predicted approximation component and the detail subband $I_{(N+1-t)1}$; obtaining a first odd sample component based on the first amplification component and the first even sample component, where each coefficient in the first odd sample component is a difference between coefficients at corresponding positions in the first amplified component and the first even sample component; combining the first even sample component and the first odd sample component to obtain an intermediate approximation component whose row (or column) resolution is twice the resolution of the approximation subband $P_{N+1-t}$, where an odd row coefficient or an odd column coefficient in the intermediate approximation component comes from the first odd sample component, and an even row coefficient or an even column coefficient in the intermediate approximation component comes from the first even sample component, or in other words, the odd row coefficient or the odd column coefficient in the intermediate approximation component is a part or an entirety of the first odd sample component, and the even row coefficient or the even column coefficient in the intermediate approximation component is a part or an entirety of the first even sample component; obtaining a second amplified component based on the detail subband $I_{(N+1-t)2}$, where each coefficient in the second amplified component is twice a coefficient at a corresponding position in the detail subband $I_{(N+1-t)2}$; performing a prediction by using the detail subband $I_{(N+1-t)2}$ based on the wavelet transform model, to obtain a first predicted detail component; obtaining a second even sample component based on the first predicted detail component and the detail subband $I_{(N+1-t)3}$; obtaining a second odd sample component based on the second amplified component and the second even sample component, where each coefficient in the second odd sample component is a difference between coefficients at corresponding positions in the second amplified component and the second even sample component; and combining the second even sample component and the second odd sample component to obtain an intermediate detail component, where a column or row resolution of the intermediate detail component is twice a column or row resolution of the detail subband $I_{(N+1-t)2}$ or the detail subband $I_{(N+1-t)3}$, and an odd column coefficient or an odd row coefficient in the intermediate detail component comes from the second odd sample component, and an even column coefficient or an even row coefficient in the intermediate detail component comes from the second even sample component, or in other words, the odd column coefficient or the odd row coefficient in the intermediate detail component is a part or an entirety of the second odd sample component, and the even column coefficient or the even row coefficient in the intermediate detail component is a part or an entirety of the second even sample component;

obtaining a third amplified component based on the intermediate approximation component, where each coefficient in the third amplified component is twice a pixel value at a corresponding position in the intermediate approximation component; performing a prediction by using the intermediate approximation component based on the wavelet transform model, to obtain a first predicted component; obtaining a third even sample component based on the first predicted component and the intermediate detail component; obtaining a third odd sample component based on the third amplified component and the third even sample component, where each coefficient in the third odd sample component is a difference between coefficients at corresponding positions in the third amplified component and the third even sample component; and combining the third even sample component and the third odd sample component to obtain an approximation subband $P_{N-t}$, where a resolution of the approximation subband $P_{N-t}$ is twice the resolution of the approximation subband $P_{N+1-t}$, and an odd row coefficient or an odd column coefficient in the approximation subband $P_{N-t}$ comes from the third odd sample component, and an even row coefficient or an even column coefficient in the approximation subband $P_{N-t}$ comes from the third even sample component, or in other words, the odd row coefficient or the odd column coefficient in the approximation subband $P_{N-t}$ is a part or an entirety of the third odd sample component, and the even row coefficient or the even column coefficient in the approximation subband $P_{N-t}$ is a part or an entirety of the third even sample component.

It should be noted herein that an approximation subband in the 3N+1 subbands is obtained by performing an $N^{th}$ wavelet transform on a to-be-encoded image, where the approximation subband may be denoted as $P_N$, and three detail subbands that are obtained simultaneously may be denoted as a detail subband $I_{N1}$, a detail subband $I_{N2}$, and a detail subband $I_{N3}$ respectively. The detail subband $I_{N1}$ and an approximation subband $P_N$ are obtained simultaneously. Objects of a first inverse wavelet transform are the approximation subband $P_N$, the detail subband $I_{N1}$, the detail subband $I_{N2}$, and the detail subband $I_{N3}$. Objects of a second inverse wavelet transform are an approximation subband $P_{N-1}$, a detail subband $I_{(N-1)1}$, a detail subband $I_{(N-1)2}$, and a detail subband $I_{(N-1)3}$. Objects of a third inverse wavelet transform are an approximation subband $P_{N-2}$, a detail subband $I_{(N-2)1}$, a detail subband $I_{(N-2)2}$, and a detail subband $I_{(N-2)3}$. This method is applied by analogy. Objects of the $t^{th}$ inverse wavelet transform are the approximation subband $P_{N+1-t}$, the detail subband $I_{(N+1-t)1}$, the detail subband $I_{(N+1-t)2}$, and the detail subband $I_{(N+1-t)3}$.

According to the foregoing method, the N inverse wavelet transforms are performed to obtain the reconstructed image. When t is equal to N, the approximation subband $P_{t-1}$ is the reconstructed image.

It should be noted herein that t may start from 0, and that a maximum value is N−1. When t is equal to N−1, the approximation subband $P_{t-1}$ is the reconstructed image.

In a possible embodiment, the wavelet transform model is trained before the wavelet transform is performed on the to-be-encoded image and the inverse wavelet transform is performed on the reconstructed wavelet coefficients based on the wavelet transform model.

Figure 8:
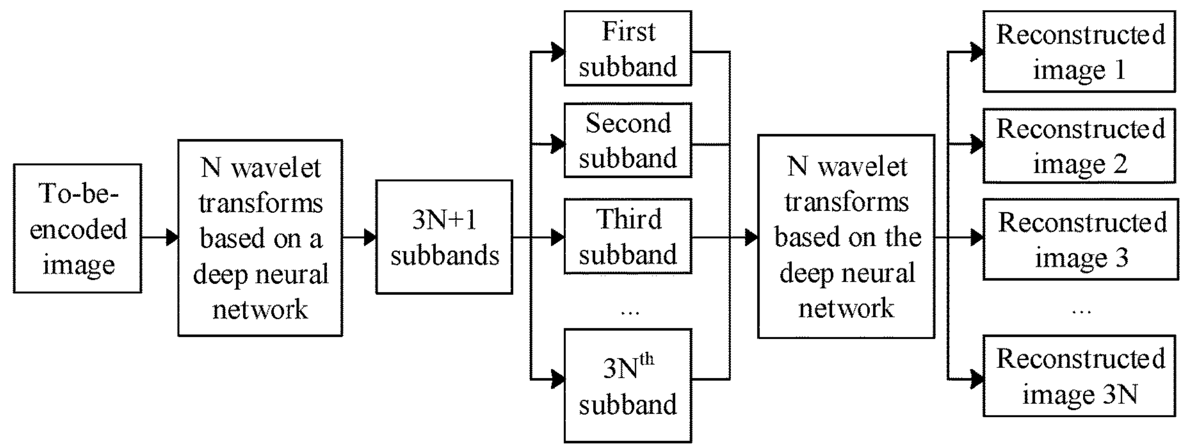
FIG. 8 is a schematic diagram of an end-to-end training framework of a wavelet transform based on a neural network according to an embodiment of the present disclosure.

FIG. 8 is a schematic diagram of an end-to-end training framework of a wavelet transform based on a neural network according to an embodiment of the present disclosure. Specifically, a specific process of training a wavelet transform model includes the following steps.

Figure 9:
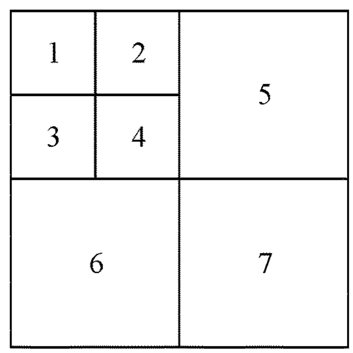
FIG. 9 is a schematic diagram of a subband encoding/decoding sequence according to an embodiment of the present disclosure.

The wavelet transform model is initialized; and N wavelet transforms are performed on a training image based on the initialized wavelet transform model to obtain 3N+1 subbands. For a specific process, refer to related descriptions in the embodiment shown in FIG. 2. Details are not described herein again. Inverse wavelet transforms are performed on a first subband, a second subband, a third subband, . . . , and a $3N^{th}$ subband sequentially based on the initialized wavelet transform model to obtain 3N reconstructed images. For a specific process, refer to related descriptions in the embodiment shown in FIG. 6. Details are not described herein again. For a sequence of selecting subbands during the inverse wavelet transforms, refer to FIG. 9. FIG. 9 is presented based on N=2. A loss value is calculated based on the training image and the 3N reconstructed images, where the loss value $L=\Sigma_{i=1}^{3N}\|R_i-I\|_2^2$, $R_i$ is an $i^{th}$ image of the 3N reconstructed images, and I is the training image. A parameter in the wavelet transform model is updated based on the loss value, so that a new wavelet transform model is obtained.

Then the foregoing method is performed by using the new wavelet transform model, to obtain 3N new reconstructed images; then a loss value is calculated again based on the training image and the new 3N reconstructed images; and if a fluctuation interval of the loss value is sufficiently small, or the loss value approaches a value, it is determined that training of the wavelet transform model is completed; otherwise, the parameter in the wavelet transform model continues to be trained according to the foregoing method, then a loss value is obtained again according to the foregoing method, and the training continues to be performed.

Because parameters of the wavelet transform models in the N wavelet transforms are consistent, the wavelet transform model obtained through such training is resolution-independent, and can provide decomposition for any quantity of times.

In an embodiment, N is a prior value, for example, N=3.

It should be noted herein that in a subband encoding process (that is, subsequent quantization and entropy encoding), importance of each subband is evaluated based on a conventional wavelet transform, and each subband is considered to have the same importance. To balance energy of each subband obtained by performing the wavelet transform based on the deep neural network and obtain gain coefficients of the 3N+1 subbands based on a preset algorithm, in the subband encoding process, the wavelet coefficient obtained through the wavelet transform is multiplied by a corresponding gain coefficient to obtain a final wavelet coefficient; and in a decoding process, the decoded or reconstructed wavelet coefficient is divided by a corresponding gain coefficient, and then the inverse wavelet transform is performed to obtain the reconstructed image.

The following describes in detail the preset algorithm for obtaining the gain coefficients of the 3N+1 subbands.

The 3N+1 subbands can be expressed by using $c=\{c_1, c_2, c_3, \ldots, c_{3N+1}\}$, where $\epsilon$ indicates a constant.

Input: x indicates a training image set; and $L_e$ indicates an expected error.

Output: gain coefficients $\{g_1, g_2, g_3, \ldots, g_{3N+1}\}$ of the 3N+1 subbands.

A main process of the preset algorithm is as follows:

When t=1, 2, 3, . . . , 3N+1, initialize $g_b=0$, g=1, and $L=\infty$;

when $$\frac{L}{L_e} > 1 + \epsilon \text{ or } \frac{L_e}{L} > 1 + \epsilon,$$

generate Gaussian noise n with a mean value 0 and a variance $\delta^2$;

$$c = iWave_{Fwd}(x);$$

$$c_t = (c_t \times g + n)/g;$$

$$\tilde{x} = iWave_{inv}(c_t);$$

$$L = \|x - \tilde{x}\|^2;$$

$$\text{if } \frac{L}{L_e} > 1 + \varepsilon,$$

$$g_b = g; \text{ and}$$

-continued $$g = g \times \sqrt{\frac{L}{L_e}}\text{; and}$$

$$\text{if } \frac{L_e}{L} > 1 + \epsilon,$$

$$g = (g_b + g)/2\text{; and}$$

$$g_t = g,$$

where $\text{iWave}_{Fwd}$ indicates a wavelet transform based on the deep neural network, and $\text{iWave}_{inv}$ indicates an inverse wavelet transform based on the deep neural network.

Optionally, for an 8-bit image, $L_e=1$, $\epsilon=0.2$, and $\delta^2=1$.

When the foregoing method is applied to image encoding, a gain coefficient can be obtained through calculation based on each available value N according to the foregoing method, and is embedded in the encoder and decoder.

It can be learned that, in the solution of this embodiment of this application, in the image encoding/decoding method based on the conventional wavelet transform, the wavelet transform model obtained based on the deep neural network is used to perform the wavelet transform and the inverse wavelet transform. Because the wavelet transform model based on the deep neural network is obtained through optimization by using a large quantity of natural images by using a training method, the wavelet transform model can provide a more compact transform domain expression than the conventional wavelet transform, thereby significantly improving encoding/decoding performance. When a function of the wavelet transform model is implemented by using a GPU, the wavelet transform model has a same speed as the conventional wavelet transform. Compared with an adaptive directional wavelet that selects an optimal direction parameter through a plurality of encoding attempts, the wavelet transform model has an advantage of low time complexity and resolves a contradiction between diversity and complexity of natural image features and ideality and simplicity of artificially designed wavelet basis functions.

Figure 10:
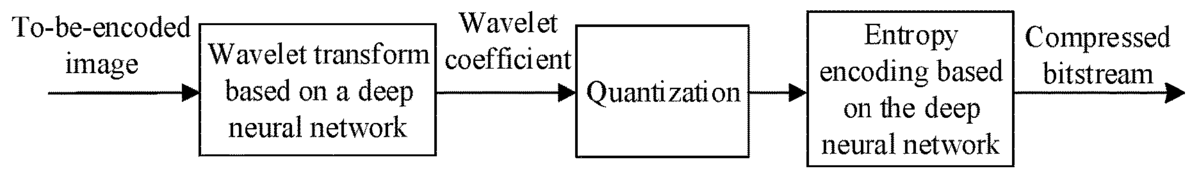
FIG. 10 is another schematic flowchart of image encoding according to an embodiment of the present disclosure.
Figure 11:
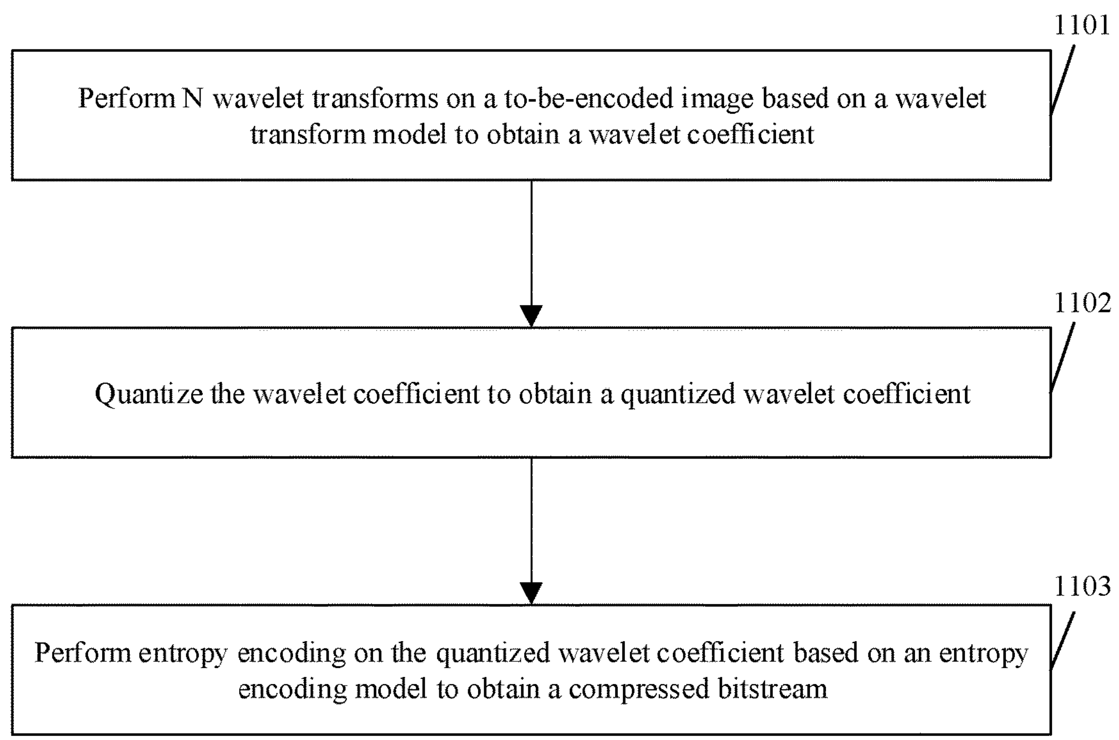
FIG. 11 is another schematic flowchart of image encoding according to an embodiment of the present disclosure.

Another process of image encoding based on a wavelet transform is described herein. As shown in FIG. 10, a wavelet transform based on a deep neural network is performed on a to-be-encoded image to obtain a wavelet coefficient; quantization processing is performed on the wavelet coefficient to obtain a quantized wavelet coefficient; and entropy encoding based on the deep neural network is performed on the quantized wavelet coefficient to obtain a compressed bitstream. For a specific process, refer to FIG. 11. FIG. 11 is a schematic flowchart of another image encoding method based on a wavelet transform according to an embodiment of this application. As shown in FIG. 11, the method includes the following steps.

S1101. Perform N wavelet transforms on a to-be-encoded image based on a wavelet transform model to obtain a wavelet coefficient.

The wavelet transform model is implemented based on a CNN, the wavelet transform model includes an update model and a prediction model, and parameters in the update model and the prediction model are different.

Figure 12:
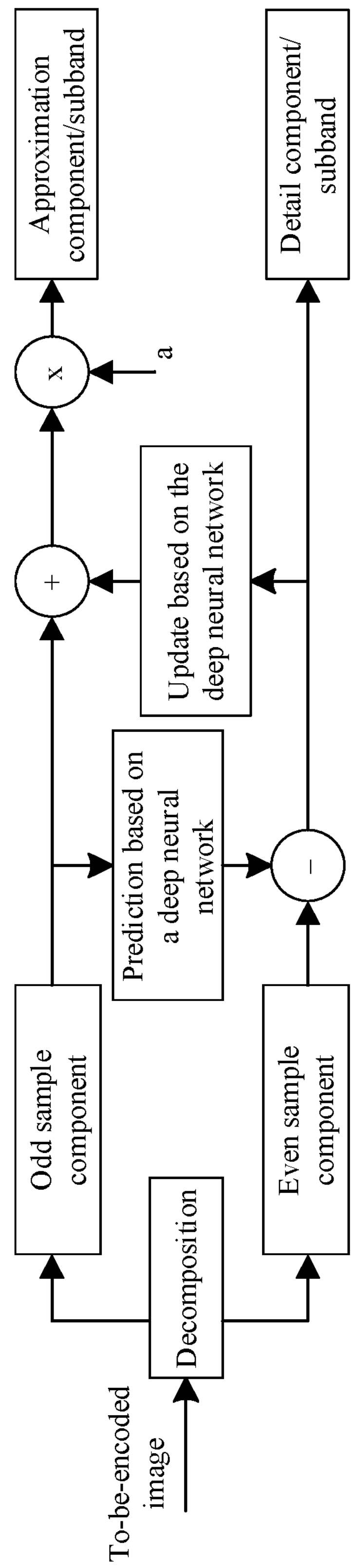
FIG. 12 is a schematic diagram of an image encoding architecture according to an embodiment of the present disclosure.

In a feasible embodiment, as shown in FIG. 12, the wavelet transform model includes the prediction model and the update model, and the performing N wavelet transforms on a to-be-encoded image based on a wavelet transform model to obtain a wavelet coefficient includes:

when performing an $i^{th}$ wavelet transform, decomposing a subband X to obtain an odd sample component and an even sample component, where the odd sample component includes an odd row coefficient or an odd column coefficient in the subband X, and the even sample component includes an even row coefficient or an even column coefficient in the subband X; performing a prediction based on the prediction model by using the odd sample component, to obtain a predicted component, where a resolution of the predicted component is consistent with a resolution of the odd sample component; obtaining an intermediate detail component based on the predicted component and the even sample component, where each coefficient in the intermediate detail component is b times of a difference between coefficients at corresponding positions in the even sample component and the predicted component; performing an update operation based on the update model by using the intermediate detail component, to obtain an updated component, where a resolution of the updated component is consistent with a resolution of the intermediate detail component; and obtaining an intermediate approximation component based on the odd sample component and the updated component, where each coefficient in the intermediate approximation component is a times a sum of coefficients at corresponding positions in the odd sample component and the updated component.

Similarly, according to the processing method for the subband X, the intermediate approximation component is processed to obtain an approximation subband and a detail subband $I_{i1}$, and the intermediate detail component is processed to obtain a detail subband $I_{i2}$ and a detail subband $I_{i3}$.

When i is equal to 1, the subband X is the to-be-encoded image. When i is greater than 1, the subband X is an approximation subband $P_{i-1}$, where the approximation subband $P_{i-1}$ is an approximation subband obtained by performing an $(i-1)^{th}$ wavelet transform, the wavelet coefficient includes detail subbands and approximation subbands obtained by performing the N wavelet transforms, and there are 3N+1 subbands in total.

Figure 13:
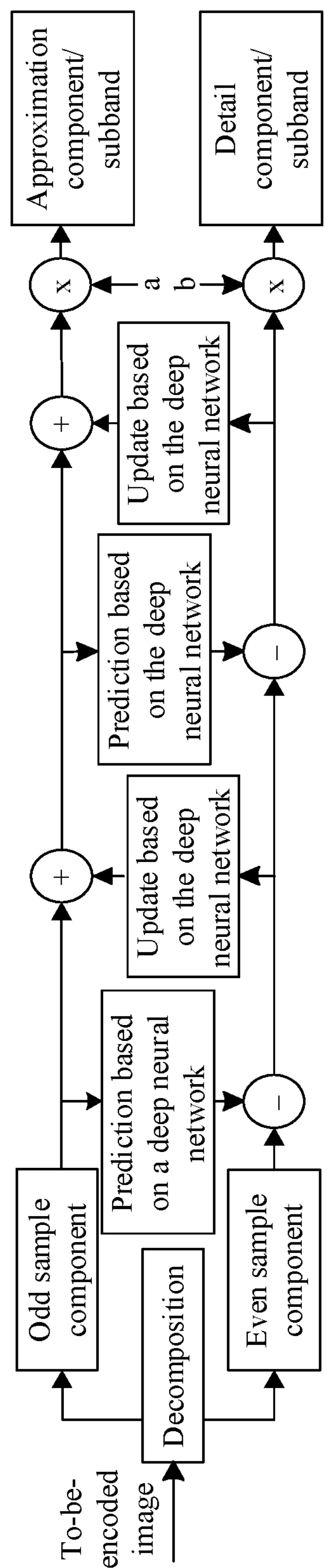
FIG. 13 is a schematic diagram of another image encoding architecture according to an embodiment of the present disclosure.

In another possible embodiment, as shown in FIG. 13, the wavelet transform model includes the prediction model and the update model, and performing an $i^{th}$ wavelet transform on the to-be-encoded image based on the wavelet transform model specifically includes:

decomposing a subband X to obtain an odd sample component and an even sample component, where the odd sample component includes an odd row coefficient or an odd column coefficient in the subband X, and the even sample component includes an even row coefficient or an even column coefficient in the subband X; performing a prediction based on the prediction model by using the odd sample component, to obtain a first predicted component; obtaining a first auxiliary updated component based on the even sample component and the first predicted component, where each coefficient in the first auxiliary updated component is a difference between coefficients at corresponding positions in the even sample component and the first predicted component; performing an update based on the update model by using the first auxiliary updated component, to obtain a first updated component; obtaining a first auxiliary predicted component based on the first updated component and the odd sample component, where each coefficient in the first auxiliary predicted component is a sum of coefficients at corresponding positions in the first updated component and the odd sample component; performing a prediction operation based on the prediction model by using the first auxiliary predicted component, to obtain a second predicted component; obtaining a second auxiliary updated component based on the first auxiliary updated component and the second predicted component, where each coefficient in the second auxiliary updated component is a difference between coefficients at corresponding positions in the first auxiliary updated component and the second predicted component; obtaining an intermediate detail component based on the second auxiliary updated component, where each coefficient in the intermediate detail component is b times a coefficient at a corresponding position in the second auxiliary updated component; obtaining a second updated component based on the update model by using the second auxiliary updated component; and obtaining an intermediate approximation component based on the first updated component and the second updated component, where each coefficient in the intermediate approximation component is a times a sum of coefficients at corresponding positions in the first updated component and the second updated component, and a and b are scaling parameters and are a part of parameters of the wavelet transform model.

According to the foregoing process of processing the subband X, the intermediate approximation component is also processed to obtain an approximation subband $P_i$ and a detail subband $I_{i1}$, and the intermediate detail component is processed to obtain a detail subband $I_{i2}$ and a detail subband $I_{i3}$.

When i is equal to 1, the subband X is the to-be-encoded image. When i is greater than 1, the subband X is an approximation subband $P_{i-1}$, where the approximation subband $P_{i-1}$ is an approximation subband obtained by performing an $(i-1)^{th}$ wavelet transform, the wavelet coefficient includes detail subbands and approximation subbands obtained by performing the N wavelet transforms, and there are 3N+1 subbands in total.

It should be noted herein that i may start from 0. In this case, a maximum value of i is N−1. For example, when i is equal to 0, the subband X is the to-be-encoded image.

It should be noted herein that, as can be learned from FIG. 13 and FIG. 12, the wavelet transform process shown in FIG. 13 includes one more prediction and update process than that shown in FIG. 12. It can be considered that FIG. 12 includes one prediction and update process, and FIG. 13 includes two prediction and update processes. Certainly, a quantity of updates and predictions may alternatively be another value. The quantity of updates and predictions is not limited in this application.

FIG. 14 is a diagram of a structure of a typical prediction model. The diagram of the structure may also be considered as a diagram of a structure of the update model. In FIG. 14, "3×3×1" indicates that a current convolution layer uses a convolution kernel of a size 3×3 to generate one feature map after passing through the current convolution layer, and does not use an activation function; and "tan h/3×3×16" indicates that a current convolution layer uses a convolution kernel of a size 3×3 to generate 16 feature maps after passing through the current convolution layer, and uses tan h as an activation function.

It should be noted herein that, in the process of performing the N wavelet transforms, parameters of the prediction model used for each wavelet transform may be the same, and parameters of the prediction model used may also be different.

In an example, parameters of the wavelet transform model (including parameters of the prediction model and parameters and scaling coefficients of the update model) are embedded in an encoder and a decoder and do not need to be transmitted.

S1102. Quantize the wavelet coefficient to obtain a quantized wavelet coefficient.

The quantized wavelet coefficient may be expressed as $\hat{c}=[c/QP]\cdot QP$, where c is a wavelet coefficient before quantization, QP is a quantization step, and [•] means rounding to an integer.

It should be noted that the quantization step QP can be obtained in a joint training process of the wavelet transform model and an entropy encoding model.

S1103. Perform entropy encoding on the quantized wavelet coefficient based on the entropy encoding model to obtain a compressed bitstream.

The quantized wavelet coefficient includes 3N+1 subbands, and the 3N+1 subbands include one approximation subband and 3N detail subbands.

In a feasible embodiment, the performing entropy encoding on the quantized wavelet coefficient based on the entropy encoding model to obtain a compressed bitstream includes:

encoding the quantized wavelet coefficient based on the entropy encoding model to obtain the compressed bitstream, where the entropy encoding model is implemented based on a deep neural network.

Further, the performing entropy encoding on the quantized wavelet coefficient based on the entropy encoding model to obtain a compressed bitstream includes:

inputting an $s^{th}$ subband into the entropy encoding model to obtain a parameter of a cumulative probability distribution function of a to-be-encoded coefficient through calculation, where the to-be-encoded coefficient is any coefficient in the $s^{th}$ subband, and the $s^{th}$ subband is any one of the 3N+1 subbands; obtaining the cumulative probability distribution function of the to-be-encoded coefficient based on the parameter of the cumulative probability distribution function of the to-be-encoded coefficient; obtaining a probability distribution of the to-be-encoded coefficient based on the to-be-encoded coefficient and the cumulative probability distribution function of the to-be-encoded coefficient; and performing entropy encoding on the to-be-encoded coefficient based on the probability distribution of the to-be-encoded coefficient by using an arithmetic encoder, to obtain a bitstream corresponding to the to-be-encoded coefficient, where the compressed bitstream includes the bitstream corresponding to the to-be-encoded coefficient.

It should be noted herein that the 3N+1 subbands are encoded based on a subband sequence shown in FIG. 9, where a first subband is an approximation subband, the other subbands are detail subbands, and there is a difference between the approximation subband and the detail subband. Therefore, different encoding modes are used for the approximation subband and the detail subbands. In other words, parameters of cumulative probability distribution functions of coefficients in the first subband and non-first subbands are obtained in different manners.

In a possible embodiment, when the $s^{th}$ subband is the first subband of the 3N+1 subbands, the entropy encoding model is implemented based on a pixel convolutional neural network (pixelCNN), the entropy encoding model includes M convolution layers, M is an integer greater than 0, and the inputting an $s^{th}$ subband into the entropy encoding model to obtain a parameter of a cumulative probability distribution function of a to-be-encoded coefficient through calculation includes:

when M is equal to 1, performing, based on a window function corresponding to a first convolution layer, a windowing operation on a convolution kernel corresponding to the first convolution layer, to obtain a first windowed convolution kernel; and performing a convolution operation on the $s^{th}$ subband based on the first windowed convolution kernel to obtain the parameter of the cumulative probability distribution function of the to-be-encoded coefficient; or when M is greater than 1, during an operation of a $j^{th}$ convolution layer, performing, based on a window function corresponding to the $j^{th}$ convolution layer, a windowing operation on a convolution kernel corresponding to the $j^{th}$ convolution layer, to obtain a second windowed convolution kernel; and performing a convolution operation on input data of the $j^{th}$ convolution layer based on the second windowed convolution kernel to obtain $j^{th}$ output data, where when j is equal to 1, the input data of the $j^{th}$ convolution layer is the first subband; when j is greater than 1 and not greater than M, the input data of the $j^{th}$ convolution layer is output data of a $(j-1)^{th}$ convolution layer; or when j is equal to M, the $j^{th}$ output data includes the parameter of the cumulative probability distribution function of the to-be-encoded coefficient.

For example, assuming that an entropy encoding model is shown in FIG. 15, the entropy encoding model includes four convolution layers, where the first convolution layer "5×5×128/mask" indicates that the current convolution layer uses a convolution kernel of a size 5×5 to generate 128 feature maps after passing through the current convolution layer, and mask indicates that a windowing operation is for the convolution operation at this layer; the second convolution layer "3×3×128/relu" indicates that the current convolution layer uses a convolution kernel of a size 3×3 to generate 128 feature maps after passing through the current convolution layer, and uses relu as an activation function; the third convolution layer is the same as the second convolution layer, and "3×3×128/relu" indicates that the current convolution layer uses a convolution kernel of a size 3×3 to generate 128 feature maps after passing through the current convolution layer, and uses relu as an activation function; and the fourth convolution layer 3×3×58 indicates that the current convolution layer uses a convolution kernel of a size 3×3 to generate 58 feature maps after passing through the current convolution layer, and does not use an activation function.

It should be noted herein that for the entropy encoding model including a plurality of convolution layers, in the process of calculating the parameter of the cumulative probability distribution function of the to-be-encoded coefficient, a windowing operation is performed not only on the convolution kernel corresponding to the first convolution layer, but also on a convolution kernel corresponding to any one or more convolution layers in the entropy encoding model. In other words, in the process of calculating the parameter of the cumulative probability distribution function of the to-be-encoded coefficient, a windowing operation may be performed on a convolution kernel corresponding to any one or more convolution layers in the entropy encoding model.

When the first subband is input into the entropy encoding model shown in FIG. 15, first, a window function shown in FIG. 16A is used to perform a windowing operation on the convolution kernel (that is, 5×5) of the first convolution layer, to obtain a windowed convolution kernel, and then a convolution operation is performed on the first subband based on the windowed convolution kernel, to obtain 128 feature maps. Then a window function shown in FIG. 16B is used to perform a windowing operation on the convolution kernel (that is, 3×3) of the second convolution layer, to obtain a windowed convolution kernel, and then a convolution operation is performed on the 128 feature maps output by the first convolution layer, to obtain 128 feature maps. It can be learned from FIG. 16A and FIG. 16B that central values of the two window functions are different. The window function shown in FIG. 16B is used to perform a windowing operation on the convolution kernel (that is, 3×3) of the third convolution layer, to obtain a windowed convolution kernel, and then a convolution operation is performed on the 128 feature maps output by the second convolution layer, to obtain 128 feature maps. The window function shown in FIG. 16B is used to perform a windowing operation on the convolution kernel (that is, 3×3) of the fourth convolution layer, to obtain a windowed convolution kernel, and then a convolution operation is performed on the 128 feature maps output by the third convolution layer, to obtain 58 feature maps. The 58 feature maps constitute the parameter of the cumulative probability distribution function of the to-be-encoded coefficient.

Figure 17:
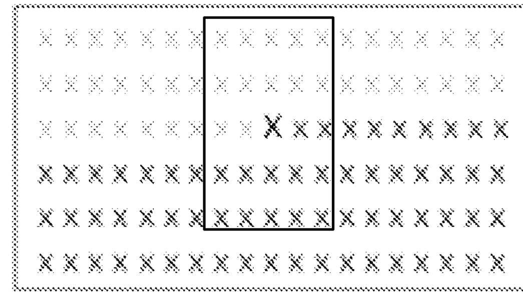
FIG. 17 is a schematic diagram of a subband encoding process according to an embodiment of the present disclosure.

The following uses an example to describe an objective of performing a windowing operation on the convolution kernel of the convolution layer. As shown in FIG. 17, a large block is a subband currently being encoded, an encoding sequence of coefficients in the subband is from left to right and from top to bottom, the convolution kernel of the current convolution layer is 5×5, and the current to-be-encoded coefficient is "X" at a central position of the 5×5 grid in FIG. 17. Based on the encoding sequence of coefficients, coefficients before "X" are encoded coefficients, and coefficients after "X" are coefficients that are not encoded. The parameter of the cumulative probability distribution function of the current to-be-encoded coefficient can be obtained only by inference from the encoded coefficients. Therefore, to perform a convolution operation only on the encoded coefficients during convolution, before the convolution operation is performed, a window function is used to perform a windowing operation on the convolution kernel. A size of the window function is the same as that of the convolution kernel.

Figure 18:
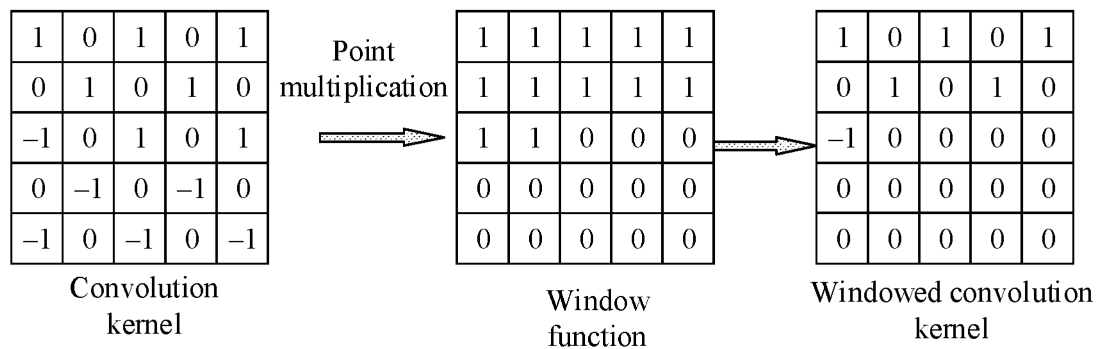
FIG. 18 is a schematic diagram of a convolution kernel windowing process according to an embodiment of the present disclosure.

FIG. 18 is a schematic diagram of a principle of convolution kernel windowing. As shown in FIG. 18, point multiplication is performed on the convolution kernel and the window function to obtain a windowed convolution kernel. In the windowed convolution kernel, in the sequence from left to right and from top to bottom, values before the central position remain unchanged, and values after the central position are all set to 0. This means when the convolution operation is performed by using the windowed convolution kernel, allowing only the coefficients before "X" that are encoded coefficients to participate in the operation, and not allowing the coefficients after "X" that are not encoded coefficients to participate in the operation, thereby ensuring correctness of decoding logic.

It should be noted herein that, when the coefficients in the first subband are encoded, because some coefficients are used as the center, there is a blank part in a region whose size is the same as that of the convolution kernel, and the blank part needs to be filled and is generally filled with "0". Then the parameter of the cumulative probability distribution function of the coefficient is obtained according to the foregoing method.

In another possible embodiment, when the $s^{th}$ subband is not the first subband of the 3N+1 subbands, the entropy encoding model includes a first entropy encoding model, a second entropy encoding model, and a third entropy encoding model, both the first entropy encoding model and the second entropy encoding model are implemented based on a pixelCNN, the third entropy encoding model is implemented based on a recurrent neural network (RNN), the first entropy encoding model includes T1 convolution layers, the second entropy encoding model includes T2 convolution layers, both T1 and T2 are integers greater than 0, and the inputting an $s^{th}$ subband into the entropy encoding model to obtain a parameter of a cumulative probability distribution function of a to-be-encoded coefficient through calculation includes:

inputting an $(s-1)^{th}$ subband into the third entropy encoding model for calculation, to obtain a first output result, where the first output result is input data of the second entropy encoding model, and the $s^{th}$ subband is input data of the first entropy encoding model; and when both T1 and T2 are equal to 1, performing a combination operation on the first output result and the $s^{th}$ subband based on a convolution layer C1 and a convolution layer C2 to obtain a second output result, where the second output result is the parameter of the cumulative probability distribution function of the to-be-encoded coefficient, and the convolution layer C1 and the convolution layer C2 are convolution layers in the first entropy encoding model and the second entropy encoding model respectively; or when T1 is greater than 1 and T2 is equal to 1, performing a combination operation on the first output result and the $s^{th}$ subband based on a convolution layer C1 and a convolution layer C2 to obtain a second output result, where the convolution layer C1 is a $q^{th}$ convolution layer in the first entropy encoding model, the convolution layer C2 is a convolution layer in the second entropy encoding model, and if q is equal to T1, the second output result is the parameter of the cumulative probability distribution function of the to-be-encoded coefficient, or if q is greater than 0 and less than T1, the second output result is input data of a $(q+1)^{th}$ convolution layer in the first entropy encoding model; or when both T1 and T2 are greater than 1, performing a combination operation on the first output result and the $s^{th}$ subband based on a convolution layer C1 and a convolution layer C2 to obtain a second output result, where the convolution layer C1 is a $q1^{th}$ convolution layer in the first entropy encoding model, the convolution layer C2 is a $q2^{th}$ convolution layer in the second entropy encoding model, and if q1 is equal to T1 and q2 is equal to T2, the second output result is the parameter of the cumulative probability distribution function of the to-be-encoded coefficient, or if q1 is greater than 0 and less than T1 and q2 is greater than 0 and less than T2, the second output result is input data of a $(q1+1)^{th}$ convolution layer in the first entropy encoding model, and an output result of the convolution layer C2 is input data of a $(q2+1)^{th}$ convolution layer in the second entropy encoding model.

Figure 19A:
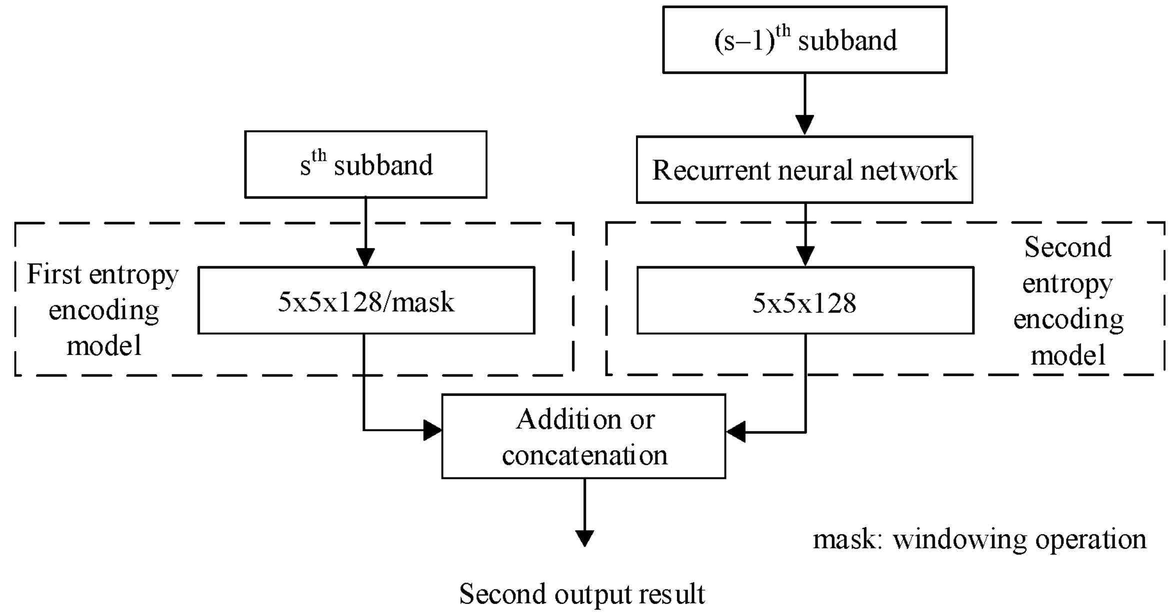
FIG. 19A is a schematic diagram of a combination structure according to an embodiment of the present disclosure.

Specifically, when both T1 and T2 are equal to 1, that is, when both the first entropy encoding model and the second entropy encoding model include one convolution layer, as shown in FIG. 19A, input data of the first entropy encoding model is the $s^{th}$ subband, and input data of the second entropy encoding model is output data (that is, a first output result) of the third entropy encoding model (that is, the RNN). A combination operation is performed on the $s^{th}$ subband and the first output data based on the convolution layer (that is, the convolution layer C1) in the first entropy encoding model and the convolution layer (that is, the convolution layer C2) in the second entropy encoding model, to obtain a second output result. In an example, a convolution layer in the first entropy encoding model is "5×5×128/mask", and a convolution layer in the second entropy encoding model is "5×5×128".

Figure 19B:
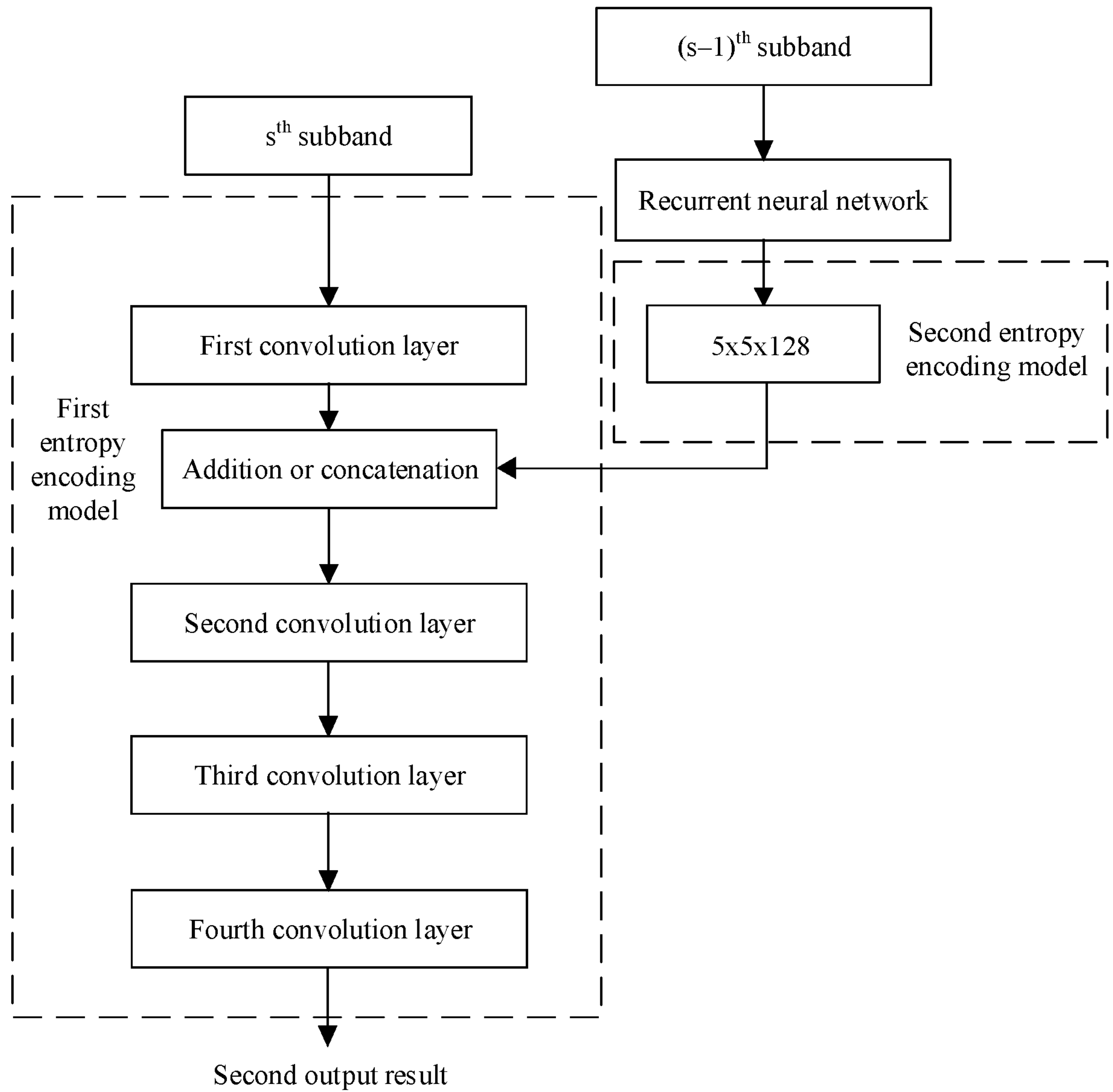
FIG. 19B is a schematic diagram of another combination structure according to an embodiment of the present disclosure.

When T1 is greater than 1 and T2 is equal to 1, the first entropy encoding model includes a plurality of convolution layers, and the second entropy encoding model includes one convolution layer. In a possible embodiment, a combination operation may be performed based on any convolution layer in the first entropy encoding model and the convolution layer in the second entropy encoding model, that is, the convolution layer C1 is any convolution layer in the first entropy encoding model. For example, a combination operation is performed based on the q'h convolution layer in the first entropy encoding model and the convolution layer in the second entropy encoding model. When q is equal to T1, input data of the $q^{th}$ convolution layer is output data of a $(q-1)^{th}$ convolution layer, and the second output result is the parameter of the cumulative probability distribution function of the to-be-encoded coefficient. When q is less than T1 and greater than 1, input data of the $q^{th}$ convolution layer is output data of the $(q-1)^{th}$ convolution layer, and output data of the $q^{th}$ convolution layer is input data of the $(q+1)^{th}$ convolution layer. When q is equal to 1, input data of the $q^{th}$ convolution layer is the $s^{th}$ subband, and output data of the q'h convolution layer is input data of the $(q+1)^{th}$ convolution layer. As shown in FIG. 19B, the first entropy encoding model includes four convolution layers, the second entropy encoding model includes one convolution layer, and a combination operation is performed based on the first convolution layer in the first entropy encoding model and the convolution layer in the second entropy encoding model.

Figure 19C:
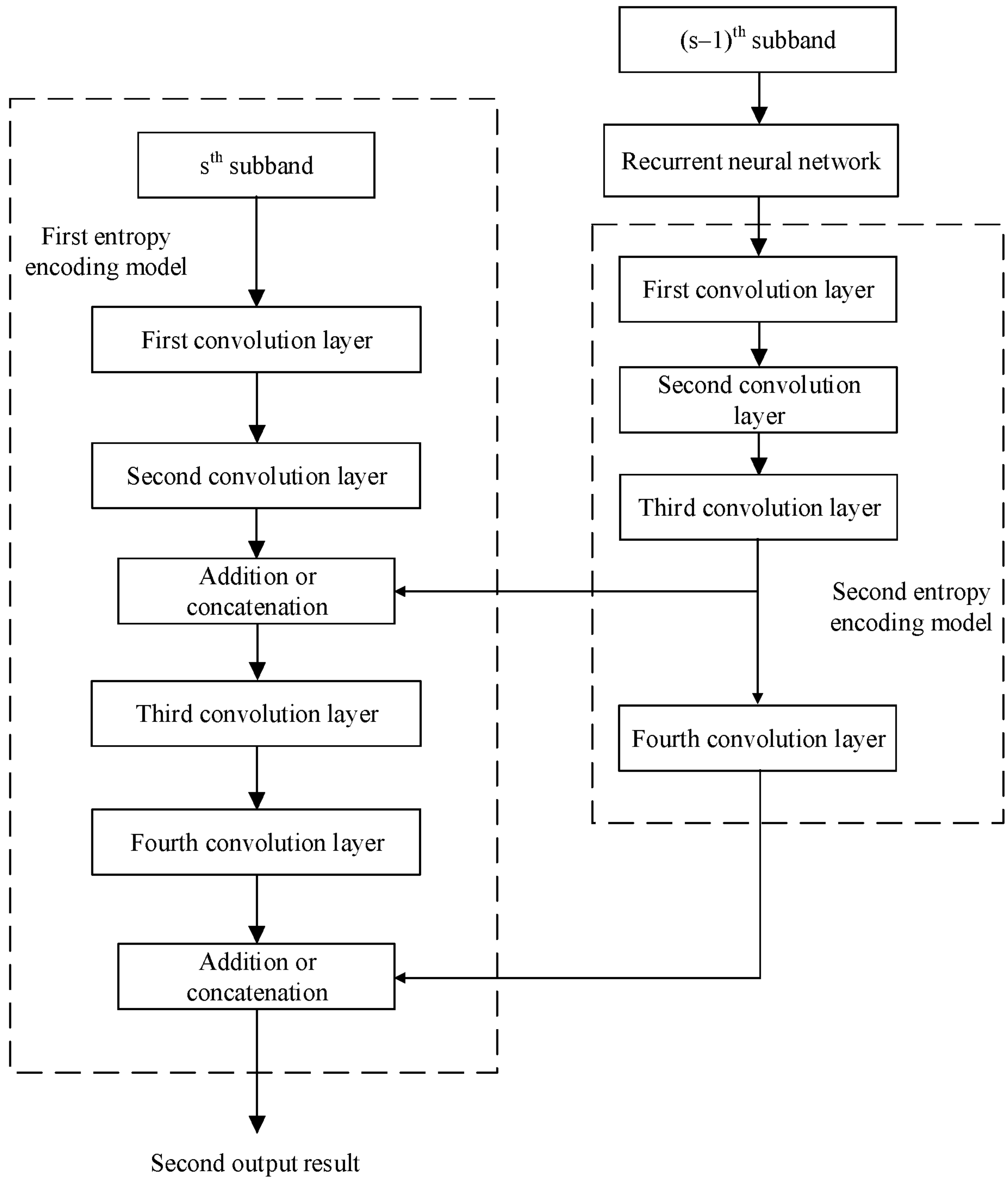
FIG. 19C is a schematic diagram of another combination structure according to an embodiment of the present disclosure.

When both T1 and T2 are greater than 1, that is, when both the first entropy encoding model and the second entropy encoding model include a plurality of convolution layers, a combination operation is performed based on a plurality of convolution layers in the first entropy encoding model and the second entropy encoding model. As shown in FIG. 19C, both the first entropy encoding model and the second entropy encoding model include four convolution layers, a combination operation is performed based on the second convolution layer in the first entropy encoding model and the third convolution layer in the second entropy encoding model, and a combination operation is performed based on the fourth convolution layer in the first entropy encoding model and the fourth convolution layer in the second entropy encoding model. Input data of the second convolution layer in the first entropy encoding model is data obtained by performing convolution processing on the $s^{th}$ subband at the first convolution layer; input data of the third convolution layer in the second entropy encoding model is data obtained by performing convolution processing on the first output result at the first convolution layer and the second convolution layer; input data of the fourth convolution layer in the first entropy encoding model is output data of the third convolution layer; input data of the fourth convolution layer in the second entropy encoding model is output data of the third convolution layer; and the second output result is data obtained by performing a combination operation based on the fourth convolution layer in the first entropy encoding model and the fourth convolution layer in the second entropy encoding model.

It should be noted herein that, in the encoding process, the combination operation is implemented by the first entropy encoding model.

It should be noted herein that the RNN used in this application includes three long short term memory (LSTM) layers. Parameters of the three LSTM layers are shown in Table 1, and are not described in detail herein. Certainly, the RNN used in this application may alternatively be an RNN in another form. This is not specifically limited in this application.

TABLE 1

| LSTM layer | Input convolution parameter | State convolution parameter |
|---|---|---|
| 1 | 3 × 3 × 1 × 32 | 3 × 3 × 32 × 32 |
| 2 | 3 × 3 × 32 × 32 | 3 × 3 × 32 × 32 |
| 3 | 3 × 3 × 32 × 1 | 3 × 3 × 1 × 1 |

In a feasible embodiment, when a resolution of the $(s-1)^{th}$ subband is different from a resolution of the $s^{th}$ subband, the inputting an $(s-1)^{th}$ subband into the third entropy encoding model for calculation, to obtain a first output result includes:

performing a convolution operation on the $(s-1)^{th}$ subband based on the third entropy encoding model and a state variable of the third entropy encoding model to obtain a convolution result; performing upsampling on the convolution result to obtain the first output result, where a resolution of the first output result is the same as the resolution of the $s^{th}$ subband; and performing upsampling on a convolved state variable to obtain a sampled state variable, where a resolution of the sampled state variable is the same as the resolution of the $s^{th}$ subband.

Figures 20, 21:
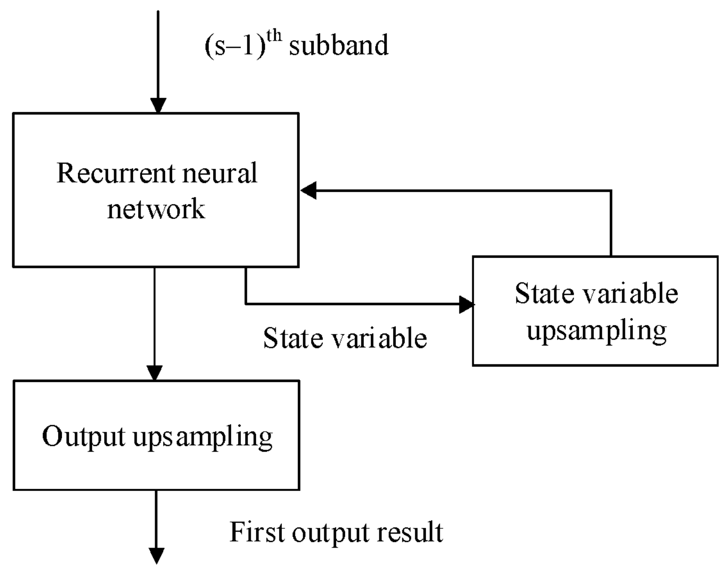
FIG. 20 is a schematic diagram of an upsampling process according to an embodiment of the present disclosure.
FIG. 21 is a schematic diagram of another window function according to an embodiment of the present disclosure.

For example, as shown in FIG. 9, when a fifth subband is encoded based on a fourth subband, because resolutions of the fourth subband and the fifth subband are different, when the first output result is obtained, upsampling needs to be performed on an output of the third entropy encoding model, so that the resolution of the first output result is consistent with a resolution of the fifth subband; in addition, upsampling is performed on a state variable of the third entropy encoding model after the convolution operation, to obtain a sampled state variable, where a resolution of the sampled state variable is the same as the resolution of the fifth subband. As shown in FIG. 20, after a convolution operation is performed on the $(s-1)^{th}$ subband based on the third entropy encoding model, upsampling is performed on the convolution result, to obtain a sampled convolution result, where the sampled convolution result is the first output result, and the resolution of the first output result is the same as the resolution of the $s^{th}$ subband; and upsampling is performed on a convolved state variable to obtain a sampled state variable, where a resolution of the sampled state variable is the same as the resolution of the $s^{th}$ subband.

In a feasible embodiment, the performing a combination operation on the first output result and the $s^{th}$ subband based on a convolution layer C1 and a convolution layer C2 includes:

performing a windowing operation on a first convolution kernel based on a first window function to obtain a windowed first convolution kernel, where the first convolution kernel is a convolution kernel corresponding to the convolution layer C1; performing a convolution operation on first input data based on the windowed first convolution kernel to obtain a first convolution result, where when the convolution layer C1 is a first convolution layer in the first entropy encoding model, the first input data is the $s^{th}$ subband, or when the convolution layer C1 is a non-first convolution layer in the first entropy encoding model, the first input data is obtained by performing a convolution operation on the $s^{th}$ subband; inputting second input data into a second sub convolution layer and performing a convolution operation to obtain a second convolution result, where when the convolution layer C2 is a first convolution layer in the second entropy encoding model, the second input data is the first output result, or when the convolution layer C2 is a non-first convolution layer in the second entropy encoding model, the second input data is obtained by performing a convolution operation on the first output result; and performing an addition or concatenation operation on the first convolution result and the second convolution result to obtain the second output result.

In a feasible embodiment, the performing a combination operation on the first output result and the $s^{th}$ subband based on a convolution layer C1 and a convolution layer C2 includes: performing a windowing operation on a first convolution kernel based on a first window function to obtain a windowed first convolution kernel, where the first convolution kernel is a convolution kernel corresponding to the convolution layer C1; performing a windowing operation on a second convolution kernel based on a second window function to obtain a windowed second convolution kernel, where the second convolution kernel is a convolution kernel corresponding to the convolution layer C2, and the first window function and the second window function are complementary to each other; performing a convolution operation on first input data based on the windowed first convolution kernel to obtain a first convolution result, where when the convolution layer C1 is a first convolution layer in the first entropy encoding model, the first input data is the $s^{th}$ subband, or when the convolution layer C1 is a non-first convolution layer in the first entropy encoding model, the first input data is obtained by performing a convolution operation on the $s^{th}$ subband; performing a convolution operation on second input data based on the windowed second convolution kernel to obtain a second convolution result, where when the convolution layer C2 is a first convolution layer in the second entropy encoding model, the second input data is the first output result, or when the convolution layer C2 is a non-first convolution layer in the second entropy encoding model, the second input data is obtained by performing a convolution operation on the first output result; and performing an addition or concatenation operation on the first convolution result and the second convolution result to obtain the second output result.

As shown in FIG. 21, the first window function and the second window function are complementary to each other.

The parameter of the cumulative probability distribution function of the to-be-encoded coefficient is obtained according to the foregoing method, and the parameter is denoted as x. When the parameter of the cumulative probability distribution function of the to-be-encoded coefficient is 58 dimensions, the parameter of the cumulative probability distribution function that is denoted by x may be expressed as:

$$h=\text{softplus}(x[0:33]);$$

$$b=x[33:46];\text{ and}$$

$$a=\tan h(x[46:58]).$$

The to-be-encoded coefficient is denoted as y, and a specific process of calculating the cumulative probability distribution function of the to-be-encoded coefficient y based on the parameter of the cumulative probability distribution function is as follows:

$$y=\text{matmul}(\text{reshape}(h[0:3],[3,1]),y)+\text{reshape}(b[0:3],[3,1]);$$

$$y=y+\text{reshape}(a[0:3],[3,1])\cdot\tan h(y);$$

$$y=\text{matmul}(\text{reshape}(h[3:12],[3,3]),y)+\text{reshape}(b[3:6],[3,1]);$$

$$y=y+\text{reshape}(a[3:6],[3,1])\cdot\tan h(y);$$

$$y=\text{matmul}(\text{reshape}(h[12:21],[3,3]),y)+\text{reshape}(b[6:9],[3,1]);$$

$$y=y+\text{reshape}(a[6:9],[3,1])\cdot\tan h(y);$$

$$y=\text{matmul}(\text{reshape}(h[21:30],[3,3]),y)+\text{reshape}(b[9:12],[3,1]);$$

$$y=y+\text{reshape}(a[9:12],[3,1])\cdot\tan h(y);$$

$$y=\text{matmul}(\text{reshape}(h[30:33],[1,3]),y)+b[12:13];\text{ and}$$

$$y=\text{sigmoid}(y).$$

The foregoing calculation process is denoted as cdf(y), that is, the cumulative probability distribution function of the to-be-encoded coefficient is cdf(y).

The following describes how to calculate the probability distribution of y by using cdf(y).

A value range of y is known, and the value range of y may be expressed as [$y_{min}$, $y_{max}$, QP], where $y_{min}$ represents a minimum value of y, $y_{max}$ represents a maximum value of y, QP represents a quantization step and represents that values of y are assigned at intervals of QP between $y_{min}$ and $y_{max}$, and $y_{min}$ and $y_{max}$ are limited in advance in a training process. If $y=y_0$, a corresponding probability value is given as follows:

$$p_{y=y_0} = cdf\left(y_0 + \frac{0.5}{QP}\right) - cdf\left(y_0 - \frac{0.5}{QP}\right).$$

Probabilities of other values may be calculated according to the same method, so that the probability distribution of the to-be-encoded coefficient can be obtained. Then based on the probability distribution of the to-be-encoded coefficient y, entropy encoding is performed on the to-be-encoded coefficient y by using an arithmetic encoder, to obtain the bitstream of the to-be-encoded coefficient.

According to the foregoing method, a parameter of a cumulative probability distribution function of each coefficient in each subband may be obtained, then a probability distribution function of each coefficient is obtained, then a probability distribution of each coefficient is obtained, and then entropy encoding is performed on each coefficient based on the probability distribution of each coefficient by using the arithmetic encoder, to obtain a compressed bitstream.

It should be noted herein that the entropy encoding model is not limited to being implemented by using the deep neural network described in the foregoing embodiment, but may be implemented by using another deep neural network.

Figure 22:
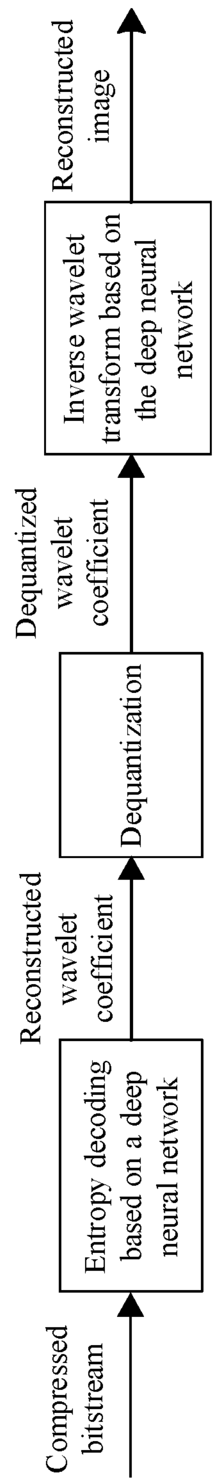
FIG. 22 is a schematic flowchart of image decoding according to an embodiment of the present disclosure.
Figure 23:
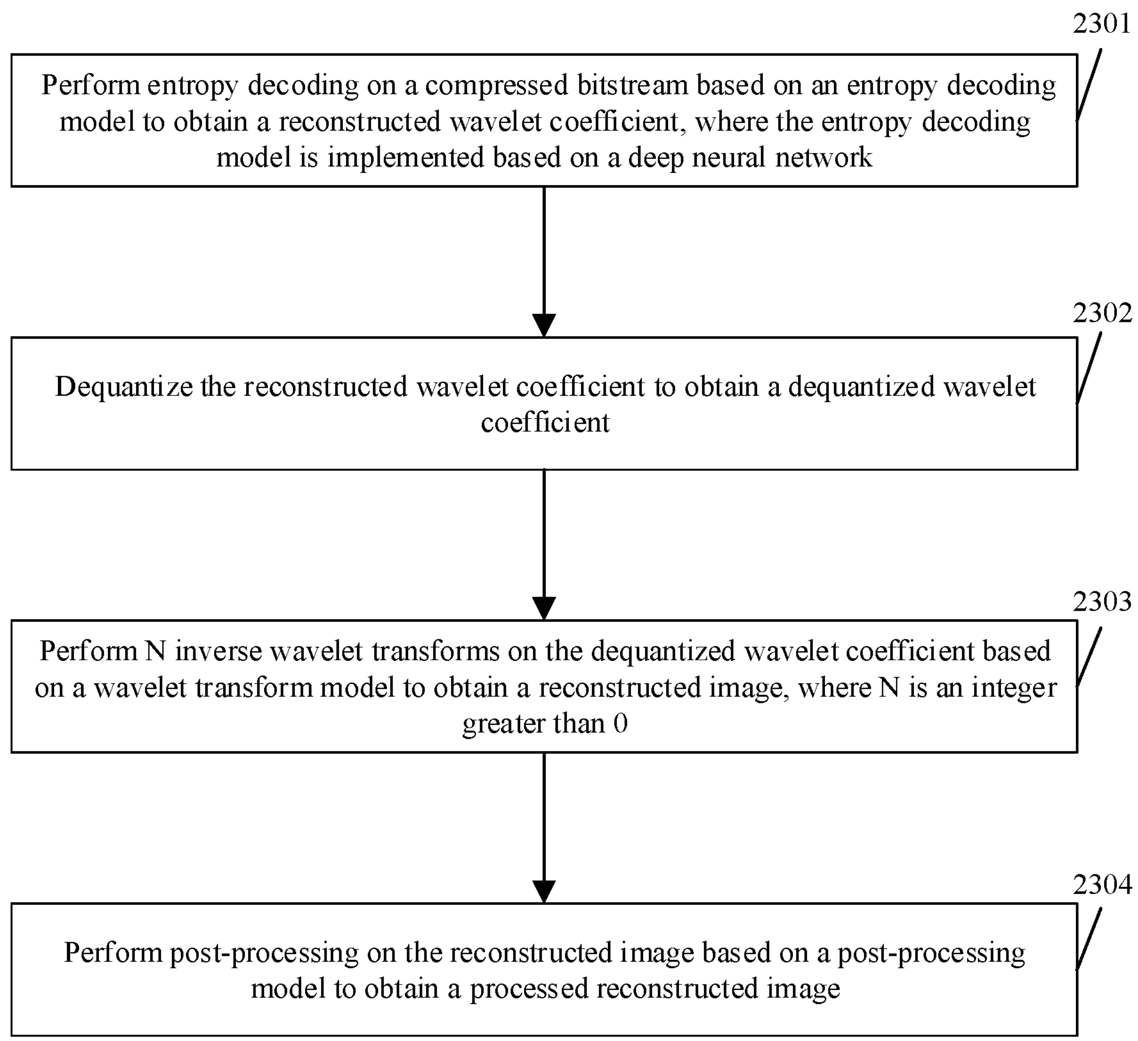
FIG. 23 is another schematic flowchart of image decoding according to an embodiment of the present disclosure.

The following describes another process of image decoding based on a wavelet transform. As shown in FIG. 22, entropy decoding based on a deep neural network is performed on a compressed bitstream to obtain a reconstructed wavelet coefficient, then dequantization is performed on the reconstructed wavelet coefficient to obtain a dequantized wavelet coefficient, and an inverse wavelet transform based on the deep neural network is performed on the dequantized wavelet coefficient to obtain a reconstructed image. For details, refer to FIG. 23. FIG. 23 is a schematic flowchart of another image decoding method based on a wavelet transform according to an embodiment of this application. As shown in FIG. 23, the method includes the following steps.

S2301. Perform entropy decoding on a compressed bitstream based on an entropy decoding model to obtain a reconstructed wavelet coefficient, where the entropy decoding model is implemented based on a deep neural network.

In a feasible embodiment, the compressed bitstream includes bitstreams of 3N+1 subbands, the reconstructed wavelet coefficient includes 3N+1 reconstructed subbands, and the performing entropy decoding on a compressed bitstream based on an entropy decoding model to obtain a reconstructed wavelet coefficient includes:

inputting a reconstructed subband corresponding to an $s^{th}$ subband into the entropy decoding model to obtain a parameter of a cumulative probability distribution function of a to-be-decoded coefficient through calculation, where a bitstream of the to-be-decoded coefficient is a part of a bitstream of the $s^{th}$ subband, and the $s^{th}$ subband is any one of the 3N+1 subbands; obtaining the cumulative probability distribution function of the to-be-decoded coefficient based on the parameter of the cumulative probability distribution function of the to-be-decoded coefficient; obtaining a probability distribution of the to-be-decoded coefficient based on the to-be-decoded coefficient and the cumulative probability distribution function of the to-be-decoded coefficient; and performing, based on the probability distribution of the to-be-decoded coefficient, entropy decoding on the bitstream of the to-be-decoded coefficient by using an arithmetic decoder, to obtain the to-be-decoded coefficient, where the 3N+1 reconstructed subbands include the to-be-decoded coefficient.

It should be noted herein that the 3N+1 subbands are decoded based on a subband sequence shown in FIG. 9, where a first subband is an approximation subband, the other subbands are detail subbands, and there is a difference between the approximation subband and the detail subband. Therefore, different decoding modes are used for the approximation subband and the detail subbands. In other words, parameters of cumulative probability distribution functions of coefficients in the first subband and non-first subbands are obtained in different manners.

It should be noted herein that, when entropy decoding is performed on a bitstream of a subband, a reconstructed subband whose resolution is the same as a resolution of the subband is first created, and coefficients in the reconstructed subband are all set to 0. Every time a coefficient in the subband is decoded, a coefficient at a corresponding position in the reconstructed subband is updated to the decoded coefficient; and the updated reconstructed subband needs to be input into the entropy decoding model to decode a next coefficient after the coefficient. A decoding sequence of the coefficients in the subband is from left to right and from top to bottom.

In a feasible embodiment, when the $s^{th}$ subband is a first subband of the 3N+1 subbands, the entropy decoding model is implemented based on a pixelCNN, the entropy decoding model includes M convolution layers, M is an integer greater than 0, and the inputting a reconstructed subband corresponding to an $s^{th}$ subband into the entropy decoding model to obtain a parameter of a cumulative probability distribution function of a to-be-decoded coefficient through calculation includes:

when M is equal to 1, performing, based on a window function corresponding to a first convolution layer, a windowing operation on a convolution kernel corresponding to the first convolution layer, to obtain a first windowed convolution kernel; and performing, based on the first windowed convolution kernel, a convolution operation on the reconstructed subband corresponding to the $s^{th}$ subband, to obtain the parameter of the cumulative probability distribution function of the to-be-decoded coefficient; or when M is greater than 1, during an operation of a $j^{th}$ convolution layer, performing, based on a window function corresponding to the $j^{th}$ convolution layer, a windowing operation on a convolution kernel corresponding to the $j^{th}$ convolution layer, to obtain a second windowed convolution kernel; and performing a convolution operation on input data of the $j^{th}$ convolution layer based on the second windowed convolution kernel to obtain $j^{th}$ output data, where when j is equal to 1, the input data of the $j^{th}$ convolution layer is a reconstructed subband corresponding to the first subband; when j is greater than 1 and not greater than M, the input data of the $j^{th}$ convolution layer is output data of a $(j-1)^{th}$ convolution layer; or when j is equal to M, the $j^{th}$ output data includes the parameter of the cumulative probability distribution function of the to-be-decoded coefficient.

In a feasible embodiment, when the $s^{th}$ subband is not a first subband of the 3N+1 subbands, the entropy decoding model includes a first entropy decoding model, a second entropy decoding model, and a third entropy decoding model, both the first entropy decoding model and the second entropy decoding model are implemented based on a pixel convolutional neural network, the third entropy decoding model is implemented based on a recurrent neural network (RNN), the first entropy decoding model includes T1 convolution layers, the second entropy decoding model includes T2 convolution layers, both T1 and T2 are integers greater than 0, and the inputting a reconstructed subband corresponding to an $s^{th}$ subband into the entropy decoding model to obtain a parameter of a cumulative probability distribution function of a to-be-decoded coefficient through calculation includes:

inputting a reconstructed subband corresponding to an $(s-1)^{th}$ subband into the third entropy decoding model for calculation, to obtain a first output result, where the reconstructed subband corresponding to the $(s-1)^{th}$ subband is obtained by performing entropy decoding on a bitstream of the $(s-1)^{th}$ subband, the first output result is input data of the second entropy decoding model, and the reconstructed subband corresponding to the $s^{th}$ subband is input data of the first entropy decoding model; and when both T1 and T2 are equal to 1, performing, based on a convolution layer C1 and a convolution layer C2, a combination operation on the first output result and the reconstructed subband corresponding to the $s^{th}$ subband, to obtain a second output result, where the second output result is the parameter of the cumulative probability distribution function of the to-be-decoded coefficient, and the convolution layer C1 and the convolution layer C2 are convolution layers in the first entropy decoding model and the second entropy decoding model respectively; or when T1 is greater than 1 and T2 is equal to 1, performing, based on a convolution layer C1 and a convolution layer C2, a combination operation on the first output result and the reconstructed subband corresponding to the $s^{th}$ subband, to obtain a second output result, where the convolution layer C1 is a $q^{th}$ convolution layer in the first entropy decoding model, the convolution layer C2 is a convolution layer in the second entropy decoding model, and if q is equal to T1, the second output result is the parameter of the cumulative probability distribution function of the to-be-decoded coefficient, or if q is greater than 0 and less than T1, the second output result is input data of a $(q+1)^{th}$ convolution layer in the first entropy decoding model; or when both T1 and T2 are greater than 1, performing, based on a convolution layer C1 and a convolution layer C2, a combination operation on the first output result and the reconstructed subband corresponding to the $s^{th}$ subband, to obtain a second output result, where the convolution layer C1 is a $q1^{th}$ convolution layer in the first entropy decoding model, the convolution layer C2 is a $q2^{th}$ convolution layer in the second entropy decoding model, and if q1 is equal to T1 and q2 is equal to T2, the second output result is the parameter of the cumulative probability distribution function of the to-be-decoded coefficient, or if q1 is greater than 0 and less than T1 and q2 is greater than 0 and less than T2, the second output result is input data of a $(q1+1)^{th}$ convolution layer in the first entropy decoding model, and an output result of the convolution layer C2 is input data of a $(q2+1)^{th}$ convolution layer in the second entropy decoding model.

It should be noted herein that, for a specific process of inputting the reconstructed subband corresponding to the $s^{th}$ subband into the entropy decoding model to obtain the parameter of the cumulative probability distribution function of the to-be-decoded coefficient through calculation, refer to related description of inputting the $s^{th}$ subband into the entropy decoding model to obtain the parameter of the cumulative probability distribution function of the to-be-decoded coefficient through calculation in step S1103. Details are not described herein again.

In a feasible embodiment, when a resolution of the reconstructed subband corresponding to the $(s-1)^{th}$ subband is different from a resolution of the reconstructed subband corresponding to the $s^{th}$ subband, the inputting a reconstructed subband corresponding to an $(s-1)^{th}$ subband into the third entropy decoding model for calculation, to obtain a first output result, and the method further includes:

performing, based on the third entropy decoding model and a state variable of the third entropy decoding model, a convolution operation on the reconstructed subband corresponding to the $(s-1)^{th}$ subband, to obtain a convolution result; performing upsampling on the convolution result to obtain the first output result, where a resolution of the first output result is the same as the resolution of the reconstructed subband corresponding to the $s^{th}$ subband; and performing upsampling on a convolved state variable to obtain a sampled state variable, where a resolution of the sampled state variable is the same as the resolution of the $s^{th}$ subband.

It should be noted herein that, for a specific process of inputting the reconstructed subband corresponding to the $(s-1)^{th}$ subband into the third entropy decoding model for calculation, to obtain the first output result, refer to related descriptions in step S1103. Details are not described herein again.

In a feasible embodiment, the performing, based on a convolution layer C1 and a convolution layer C2, a combination operation on the first output result and the reconstructed subband corresponding to the $s^{th}$ subband, to obtain a second output result includes:

performing a windowing operation on a first convolution kernel based on a first window function to obtain a windowed first convolution kernel, where the first convolution kernel is a convolution kernel corresponding to the convolution layer C1; performing a convolution operation on first input data based on the windowed first convolution kernel to obtain a first convolution result, where when the convolution layer C1 is a first convolution layer in the first entropy decoding model, the first input data is the reconstructed subband corresponding to the $s^{th}$ subband, or when the convolution layer C1 is a non-first convolution layer in the first entropy decoding model, the first input data is obtained by performing a convolution operation on the reconstructed subband corresponding to the $s^{th}$ subband; inputting second input data into a second sub convolution layer and performing a convolution operation to obtain a second convolution result, where when the convolution layer C2 is a first convolution layer in the second entropy decoding model, the second input data is the first output result, or when the convolution layer C2 is a non-first convolution layer in the second entropy decoding model, the second input data is obtained by performing a convolution operation on the first output result; and performing an addition or concatenation operation on the first convolution result and the second convolution result to obtain the second output result.

In a feasible embodiment, the performing, based on a convolution layer C1 and a convolution layer C2, a combination operation on the first output result and the reconstructed subband corresponding to the $s^{th}$ subband, to obtain a second output result includes:

performing a windowing operation on a first convolution kernel based on a first window function to obtain a windowed first convolution kernel, where the first convolution kernel is a convolution kernel corresponding to the convolution layer C1; performing a windowing operation on a second convolution kernel based on a second window function to obtain a windowed second convolution kernel, where the second convolution kernel is a convolution kernel corresponding to the convolution layer C2, and the first window function and the second window function are complementary to each other;

performing a convolution operation on first input data based on the windowed first convolution kernel to obtain a first convolution result, where when the convolution layer C1 is a first convolution layer in the first entropy decoding model, the first input data is the reconstructed subband corresponding to the $s^{th}$ subband, or when the convolution layer C1 is a non-first convolution layer in the first entropy decoding model, the first input data is obtained by performing a convolution operation on the reconstructed subband corresponding to the $s^{th}$ subband; performing a convolution operation on second input data based on the windowed second convolution kernel to obtain a second convolution result, where when the convolution layer C2 is a first convolution layer in the second entropy decoding model, the second input data is the first output result, or when the convolution layer C2 is a non-first convolution layer in the second entropy decoding model, the second input data is obtained by performing a convolution operation on the first output result; and performing an addition or concatenation operation on the first convolution result and the second convolution result to obtain the second output result.

It should be noted herein that, for a specific process of performing, based on the convolution layer C1 and the convolution layer C2, the combination operation on the first output result and the reconstructed subband corresponding to the $s^{th}$ subband, refer to related descriptions in step S1103. Details are not described herein again.

S2302. Dequantize the reconstructed wavelet coefficient to obtain a dequantized wavelet coefficient.

The wavelet coefficient obtained through entropy decoding (that is, the reconstructed wavelet coefficient) may be denoted as $\hat{c}$, and the dequantized wavelet coefficient is denoted as $\tilde{c}$. A dequantization process may be expressed as follows:

$$\tilde{c}=\vec{c}.$$

S2303. Perform N inverse wavelet transforms on the dequantized wavelet coefficient based on a wavelet transform model to obtain a reconstructed image, where N is an integer greater than 0.

The wavelet transform model is implemented based on a CNN.

Specifically, the dequantized wavelet coefficient includes 3N+1 subbands, and the 3N+1 subbands include one approximation subband and 3N detail subbands; and the performing N inverse wavelet transforms on the dequantized wavelet coefficient based on a wavelet transform model to obtain a reconstructed image includes:

when performing a $t^{th}$ inverse wavelet transform, updating and predicting an approximation subband $P_{N+1-t}$ and a detail subband $I_{(N+1-t)1}$ to obtain a first processed subband and a second processed subband, and obtaining an intermediate approximation component based on the first processed subband and the second processed subband, where an odd column coefficient or an odd row coefficient of the intermediate approximation component comes from the first processed subband, and an even column coefficient or an even row coefficient of the intermediate approximation component comes from the second processed subband; updating and predicting a detail subband $I_{(N+1-t)2}$ and a detail subband $I_{(N+1-t)3}$ to obtain a third processed subband and a fourth processed subband, and obtaining an intermediate detail component based on the third processed subband and the fourth processed subband, where an odd column coefficient or an odd row coefficient of the intermediate detail component comes from the third processed subband, and an even column coefficient or an even row coefficient of the intermediate detail component comes from the fourth processed subband; and updating and predicting the intermediate detail component and the intermediate approximation component to obtain a fifth processed subband and a sixth processed subband, and obtaining an approximation subband $P_{t-1}$ based on the fifth processed subband and the sixth processed subband, where an odd row coefficient or an odd column coefficient of the approximation subband $P_{t-1}$ comes from the fifth processed subband, and an even row coefficient or an even column coefficient of the approximation subband $P_{t-1}$ comes from the sixth processed subband, where resolutions of the detail subband $I_{(N+1-t)1}$, the detail subband $I_{(N+1-t)2}$, and the detail subband $I_{(N+1-t)3}$ are the same as a resolution of the approximation subband $P_{N+1-t}$, and when the $t^{th}$ inverse wavelet transform is a last wavelet transform, the approximation subband $P_{t-1}$ is the reconstructed image.

Figure 24:
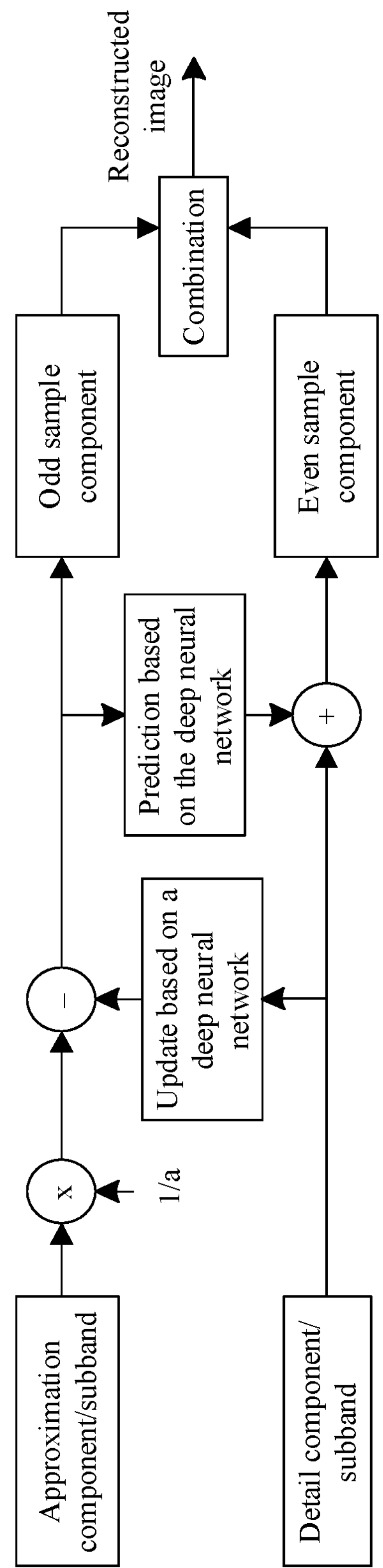
FIG. 24 is a schematic diagram of an image decoding architecture according to an embodiment of the present disclosure.

Specifically, the wavelet transform model includes an update model and a prediction model. As shown in FIG. 24, when the $t^{th}$ inverse wavelet transform is performed, a first scaled component is obtained based on the approximation subband $P_{N+1-t}$, where each coefficient in the first scaled component is 1/a of a coefficient at a corresponding position in the approximation subband $P_{N+1-t}$. A second scaled component is obtained based on the detail subband $I_{(N+1-t)1}$, where each coefficient in the second scaled component is 1/b of a coefficient at a corresponding position in the detail subband, and an update is performed based on the update model by using the second scaled component, to obtain an updated component. A first processed component (that is, an odd sample component) is obtained based on the updated component and the first scaled component, where each coefficient in the first processed component is a difference between coefficients at corresponding positions in the first scaled component and the updated component. A prediction is performed based on the prediction model by using the first processed component, to obtain a predicted component. A second processed component (that is, an even sample component) is obtained based on the second scaled component and the predicted component, where each coefficient in the second processed component is a sum of coefficients at corresponding positions in the second scaled component and the predicted component. An intermediate approximation component is obtained based on the first processed component and the second processed component, where an odd row coefficient or an odd column coefficient of the intermediate approximation component comes from the first processed component, and an even row coefficient or an even column coefficient of the intermediate approximation component comes from the second processed component. In other words, the odd row coefficient or the odd column coefficient in the intermediate approximation component comes from a part or an entirety of the first processed component, and the even row coefficient or the even column coefficient in the intermediate approximation component comes from a part or an entirety of the second processed component.

According to the foregoing method, the detail subband $I_{(N+1-t)2}$ and the detail subband $I_{(N+1-t)3}$ are updated and predicted to obtain a third processed component and a fourth processed component, and an intermediate detail component is obtained based on the third processed component and the fourth processed component, where an odd row coefficient or an odd column coefficient of the intermediate detail component comes from the third processed component, and an even row coefficient or an even column coefficient of the intermediate detail component comes from the fourth processed component. In other words, the odd row coefficient or the odd column coefficient in the intermediate detail component is a part or an entirety of the third processed component, and the even row coefficient or the even column coefficient in the intermediate detail component is a part or an entirety of the fourth processed component.

According to the foregoing method, the intermediate approximation component and the intermediate detail component are updated and predicted to obtain a fifth processed component and a sixth processed component, and an approximation subband $P_{N-t}$ is obtained based on the fifth processed component and the sixth processed component, where an odd column coefficient or an odd row coefficient of the approximation subband $P_{N-t}$ comes from the fifth processed component, and an even column coefficient or an even row coefficient of the approximation subband $P_{N-t}$ comes from the sixth processed component. In other words, the odd column coefficient or the odd row coefficient in the approximation subband $P_{N-t}$ is a part or an entirety of the fifth processed component, and the even column coefficient or the even row coefficient in the approximation subband $P_{N-t}$ is a part or an entirety of the sixth processed component.

Figure 25:
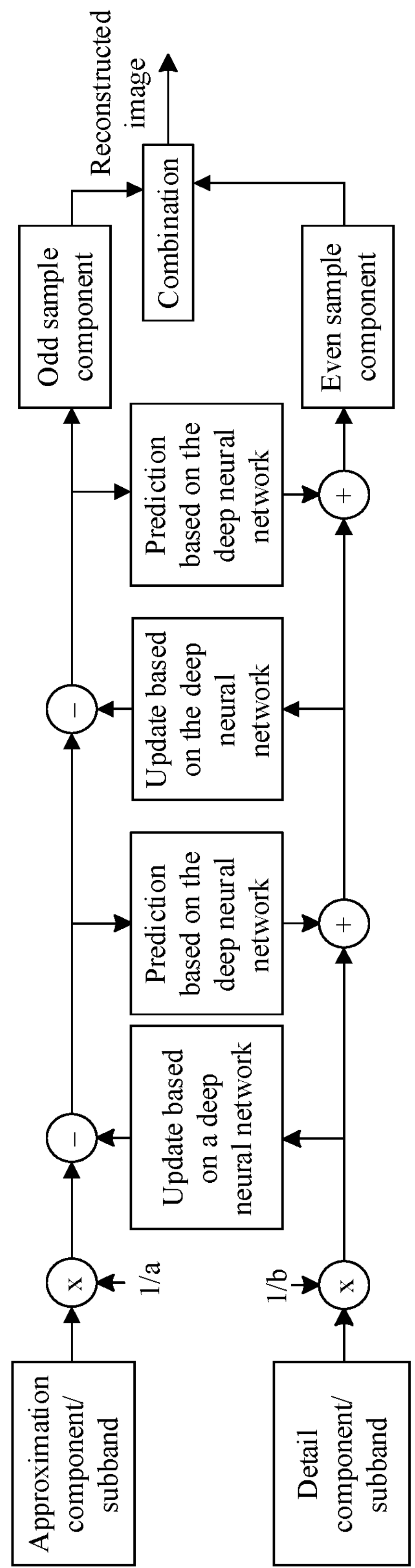
FIG. 25 is a schematic diagram of another image decoding architecture according to an embodiment of the present disclosure.

In another specific embodiment, the wavelet transform model includes an update model and a prediction model. As shown in FIG. 25, when the $t^{th}$ inverse wavelet transform is performed, a first scaled component is obtained based on the approximation subband $P_{N+1-t}$, and a second scaled component is obtained based on the detail subband $I_{(+1-t)1}$, where each coefficient in the first scaled component is 1/a of a coefficient at a corresponding position in the approximation subband $P_{N+1-t}$, and each coefficient in the second scaled component is 1/b of a coefficient at a corresponding position in the detail subband $I_{(+1-t)1}$. An update is performed based on the update model by using the second scaled component, to obtain a first updated component. An auxiliary predicted component is obtained based on the first updated component and the first scaled component, where each coefficient in the auxiliary predicted component is a difference between coefficients at corresponding positions in the first scaled component and the first updated component. A prediction is performed based on the prediction model by using the auxiliary predicted component, to obtain a first predicted component. An auxiliary updated component is obtained based on the second scaled component and the first predicted component, where each coefficient in the auxiliary updated component is a sum of coefficients at corresponding positions in the second scaled component and the first predicted component. An update is performed based on the update model by using the auxiliary updated component, to obtain a second updated component, and a first processed component (that is, an odd sample component) is obtained based on the auxiliary predicted component and the second updated component, where each coefficient in the first processed component is a difference between coefficients at corresponding positions in the first predicted component and the second updated component. A prediction is performed based on the prediction model by using the first processed component, to obtain a second predicted component. A second processed component (that is, an even sample component) is obtained based on the second predicted component and the auxiliary updated component, where each coefficient in the second processed component is a sum of coefficients at corresponding positions in the second predicted component and the auxiliary updated component.

An intermediate approximation component is obtained based on the first processed component and the second processed component, where an odd row coefficient or an odd column coefficient of the intermediate approximation component comes from the first processed component, and an even row coefficient or an even column coefficient of the intermediate approximation component comes from the second processed component. In other words, the odd row coefficient or the odd column coefficient in the intermediate approximation component comes from a part or an entirety of the first processed component, and the even row coefficient or the even column coefficient in the intermediate approximation component comes from a part or an entirety of the second processed component.

According to the foregoing method, the detail subband $I_{(N+1-t)2}$ and the detail subband $I_{(N+1-t)3}$ are updated and predicted to obtain a third processed component and a fourth processed component, and an intermediate detail component is obtained based on the third processed component and the fourth processed component, where an odd row coefficient or an odd column coefficient of the intermediate detail component comes from the third processed component, and an even row coefficient or an even column coefficient of the intermediate detail component comes from the fourth processed component. In other words, the odd row coefficient or the odd column coefficient in the intermediate detail component is a part or an entirety of the third processed component, and the even row coefficient or the even column coefficient in the intermediate detail component is a part or an entirety of the fourth processed component.

According to the foregoing method, the intermediate approximation component and the intermediate detail component are updated and predicted to obtain a fifth processed component and a sixth processed component, and an approximation subband $P_{N-t}$ is obtained based on the fifth processed component and the sixth processed component, where an odd column coefficient or an odd row coefficient of the approximation subband $P_{N-t}$ comes from the fifth processed component, and an even column coefficient or an even row coefficient of the approximation subband $P_{N-t}$ comes from the sixth processed component. In other words, the odd column coefficient or the odd row coefficient in the approximation subband $P_{N-t}$ is a part or an entirety of the fifth processed component, and the even column coefficient or the even row coefficient in the approximation subband $P_{N-t}$ is a part or an entirety of the sixth processed component.

When t is equal to N, the approximation subband $P_{N-t}$ is the reconstructed image.

It should be noted herein that t may further start from 0. In this case, a maximum value of t is N−1. For example, when t is equal to N−1, the approximation subband $P_{N-t}$ is the reconstructed image.

It should be noted herein that, as can be learned from FIG. 24 and FIG. 25, the inverse wavelet transform process shown in FIG. 25 includes one more prediction and update process than that shown in FIG. 24. It can be considered that FIG. 24 includes one prediction and update process, and FIG. 25 includes two prediction and update processes. Certainly, a quantity of updates and predictions may alternatively be another value. The quantity of updates and predictions is not limited in this application.

It should be noted herein that, in the process of performing the N inverse wavelet transforms, parameters of the prediction model used for each inverse wavelet transform may be the same, and parameters of the prediction model used may also be different.

S2304. Perform post-processing on the reconstructed image based on a post-processing model to obtain a processed reconstructed image.

The post-processing model is implemented based on the deep neural network.

Figure 26:
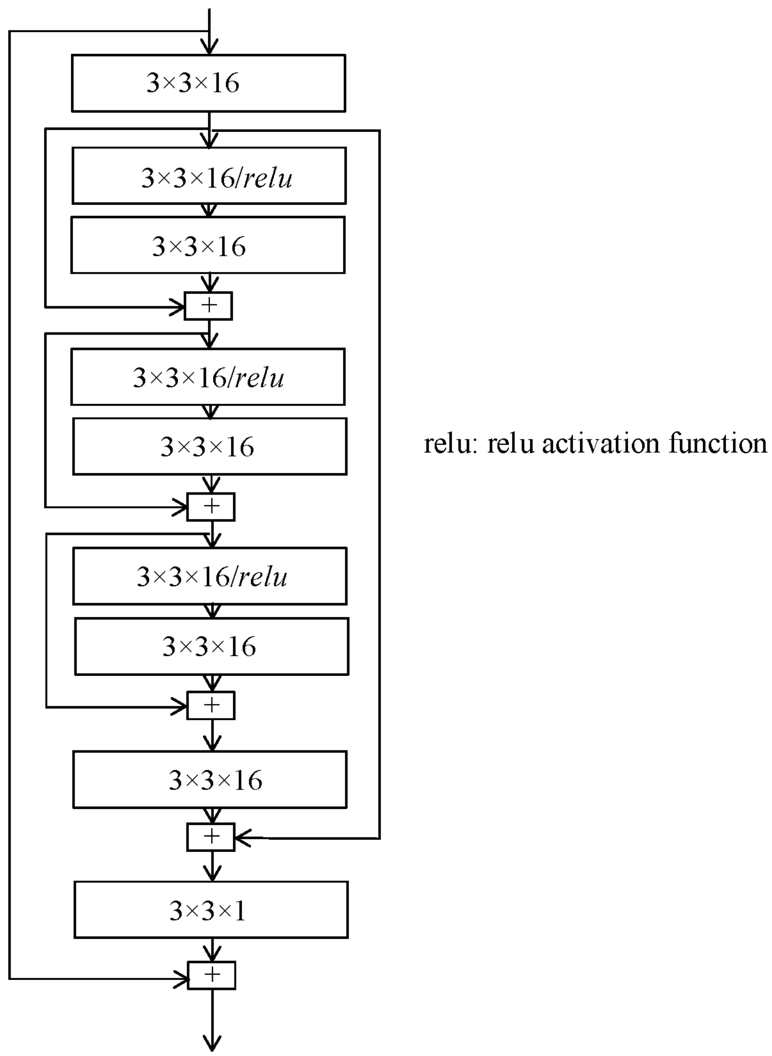
FIG. 26 is a schematic framework diagram of a post-processing model based on a deep neural network according to an embodiment of the present disclosure.

A purpose of the post-processing based on the deep neural network is to improve quality of the reconstructed image. Specifically, the reconstructed image is input into the post-processing model implemented based on the deep neural network, and an output of the post-processing model is the processed reconstructed image, that is, an image whose quality is improved. FIG. 26 is a schematic diagram of a structure of a typical post-processing model. In FIG. 26, "3×3×16" indicates that a current convolution layer uses a 3×3 convolution kernel to generate 16 feature maps, and does not use an activation function; and "3×3×16/relu" indicates that a current convolution layer uses a 3×3 convolution kernel to generate 16 feature maps, and uses an activation function relu.

It should be noted herein that the post-processing model shown in FIG. 26 is merely an example. The post-processing model may alternatively be implemented based on a deep neural network in another form.

It should be noted herein that, in the encoding and decoding processes, the entropy encoding model and the entropy decoding model are also a same model.

It can be learned that, in the solution of this application, in the image encoding/decoding method based on the conventional wavelet transform, the wavelet transform model obtained based on the deep neural network is used to perform the wavelet transform and the inverse wavelet transform. Because the wavelet transform model based on the deep neural network is obtained through optimization by using a large quantity of natural images by using a training method, the wavelet transform model can provide a more compact transform domain expression than the conventional wavelet transform, thereby significantly improving encoding/decoding performance. When a function of the wavelet transform model is implemented by using a GPU, the wavelet transform model has a same speed as the conventional wavelet transform. Compared with an adaptive directional wavelet that selects an optimal direction parameter through a plurality of encoding attempts, the wavelet transform model has an advantage of low time complexity and resolves a contradiction between diversity and complexity of natural image features and ideality and simplicity of artificially designed wavelet basis functions. In addition, because the entropy encoding/decoding model and the post-processing model based on the deep neural network are used, encoding/decoding performance is further improved.

Figure 27:
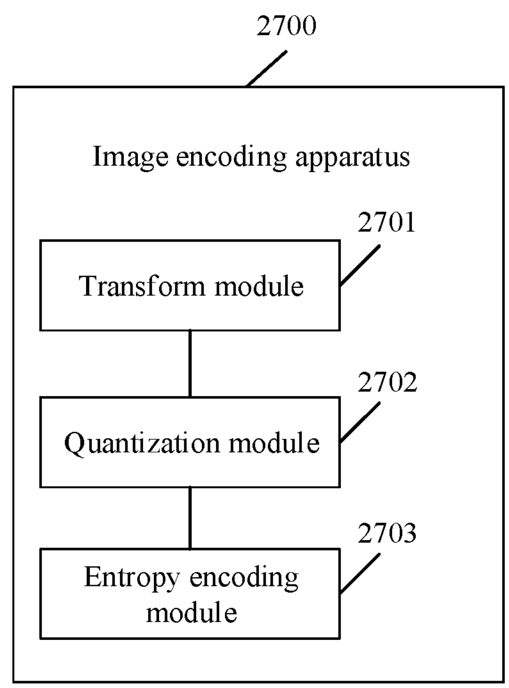
FIG. 27 is a schematic diagram of a structure of an image encoding apparatus according to an embodiment of the present disclosure.

FIG. 27 is a schematic diagram of a structure of an image encoding apparatus based on a wavelet transform according to an embodiment of the present disclosure. As shown in FIG. 27, the image encoding apparatus 2700 includes:

a transform module 2701, configured to perform N wavelet transforms on a to-be-encoded image based on a wavelet transform model to obtain a wavelet coefficient, where the wavelet transform model is implemented based on a convolutional neural network (CNN), and N is an integer greater than 0;

a quantization module 2702, configured to quantize the wavelet coefficient to obtain a quantized wavelet coefficient; and an entropy encoding module 2703, configured to perform entropy encoding on the quantized wavelet coefficient to obtain a compressed bitstream.

In a feasible embodiment, the transform module 2701 is specifically configured to:

when performing an ith wavelet transform, decompose a subband X to obtain an odd sample component and an even sample component, where the odd sample component includes an odd row coefficient or an odd column coefficient in the subband X, and the even sample component includes an even row coefficient or an even column coefficient in the subband X;

perform an update operation and a prediction operation on the even sample component and the odd sample component to obtain an intermediate approximation component and an intermediate detail component;

decompose the intermediate approximation component to obtain a first sample component and a second sample component, where the first sample component includes an odd column coefficient or an odd row coefficient of the intermediate approximation component, and the second sample component includes an even column coefficient or an even row coefficient of the intermediate approximation component;

decompose the intermediate detail component to obtain a third sample component and a fourth sample component, where the third sample component includes an odd row coefficient or an odd column coefficient of the intermediate detail component, and the fourth sample component includes an even column coefficient or an even row coefficient of the intermediate detail component;

perform the update operation and the prediction operation on the first sample component and the second sample component to obtain an approximation subband Pi and a detail subband Ii1; and perform the update operation and the prediction operation on the third sample component and the fourth sample component to obtain a detail subband Ii2 and a detail subband Ii3, where the wavelet coefficient includes the approximation subband $P_i$, the detail subband $I_{i1}$, the detail subband $I_{i2}$, and the detail subband $I_{i3}$; and when the $i^{th}$ wavelet transform is a first wavelet transform, the subband X is the to-be-encoded image; or when the $i^{th}$ wavelet transform is not a first wavelet transform, the subband X is an approximation subband $P_{i-1}$, and the approximation subband $P_{i-1}$ is an approximation subband obtained by performing an $(i-1)^{th}$ wavelet transform.

In a feasible embodiment, the prediction operation is implemented based on the CNN; the update operation is implemented based on the CNN; or both the prediction operation and the update operation are implemented based on the CNN.

In a feasible embodiment, the entropy encoding module 2703 is specifically configured to:

encode the quantized wavelet coefficient based on an entropy encoding model to obtain the compressed bitstream, where the entropy encoding model is implemented based on a deep neural network.

In a feasible embodiment, the wavelet coefficient includes 3N+1 subbands, and the entropy encoding module 2703 is specifically configured to:

input an $s^{th}$ subband into the entropy encoding model to obtain a parameter of a cumulative probability distribution function of a to-be-encoded coefficient through calculation, where the to-be-encoded coefficient is any coefficient in the $s^{th}$ subband, and the $s^{th}$ subband is any one of the 3N+1 subbands; obtain the cumulative probability distribution function based on the parameter of the cumulative probability distribution function of the to-be-encoded coefficient; obtain a probability distribution of the to-be-encoded coefficient based on the to-be-encoded coefficient and the cumulative probability distribution function of the to-be-encoded coefficient; and perform entropy encoding on the to-be-encoded coefficient based on the probability distribution of the to-be-encoded coefficient by using an arithmetic encoder, to obtain a bitstream corresponding to the to-be-encoded coefficient, where the compressed bitstream includes the bitstream corresponding to the to-be-encoded coefficient.

In a feasible embodiment, when the $s^{th}$ subband is a first subband of the 3N+1 subbands, the entropy encoding model is implemented based on a pixel convolutional neural network (pixelCNN), the entropy encoding model includes M convolution layers, M is an integer greater than 0, and when inputting the $s^{th}$ subband into the entropy encoding model to obtain the parameter of the cumulative probability distribution function of the to-be-encoded coefficient through calculation, the entropy encoding module 2703 is specifically configured to:

when M is equal to 1, perform, based on a window function corresponding to a first convolution layer, a windowing operation on a convolution kernel corresponding to the first convolution layer, to obtain a first windowed convolution kernel; and perform a convolution operation on the $s^{th}$ subband based on the first windowed convolution kernel to obtain the parameter of the cumulative probability distribution function of the to-be-encoded coefficient; or when M is greater than 1, during an operation of a $j^{th}$ convolution layer, perform, based on a window function corresponding to the $j^{th}$ convolution layer, a windowing operation on a convolution kernel corresponding to the $j^{th}$ convolution layer, to obtain a second windowed convolution kernel; and perform a convolution operation on input data of the $j^{th}$ convolution layer based on the second windowed convolution kernel to obtain $j^{th}$ output data, where when j is equal to 1, the input data of the $j^{th}$ convolution layer is the first subband; when j is greater than 1 and not greater than M, the input data of the $j^{th}$ convolution layer is output data of a $(j-1)^{th}$ convolution layer; or when j is equal to M, the $j^{th}$ output data includes the parameter of the cumulative probability distribution function of the to-be-encoded coefficient.

In a feasible embodiment, when the $s^{th}$ subband is not a first subband of the 3N+1 subbands, the entropy encoding model includes a first entropy encoding model, a second entropy encoding model, and a third entropy encoding model, both the first entropy encoding model and the second entropy encoding model are implemented based on a pixel convolutional neural network, the third entropy encoding model is implemented based on an RNN, the first entropy encoding model includes T1 convolution layers, the second entropy encoding model includes T2 convolution layers, both T1 and T2 are integers greater than 0, and when inputting the $s^{th}$ subband into the entropy encoding model to obtain the parameter of the cumulative probability distribution function of the to-be-encoded coefficient through calculation, the entropy encoding module 2703 is specifically configured to:

input an $(s-1)^{th}$ subband into the third entropy encoding model for calculation, to obtain a first output result, where the first output result is input data of the second entropy encoding model, and the $s^{th}$ subband is input data of the first entropy encoding model; and when both T1 and T2 are equal to 1, perform a combination operation on the first output result and the $s^{th}$ subband based on a convolution layer C1 and a convolution layer C2 to obtain a second output result, where the second output result is the parameter of the cumulative probability distribution function of the to-be-encoded coefficient, and the convolution layer C1 and the convolution layer C2 are convolution layers in the first entropy encoding model and the second entropy encoding model respectively; or when T1 is greater than 1 and T2 is equal to 1, perform a combination operation on the first output result and the $s^{th}$ subband based on a convolution layer C1 and a convolution layer C2 to obtain a second output result, where the convolution layer C1 is a $q^{th}$ convolution layer in the first entropy encoding model, the convolution layer C2 is a convolution layer in the second entropy encoding model, and if q is equal to T1, the second output result is the parameter of the cumulative probability distribution function of the to-be-encoded coefficient, or if q is greater than 0 and less than T1, the second output result is input data of a $(q+1)^{th}$ convolution layer in the first entropy encoding model; or when both T1 and T2 are greater than 1, perform a combination operation on the first output result and the $s^{th}$ subband based on a convolution layer C1 and a convolution layer C2 to obtain a second output result, where the convolution layer C1 is a $q1^{th}$ convolution layer in the first entropy encoding model, the convolution layer C2 is a $q2^{th}$ convolution layer in the second entropy encoding model, and if q1 is equal to T1 and q2 is equal to T2, the second output result is the parameter of the cumulative probability distribution function of the to-be-encoded coefficient, or if q1 is greater than 0 and less than T1 and q2 is greater than 0 and less than T2, the second output result is input data of a $(q1+1)^{th}$ convolution layer in the first entropy encoding model, and an output result of the convolution layer C2 is input data of a $(q2+1)^{th}$ convolution layer in the second entropy encoding model.

In a feasible embodiment, when a resolution of the $(s-1)^{th}$ subband is different from a resolution of the $s^{th}$ subband, when inputting the $(s-1)^{th}$ subband into the third entropy encoding model for calculation, to obtain the first output result, the entropy encoding module 2703 is specifically configured to:

perform a convolution operation on the $(s-1)^{th}$ subband based on the third entropy encoding model and a state variable of the third entropy encoding model to obtain a convolution result; and perform upsampling on the convolution result to obtain the first output result, where a resolution of the first output result is the same as the resolution of the $s^{th}$ subband; and after performing upsampling on the convolution result to obtain the first output result, the entropy encoding module 2703 is further configured to:

perform upsampling on a convolved state variable to obtain a sampled state variable, where a resolution of the sampled state variable is the same as the resolution of the $s^{th}$ subband.

In a feasible embodiment, when performing the combination operation on the first output result and the $s^{th}$ subband based on the convolution layer C1 and the convolution layer C2, the entropy encoding module 2703 is specifically configured to:

perform a windowing operation on a first convolution kernel based on a first window function to obtain a windowed first convolution kernel, where the first convolution kernel is a convolution kernel corresponding to the convolution layer C1;

perform a convolution operation on first input data based on the windowed first convolution kernel to obtain a first convolution result, where when the convolution layer C1 is a first convolution layer in the first entropy encoding model, the first input data is the $s^{th}$ subband, or when the convolution layer C1 is a non-first convolution layer in the first entropy encoding model, the first input data is obtained by performing a convolution operation on the $s^{th}$ subband;

input second input data into a second sub convolution layer and perform a convolution operation to obtain a second convolution result, where when the convolution layer C2 is a first convolution layer in the second entropy encoding model, the second input data is the first output result, or when the convolution layer C2 is a non-first convolution layer in the second entropy encoding model, the second input data is obtained by performing a convolution operation on the first output result; and perform an addition or concatenation operation on the first convolution result and the second convolution result to obtain the second output result.

In a feasible embodiment, when performing the combination operation on the first output result and the $s^{th}$ subband based on the convolution layer C1 and the convolution layer C2 to obtain the second output result, the entropy encoding module 2703 is specifically configured to:

perform a windowing operation on a first convolution kernel based on a first window function to obtain a windowed first convolution kernel, where the first convolution kernel is a convolution kernel corresponding to the convolution layer C1;

perform a windowing operation on a second convolution kernel based on a second window function to obtain a windowed second convolution kernel, where the second convolution kernel is a convolution kernel corresponding to the convolution layer C2, and the first window function and the second window function are complementary to each other;

perform a convolution operation on first input data based on the windowed first convolution kernel to obtain a first convolution result, where when the convolution layer C1 is a first convolution layer in the first entropy encoding model, the first input data is the $s^{th}$ subband, or when the convolution layer C1 is a non-first convolution layer in the first entropy encoding model, the first input data is obtained by performing a convolution operation on the $s^{th}$ subband;

perform a convolution operation on second input data based on the windowed second convolution kernel to obtain a second convolution result, where when the convolution layer C2 is a first convolution layer in the second entropy encoding model, the second input data is the first output result, or when the convolution layer C2 is a non-first convolution layer in the second entropy encoding model, the second input data is obtained by performing a convolution operation on the first output result; and perform an addition or concatenation operation on the first convolution result and the second convolution result to obtain the second output result.

It should be noted that the foregoing units (the transform module 2701, the quantization module 2702, and the entropy encoding module 2703) are configured to perform related steps in the foregoing method. For example, the transform module 2701 is configured to perform related content in steps S201 and S1101, the quantization module 2702 is configured to perform related content in step S1102, and the entropy encoding module 2703 is configured to perform related content in step S1103.

In this embodiment, the image encoding apparatus 2700 is presented in a form of a module. The "module" herein may be an application-specific integrated circuit (application-specific integrated circuit, ASIC), a processor and a memory for executing one or more software or firmware programs, an integrated logic circuit, and/or another component that may provide the foregoing functions. In addition, the transform module 2701, the quantization module 2702, and the entropy encoding module 2703 may be implemented by a processor 3001 of an image encoding apparatus 3000 shown in FIG. 30.

Figure 28:
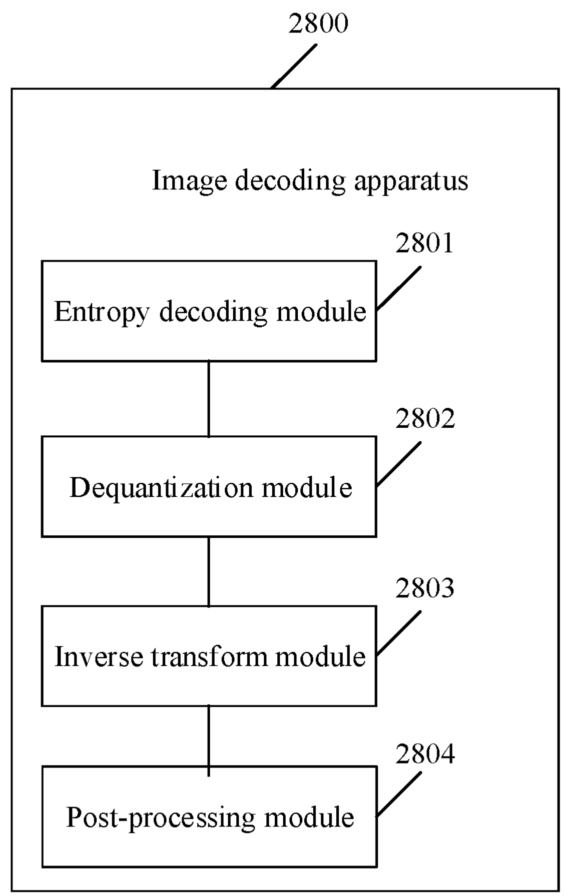
FIG. 28 is a schematic diagram of a structure of an image decoding apparatus according to an embodiment of the present disclosure.

FIG. 28 is a schematic diagram of a structure of an image decoding apparatus based on a wavelet transform according to an embodiment of the present disclosure. As shown in FIG. 28, the image decoding apparatus 2800 includes:

an entropy decoding module 2801, configured to perform entropy decoding on a compressed bitstream to obtain a reconstructed wavelet coefficient;

a dequantization module 2802, configured to dequantize the reconstructed wavelet coefficient to obtain a dequantized wavelet coefficient; and an inverse transform module 2803, configured to perform N inverse wavelet transforms on the dequantized wavelet coefficient based on a wavelet transform model to obtain a reconstructed image, where the wavelet transform model is implemented based on a convolutional neural network (CNN), and N is an integer greater than 0.

In a feasible embodiment, the entropy decoding module 2801 is specifically configured to:

perform entropy decoding on the compressed bitstream based on an entropy decoding model to obtain the reconstructed wavelet coefficient, where the entropy decoding model is implemented based on a deep neural network.

In a feasible embodiment, the entropy decoding module 2801 is specifically configured to:

input a reconstructed subband corresponding to an $s^{th}$ subband into the entropy decoding model to obtain a parameter of a cumulative probability distribution function of a to-be-decoded coefficient through calculation, where a bitstream of the to-be-decoded coefficient is a part of a bitstream of the $s^{th}$ subband, and the reconstructed subband corresponding to the $s^{th}$ subband is any one of the 3N+1 reconstructed subbands; obtain the cumulative probability distribution function of the to-be-decoded coefficient based on the parameter of the cumulative probability distribution function of the to-be-decoded coefficient; obtain a probability distribution of the to-be-decoded coefficient based on the to-be-decoded coefficient and the cumulative probability distribution function of the to-be-decoded coefficient; and perform, based on the probability distribution of the to-be-decoded coefficient, entropy decoding on the bitstream of the to-be-decoded coefficient by using an arithmetic decoder, to obtain the to-be-decoded coefficient, where the 3N+1 reconstructed subbands include the to-be-decoded coefficient.

In a feasible embodiment, when the $s^{th}$ subband is a first subband of the 3N+1 subbands, the entropy decoding model is implemented based on a pixel convolutional neural network (pixelCNN), the entropy decoding model includes M convolution layers, M is an integer greater than 0, and when inputting the reconstructed subband corresponding to the $s^{th}$ subband into the entropy decoding model to obtain the parameter of the cumulative probability distribution function of the to-be-decoded coefficient through calculation, the entropy decoding module 2801 is specifically configured to:

when M is equal to 1, perform, based on a window function corresponding to a first convolution layer, a windowing operation on a convolution kernel corresponding to the first convolution layer, to obtain a first windowed convolution kernel; and perform, based on the first windowed convolution kernel, a convolution operation on the reconstructed subband corresponding to the $s^{th}$ subband, to obtain the parameter of the cumulative probability distribution function of the to-be-decoded coefficient; or when M is greater than 1, during an operation of a jth convolution layer, perform, based on a window function corresponding to the jth convolution layer, a windowing operation on a convolution kernel corresponding to the jth convolution layer, to obtain a second windowed convolution kernel; and perform a convolution operation on input data of the jth convolution layer based on the second windowed convolution kernel to obtain jth output data, where when j is equal to 1, the input data of the jth convolution layer is a reconstructed subband corresponding to the first subband; when j is greater than 1 and not greater than M, the input data of the jth convolution layer is output data of a $(j-1)^{th}$ convolution layer; or when j is equal to M, the jth output data includes the parameter of the cumulative probability distribution function of the to-be-decoded coefficient.

In a feasible embodiment, when the $s^{th}$ subband is not a first subband of the 3N+1 subbands, the entropy decoding model includes a first entropy decoding model, a second entropy decoding model, and a third entropy decoding model, both the first entropy decoding model and the second entropy decoding model are implemented based on a pixel convolutional neural network, the third entropy decoding model is implemented based on a recurrent neural network (RNN), the first entropy decoding model includes T1 convolution layers, the second entropy decoding model includes T2 convolution layers, both T1 and T2 are integers greater than 0, and when inputting the reconstructed subband corresponding to the $s^{th}$ subband into the entropy decoding model to obtain the parameter of the cumulative probability distribution function of the to-be-decoded coefficient through calculation, the entropy decoding module 2801 is specifically configured to:

input a reconstructed subband corresponding to an $(s-1)^{th}$ subband into the third entropy decoding model for calculation, to obtain a first output result, where the reconstructed subband corresponding to the $(s-1)^{th}$ subband is obtained by performing entropy decoding on a bitstream of the $(s-1)^{th}$ subband, the first output result is input data of the second entropy decoding model, and the reconstructed subband corresponding to the $s^{th}$ subband is input data of the first entropy decoding model; and when both T1 and T2 are equal to 1, perform, based on a convolution layer C1 and a convolution layer C2, a combination operation on the first output result and the reconstructed subband corresponding to the $s^{th}$ subband, to obtain a second output result, where the second output result is the parameter of the cumulative probability distribution function of the to-be-decoded coefficient, and the convolution layer C1 and the convolution layer C2 are convolution layers in the first entropy decoding model and the second entropy decoding model respectively; or when T1 is greater than 1 and T2 is equal to 1, perform, based on a convolution layer C1 and a convolution layer C2, a combination operation on the first output result and the reconstructed subband corresponding to the $s^{th}$ subband, to obtain a second output result, where the convolution layer C1 is a $q^{th}$ convolution layer in the first entropy decoding model, the convolution layer C2 is a convolution layer in the second entropy decoding model, and if q is equal to T1, the second output result is the parameter of the cumulative probability distribution function of the to-be-decoded coefficient, or if q is greater than 0 and less than T1, the second output result is input data of a $(q+1)^{th}$ convolution layer in the first entropy decoding model; or when both T1 and T2 are greater than 1, perform, based on a convolution layer C1 and a convolution layer C2, a combination operation on the first output result and the reconstructed subband corresponding to the $s^{th}$ subband, to obtain a second output result, where the convolution layer C1 is a $q1^{th}$ convolution layer in the first entropy decoding model, the convolution layer C2 is a $q2^{th}$ convolution layer in the second entropy decoding model, and if q1 is equal to T1 and q2 is equal to T2, the second output result is the parameter of the cumulative probability distribution function of the to-be-decoded coefficient, or if q1 is greater than 0 and less than T1 and q2 is greater than 0 and less than T2, the second output result is input data of a $(q1+1)^{th}$ convolution layer in the first entropy decoding model, and an output result of the convolution layer C2 is input data of a $(q2+1)^{th}$ convolution layer in the second entropy decoding model.

In a feasible embodiment, when a resolution of the reconstructed subband corresponding to the $(s-1)^{th}$ subband is different from a resolution of the reconstructed subband corresponding to the $s^{th}$ subband, when inputting the reconstructed subband corresponding to the $(s-1)^{th}$ subband into the third entropy decoding model for calculation, to obtain the first output result, the entropy decoding module 2801 is specifically configured to:

perform, based on the third entropy decoding model and a state variable of the third entropy decoding model, a convolution operation on the reconstructed subband corresponding to the $(s-1)^{th}$ subband, to obtain a convolution result; and perform upsampling on the convolution result to obtain the first output result, where a resolution of the first output result is the same as the resolution of the reconstructed subband corresponding to the $s^{th}$ subband; and after performing upsampling on the convolution result to obtain the first output result, the entropy decoding module 2801 is specifically further configured to:

perform upsampling on a convolved state variable to obtain a sampled state variable, where a resolution of the sampled state variable is the same as the resolution of the $s^{th}$ subband.

In a feasible embodiment, when performing, based on the convolution layer C1 and the convolution layer C2, the combination operation on the first output result and the reconstructed subband corresponding to the $s^{th}$ subband, to obtain the second output result, the entropy decoding module 2801 is specifically configured to:

perform a windowing operation on a first convolution kernel based on a first window function to obtain a windowed first convolution kernel, where the first convolution kernel is a convolution kernel corresponding to the convolution layer C1;

perform a convolution operation on first input data based on the windowed first convolution kernel to obtain a first convolution result, where when the convolution layer C1 is a first convolution layer in the first entropy decoding model, the first input data is the reconstructed subband corresponding to the $s^{th}$ subband, or when the convolution layer C1 is a non-first convolution layer in the first entropy decoding model, the first input data is obtained by performing a convolution operation on the reconstructed subband corresponding to the $s^{th}$ subband;

input second input data into a second sub convolution layer and perform a convolution operation to obtain a second convolution result, where when the convolution layer C2 is a first convolution layer in the second entropy decoding model, the second input data is the first output result, or when the convolution layer C2 is a non-first convolution layer in the second entropy decoding model, the second input data is obtained by performing a convolution operation on the first output result; and perform an addition or concatenation operation on the first convolution result and the second convolution result to obtain the second output result.

In a feasible embodiment, when performing, based on the convolution layer C1 and the convolution layer C2, the combination operation on the first output result and the reconstructed subband corresponding to the $s^{th}$ subband, to obtain the second output result, the entropy decoding module 2801 is specifically configured to:

perform a windowing operation on a first convolution kernel based on a first window function to obtain a windowed first convolution kernel, where the first convolution kernel is a convolution kernel corresponding to the convolution layer C1;

perform a windowing operation on a second convolution kernel based on a second window function to obtain a windowed second convolution kernel, where the second convolution kernel is a convolution kernel corresponding to the convolution layer C2, and the first window function and the second window function are complementary to each other;

perform a convolution operation on first input data based on the windowed first convolution kernel to obtain a first convolution result, where when the convolution layer C1 is a first convolution layer in the first entropy decoding model, the first input data is the reconstructed subband corresponding to the $s^{th}$ subband, or when the convolution layer C1 is a non-first convolution layer in the first entropy decoding model, the first input data is obtained by performing a convolution operation on the reconstructed subband corresponding to the $s^{th}$ subband;

perform a convolution operation on second input data based on the windowed second convolution kernel to obtain a second convolution result, where when the convolution layer C2 is a first convolution layer in the second entropy decoding model, the second input data is the first output result, or when the convolution layer C2 is a non-first convolution layer in the second entropy decoding model, the second input data is obtained by performing a convolution operation on the first output result; and perform an addition or concatenation operation on the first convolution result and the second convolution result to obtain the second output result.

In a feasible embodiment, the inverse transform module 2803 is specifically configured to:

when performing a $t^{th}$ inverse wavelet transform, perform an update operation and a prediction operation on an approximation subband $P_{N+1-t}$ and a detail subband $I_{(N+1-t)1}$ to obtain a first processed subband and a second processed subband, and obtain an intermediate approximation component based on the first processed subband and the second processed subband, where an odd column coefficient or an odd row coefficient of the intermediate approximation component comes from the first processed subband, and an even column coefficient or an even row coefficient of the intermediate approximation component comes from the second processed subband;

perform the update operation and the prediction operation on a detail subband $I_{(N+1-t)2}$ and a detail subband $I_{(N+1-t)3}$ to obtain a third processed subband and a fourth processed subband, and obtain an intermediate detail component based on the third processed subband and the fourth processed subband, where an odd column coefficient or an odd row coefficient of the intermediate detail component comes from the third processed subband, and an even column coefficient or an even row coefficient of the intermediate detail component comes from the fourth processed subband; and perform the update operation and the prediction operation on the intermediate detail component and the intermediate approximation component to obtain a fifth processed subband and a sixth processed subband, and obtain an approximation subband $P_{t-1}$ based on the fifth processed subband and the sixth processed subband, where an odd row coefficient or an odd column coefficient of the approximation subband $P_{t-1}$ comes from the fifth processed subband, and an even row coefficient or an even column coefficient of the approximation subband $P_{t-1}$ comes from the sixth processed subband, where resolutions of the detail subband $I_{(N+1-t)1}$, the detail subband $I_{(N+1-t)2}$, and the detail subband $I_{(N+1-t)3}$ are the same as a resolution of the approximation subband $P_{N+1-t}$, and when the $t^{th}$ inverse wavelet transform is a last wavelet transform, the approximation subband $P_{t-1}$ is the reconstructed image.

In a feasible embodiment, the prediction operation is implemented based on the CNN; the update operation is implemented based on the CNN; or both the update operation and the prediction operation are implemented based on the CNN.

In a feasible embodiment, the image decoding apparatus 2800 further includes:

a post-processing module 2804, configured to perform post-processing on the reconstructed image based on a post-processing model to obtain a processed reconstructed image after the inverse transform module 2803 performs the N inverse wavelet transforms on the dequantized wavelet coefficient based on the wavelet transform model to obtain the reconstructed image, where the post-processing model is implemented based on a deep neural network.

It should be noted that the foregoing units (the entropy decoding module 2801, the dequantization module 2802, the inverse transform module 2803, and the post-processing module 2804) are configured to perform related steps in the foregoing method. For example, the entropy decoding module 2801 is configured to perform related content in steps S601 and S2301, the dequantization module 2802 is configured to perform related content in step S2302, the inverse transform module 2803 is configured to perform related content in step S2303, and the post-processing module 2804 is configured to perform related content in step S2304.

In this embodiment, the image decoding apparatus 2800 is presented in a form of a module. The "module" herein may be an application-specific integrated circuit (ASIC), a processor and a memory for executing one or more software or firmware programs, an integrated logic circuit, and/or another component that may provide the foregoing functions. In addition, the entropy decoding module 2801, the dequantization module 2802, the inverse transform module 2803, and the post-processing module 2804 may be implemented by a processor 3101 of an image decoding apparatus shown in FIG. 31.

Figure 29:
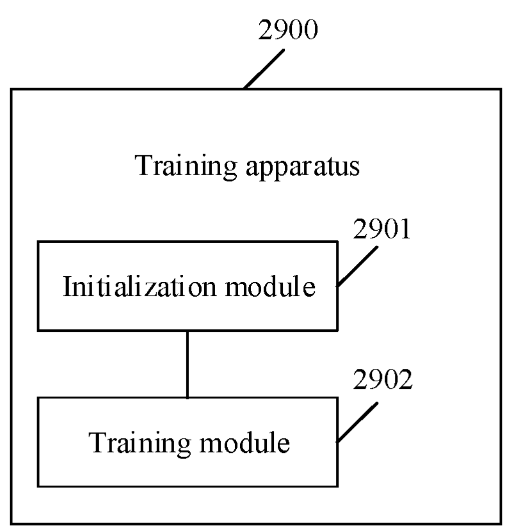
FIG. 29 is a schematic diagram of a structure of a training apparatus according to an embodiment of the present disclosure.

FIG. 29 is a schematic diagram of a structure of a training apparatus according to an embodiment of the present disclosure. As shown in FIG. 29, the training apparatus 2900 includes:

an initialization module 2901, configured to initialize a wavelet transform model; and a training module 2902, configured to: perform N wavelet transforms on a training image based on the initialized wavelet transform model to obtain 3N+1 subbands; perform inverse wavelet transforms on a first subband, a second subband, a third subband, . . . , and a $3N^{th}$ subband sequentially based on the initialized wavelet transform model to obtain 3N reconstructed images; calculate a loss value based on the training image and the 3N reconstructed images, where the loss value $L=\Sigma_{i=1}^{3N}\|R_i-I\|_2^2$, $R_i$ is an $i^{th}$ image of the 3N reconstructed images, and I is the training image; and repeat the foregoing method for several times, and if a fluctuation range of the loss value L is very small, determine that training of the wavelet transform model is completed; otherwise, continue to train the wavelet transform model according to the foregoing method.

It should be noted that the foregoing units (the initialization module 2901 and the training module 2902) are configured to perform related steps in the foregoing method.

In this embodiment, the training apparatus 2900 is presented in a form of a module. The "module" herein may be an application-specific integrated circuit (ASIC), a processor and a memory for executing one or more software or firmware programs, an integrated logic circuit, and/or another component that may provide the foregoing functions. In addition, the initialization module 2901 and the training module 2902 may be implemented by a processor 3201 of a training apparatus shown in FIG. 32.

Figure 30:
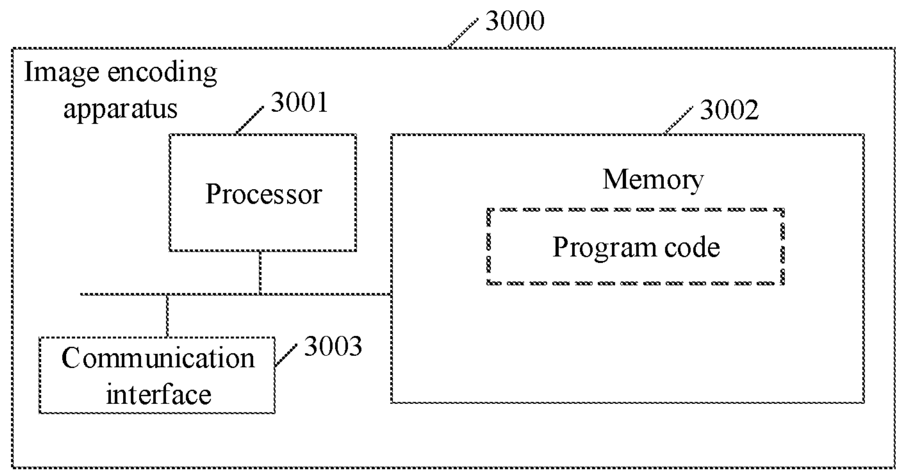
FIG. 30 is another schematic diagram of a structure of an image encoding apparatus according to an embodiment of the present disclosure.

The image encoding apparatus 3000 shown in FIG. 30 may be implemented by using a structure in FIG. 30. The image encoding apparatus 3000 includes at least one processor 3001, at least one memory 3002, and at least one communication interface 3003. The processor 3001, the memory 3002, and the communication interface 3003 are connected and communicate with each other through the communication bus.

The processor 3001 may be a general-purpose central processing unit (CPU), a microprocessor, an application-specific integrated circuit (ASIC), or one or more integrated circuits for controlling program execution of the foregoing solutions.

The communication interface 3003 is configured to communicate with another device or a communication network, such as the Ethernet, a radio access network (RAN), or a wireless local area network (WLAN).

The memory 3002 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another optical disk storage, an optical disc storage (including a compressed optical disc, a laser disc, an optical disc, a digital versatile optical disc, a Blu-ray disc, or the like), a magnetic disk storage medium or another magnetic storage device, or any other medium that can be used to carry or store expected program code in a form of an instruction or a data structure and that can be accessed by a computer. The memory 3002 is not limited thereto. The memory may exist independently, and is connected to the processor through the bus. Alternatively, the memory may be integrated with the processor.

The memory 3002 is configured to store application program code for executing the foregoing solutions, and the processor 3001 controls execution. The processor 3001 is configured to execute the application program code stored in the memory 3002.

The code stored in the memory 3002 may perform the foregoing image encoding method based on a wavelet transform, for example, performing N wavelet transforms on a to-be-encoded image based on a wavelet transform model to obtain a wavelet coefficient, where the wavelet transform model is implemented based on a convolutional neural network (CNN); quantizing the wavelet coefficient to obtain a quantized wavelet coefficient; and performing entropy encoding on the quantized wavelet coefficient to obtain a compressed bitstream.

Figure 31:
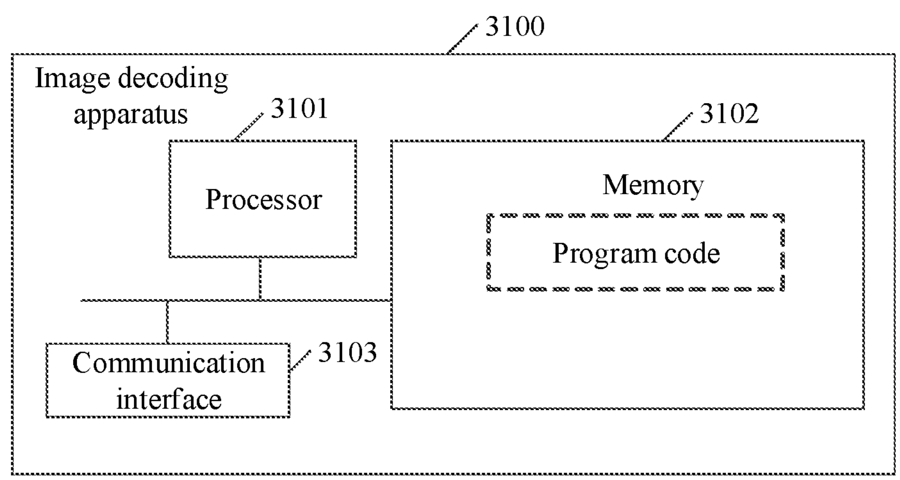
FIG. 31 is another schematic diagram of a structure of an image decoding apparatus according to an embodiment of the present disclosure.

The image decoding apparatus 3100 shown in FIG. 31 may be implemented by using a structure in FIG. 31. The image decoding apparatus 3100 includes at least one processor 3101, at least one memory 3102, and at least one communication interface 3103. The processor 3101, the memory 3102, and the communication interface 3103 are connected and communicate with each other through the communication bus.

The processor 3101 may be a general-purpose central processing unit (CPU), a microprocessor, an application-specific integrated circuit (ASIC), or one or more integrated circuits for controlling program execution of the foregoing solutions.

The communication interface 3103 is configured to communicate with another device or a communication network, such as the Ethernet, a radio access network (RAN), or a wireless local area network (WLAN).

The memory 3102 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another optical disk storage, an optical disc storage (including a compressed optical disc, a laser disc, an optical disc, a digital versatile optical disc, a Blu-ray disc, or the like), a magnetic disk storage medium or another magnetic storage device, or any other medium that can be used to carry or store expected program code in a form of an instruction or a data structure and that can be accessed by a computer. The memory 3102 is not limited thereto. The memory may exist independently, and is connected to the processor through the bus. Alternatively, the memory may be integrated with the processor.

The memory 3102 is configured to store application program code for executing the foregoing solutions, and the processor 3101 controls execution. The processor 3101 is configured to execute the application program code stored in the memory 3102.

The code stored in the memory 3102 may perform the foregoing image decoding method based on a wavelet transform, for example, performing entropy decoding on a compressed bitstream to obtain a reconstructed wavelet coefficient; dequantizing the reconstructed wavelet coefficient to obtain a dequantized wavelet coefficient; and performing N inverse wavelet transforms on the dequantized wavelet coefficient based on a wavelet transform model to obtain a reconstructed image, where the wavelet transform model is implemented based on a convolutional neural network (CNN).

Figure 32:
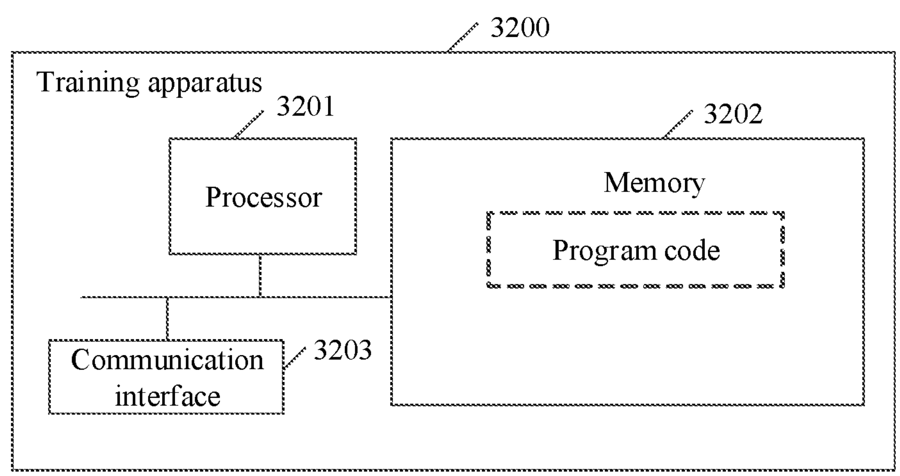
FIG. 32 is another schematic diagram of a structure of a training apparatus according to an embodiment of the present disclosure.

The training apparatus 3200 shown in FIG. 32 may be implemented by using a structure in FIG. 32. The training apparatus 3200 includes at least one processor 3201, at least one memory 3202, and at least one communication interface 3203. The processor 3201, the memory 3202, and the communication interface 3203 are connected and communicate with each other through the communication bus.

The processor 3201 may be a general-purpose CPU, a microprocessor, an ASIC, or one or more integrated circuits configured to control program execution of the foregoing solutions.

The communication interface 3203 is configured to communicate with another device or a communication network, such as the Ethernet, a RAN, or a WLAN.

The memory 3202 may be a ROM or another type of static storage device that can store static information and instructions, or a RAM or another type of dynamic storage device that can store information and instructions; or may be an EEPROM, a CD-ROM or another compact disc storage, an optical disc storage (including a compact disc, a laser disc, an optical disc, a digital versatile disc, a Blu-ray disc, or the like), a disk storage medium or another magnetic storage device, or any other medium that can be used to carry or store expected program code in a form of an instruction or a data structure and that can be accessed by a computer. However, the memory 3202 is not limited thereto. The memory may exist independently, and is connected to the processor through the bus. Alternatively, the memory may be integrated with the processor.

The memory 3202 is configured to store application program code for executing the foregoing solutions, and the processor 3201 controls execution. The processor 3201 is configured to execute the application program code stored in the memory 3202.

The code stored in the memory 3202 may perform the foregoing method for training a wavelet transform model, for example, initializing the wavelet transform model; performing N wavelet transforms on a training image based on the initialized wavelet transform model to obtain 3N+1 subbands; performing inverse wavelet transforms on a first subband, a second subband, a third subband, . . . , and a $3N^{th}$ subband sequentially based on the initialized wavelet transform model to obtain 3N reconstructed images; calculating a loss value based on the training image and the 3N reconstructed images, where the loss value $L=\sum_{i=1}^{3N}\|R_i-I\|_2^2$, $R_i$ is an $i^{th}$ image of the 3N reconstructed images, and I is the training image; and repeating the foregoing method for several times, and if a fluctuation range of the loss value L is very small, determining that training of the wavelet transform model is completed; otherwise, continuing to train the wavelet transform model according to the foregoing method.

It should be noted that, to make the description brief, the foregoing method embodiments are expressed as a series of actions. However, a person skilled in the art should appreciate that the present disclosure is not limited to the described action sequence, because according to the present disclosure, some steps may be performed in other sequences or performed simultaneously. In addition, a person skilled in the art should also appreciate that all the embodiments described in the specification are embodiments, and the related actions and modules are not necessarily mandatory to the present disclosure.

In the foregoing embodiments, the description of each embodiment has respective focuses. For a part that is not described in detail in an embodiment, refer to related descriptions in other embodiments.

In the several embodiments provided in this application, it should be understood that the disclosed apparatus may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. In addition, the indirect couplings or communication connections between the apparatuses or units may be implemented in electrical or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable memory. Based on such an understanding, the technical solutions of the present disclosure essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a read-only memory (ROM), a random access memory (RAM), a removable hard disk, a magnetic disk, or an optical disc.

A person of ordinary skill in the art may understand that all or some of the steps of the methods in the embodiments may be implemented by a program instructing relevant hardware. The program may be stored in a computer-readable memory. The memory may include a flash memory, a read-only memory (ROM), a random access memory (RAM), a magnetic disk, an optical disc, and the like.

The embodiments of the present disclosure are described in detail above. The principle and implementation of the present disclosure are described herein through specific examples. The description about the embodiments of the present disclosure is merely provided to help understand the method and core ideas of the present disclosure. In addition, a person of ordinary skill in the art can make variations and modifications to the present disclosure in terms of the specific implementations and application scopes according to the ideas of the present disclosure. Therefore, the content of this specification shall not be construed as a limit to the present disclosure.

What is claimed is:

1. An image decoding method based on a wavelet transform, the method comprising:

performing entropy decoding on a compressed bitstream to obtain a reconstructed wavelet coefficient;

dequantizing the reconstructed wavelet coefficient to obtain a dequantized wavelet coefficient; and performing N inverse wavelet transforms on the dequantized wavelet coefficient based on a wavelet transform model to obtain a reconstructed image, wherein the wavelet transform model is implemented based on a convolutional neural network (CNN), and N is an integer greater than 0;

wherein the performing entropy decoding on the compressed bitstream to obtain the reconstructed wavelet coefficient comprises:

performing entropy decoding on the compressed bitstream based on an entropy decoding model to obtain the reconstructed wavelet coefficient, wherein the entropy decoding model is implemented based on a deep neural network;

wherein the compressed bitstream comprises bitstreams of 3N+1 subbands, and the reconstructed wavelet coefficient comprises 3N+1 reconstructed subbands; and wherein the performing entropy decoding on the compressed bitstream based on the entropy decoding model to obtain the reconstructed wavelet coefficient comprises:

inputting a reconstructed subband corresponding to an $s^{th}$ subband into the entropy decoding model to obtain a parameter of a cumulative probability distribution function of a to-be-decoded coefficient through calculation, wherein a bitstream of the to-be-decoded coefficient is a part of a bitstream of the $s^{th}$ subband, and the reconstructed subband corresponding to the $s^{th}$ subband is any one of the 3N+1 reconstructed subbands;

obtaining the cumulative probability distribution function of the to-be-decoded coefficient based on the parameter of the cumulative probability distribution function of the to-be-decoded coefficient;

obtaining a probability distribution of the to-be-decoded coefficient based on the to-be-decoded coefficient and the cumulative probability distribution function of the to-be-decoded coefficient; and performing, based on the probability distribution of the to-be-decoded coefficient, entropy decoding on the bitstream of the to-be-decoded coefficient by using an arithmetic decoder, to obtain the to-be-decoded coefficient, wherein the 3N+1 reconstructed subbands comprise the to-be-decoded coefficient.

2. The method according to claim 1, wherein the $s^{th}$ subband is a first subband of the 3N+1 subbands, the entropy decoding model is implemented based on a pixel convolutional neural network (pixelCNN), the entropy decoding model comprises M convolution layers, M is an integer greater than 0, and the inputting the reconstructed subband corresponding to an sth subband into the entropy decoding model to obtain the parameter of the cumulative probability distribution function of the to-be-decoded coefficient through calculation comprises:

when M is equal to 1:

performing, based on a window function corresponding to a first convolution layer, a windowing operation on a convolution kernel corresponding to the first convolution layer, to obtain a first windowed convolution kernel; and performing, based on the first windowed convolution kernel, a convolution operation on the reconstructed subband corresponding to the $s^{th}$ subband, to obtain the parameter of the cumulative probability distribution function of the to-be-decoded coefficient;

or when M is greater than 1:

during an operation of a $j^{th}$ convolution layer, performing, based on a window function corresponding to the $j^{th}$ convolution layer, a windowing operation on a convolution kernel corresponding to the $j^{th}$ convolution layer, to obtain a second windowed convolution kernel; and performing a convolution operation on input data of the $j^{th}$ convolution layer based on the second windowed convolution kernel to obtain $j^{th}$ output data, wherein:

when j is equal to 1, the input data of the $j^{th}$ convolution layer is a reconstructed subband corresponding to the first subband; or when j is greater than 1 and not greater than M, the input data of the $j^{th}$ convolution layer is output data of a $(j-1)^{th}$ convolution layer; or when j is equal to M, the $j^{th}$ output data comprises the parameter of the cumulative probability distribution function of the to-be-decoded coefficient.

3. The method according to claim 1, wherein the $s^{th}$ subband is not a first subband of the 3N+1 subbands, wherein the entropy decoding model comprises a first entropy decoding model, a second entropy decoding model, and a third entropy decoding model, wherein both the first entropy decoding model and the second entropy decoding model are implemented based on a pixel convolutional neural network, wherein the third entropy decoding model is implemented based on a recurrent neural network (RNN), wherein the first entropy decoding model comprises TI convolution layers, the second entropy decoding model comprises T2 convolution layers, both T1 and T2 are integers greater than 0, and wherein the inputting the reconstructed subband corresponding to an $s^{th}$ subband into the entropy decoding model to obtain the parameter of the cumulative probability distribution function of the to-be-decoded coefficient through calculation comprises:

inputting a reconstructed subband corresponding to an $(s-1)^{th}$ subband into the third entropy decoding model for calculation, to obtain a first output result, wherein the reconstructed subband corresponding to the $(s-1)^{th}$ subband is obtained by performing entropy decoding on a bitstream of the $(s-1)^{th}$ subband, the first output result is input data of the second entropy decoding model, and the reconstructed subband corresponding to the $s^{th}$ subband is input data of the first entropy decoding model; and wherein:

when both T1 and T2 are equal to 1, performing, based on a convolution layer C1 and a convolution layer C2, a combination operation on the first output result and the reconstructed subband corresponding to the $s^{th}$ subband, to obtain a second output result, wherein the second output result is the parameter of the cumulative probability distribution function of the to-be-decoded coefficient, and the convolution layer C1 and the convolution layer C2 are convolution layers in the first entropy decoding model and the second entropy decoding model respectively; or when T1 is greater than 1 and T2 is equal to 1, performing, based on a convolution layer C1 and a convolution layer C2, a combination operation on the first output result and the reconstructed subband corresponding to the $s^{th}$ subband, to obtain a second output result, wherein the convolution layer C1 is a $q^{th}$ convolution layer in the first entropy decoding model, the convolution layer C2 is a convolution layer in the second entropy decoding model, and if q is equal to T1, the second output result is the parameter of the cumulative probability distribution function of the to-be-decoded coefficient, or if q is greater than 0 and less than T1, the second output result is input data of a $(q+1)^{th}$ convolution layer in the first entropy decoding model; or when both T1 and T2 are greater than 1, performing, based on a convolution layer C1 and a convolution layer C2, a combination operation on the first output result and the reconstructed subband corresponding to the $s^{th}$ subband, to obtain a second output result, wherein the convolution layer C1 is a $q1^{th}$ convolution layer in the first entropy decoding model, the convolution layer C2 is a $q2^{th}$ convolution layer in the second entropy decoding model, and if q1 is equal to T1 and q2 is equal to T2, the second output result is the parameter of the cumulative probability distribution function of the to-be-decoded coefficient, or if q1 is greater than 0 and less than T1 and q2 is greater than 0 and less than T2, the second output result is input data of a $(q1+1)^{th}$ convolution layer in the first entropy decoding model, and an output result of the convolution layer C2 is input data of a $(q2+1)^{th}$ convolution layer in the second entropy decoding model.

4. The method according to claim 3, wherein a resolution of the reconstructed subband corresponding to the $(s-1)^{th}$ subband is different from a resolution of the reconstructed subband corresponding to the $s^{th}$ subband, and wherein the inputting the reconstructed subband corresponding to an $(s-1)^{th}$ subband into the third entropy decoding model for calculation, to obtain the first output result comprises:

performing, based on the third entropy decoding model and a state variable of the third entropy decoding model, a convolution operation on the reconstructed subband corresponding to the $(s-1)^{th}$ subband, to obtain a convolution result;

performing upsampling on the convolution result to obtain the first output result, wherein a resolution of the first output result is the same as the resolution of the reconstructed subband corresponding to the $s^{th}$ subband; and after the performing upsampling on the convolution result to obtain the first output result, performing upsampling on a convolved state variable to obtain a sampled state variable, wherein a resolution of the sampled state variable is the same as the resolution of the $s^{th}$ subband.

5. The method according to claim 3, wherein the performing, based on the convolution layer C1 and the convolution layer C2, the combination operation on the first output result and the reconstructed subband corresponding to the $s^{th}$ subband, to obtain the second output result comprises:

performing a windowing operation on a first convolution kernel based on a first window function to obtain a windowed first convolution kernel, wherein the first convolution kernel is a convolution kernel corresponding to the convolution layer C1;

performing a convolution operation on first input data based on the windowed first convolution kernel to obtain a first convolution result, wherein when the convolution layer C1 is a first convolution layer in the first entropy decoding model, the first input data is the reconstructed subband corresponding to the $s^{th}$ subband, or when the convolution layer C1 is a non-first convolution layer in the first entropy decoding model, the first input data is obtained by performing a convolution operation on the reconstructed subband corresponding to the $s^{th}$ subband;

inputting second input data into the convolution layer C2 and performing a convolution operation to obtain a second convolution result, wherein when the convolution layer C2 is a first convolution layer in the second entropy decoding model, the second input data is the first output result, or when the convolution layer C2 is a non-first convolution layer in the second entropy decoding model, the second input data is obtained by performing a convolution operation on the first output result; and performing an addition or concatenation operation on the first convolution result and the second convolution result to obtain the second output result.

6. The method according to claim 3, wherein the performing, based on the convolution layer C1 and the convolution layer C2, the combination operation on the first output result and the reconstructed subband corresponding to the sth subband, to obtain the second output result comprises:

performing a windowing operation on a first convolution kernel based on a first window function to obtain a windowed first convolution kernel, wherein the first convolution kernel is a convolution kernel corresponding to the convolution layer C1;

performing a windowing operation on a second convolution kernel based on a second window function to obtain a windowed second convolution kernel, wherein the second convolution kernel is a convolution kernel corresponding to the convolution layer C2, and the first window function and the second window function are complementary to each other;

performing a convolution operation on first input data based on the windowed first convolution kernel to obtain a first convolution result, wherein when the convolution layer C1 is a first convolution layer in the first entropy decoding model, the first input data is the reconstructed subband corresponding to the $s^{th}$ subband, or when the convolution layer C1 is a non-first convolution layer in the first entropy decoding model, the first input data is obtained by performing a convolution operation on the reconstructed subband corresponding to the $s^{th}$ subband;

performing a convolution operation on second input data based on the windowed second convolution kernel to obtain a second convolution result, wherein when the convolution layer C2 is a first convolution layer in the second entropy decoding model, the second input data is the first output result, or when the convolution layer C2 is a non-first convolution layer in the second entropy decoding model, the second input data is obtained by performing a convolution operation on the first output result; and performing an addition or concatenation operation on the first convolution result and the second convolution result to obtain the second output result.

7. The method according to claim 1, wherein the performing N inverse wavelet transforms on the dequantized wavelet coefficient based on the wavelet transform model to obtain the reconstructed image comprises:

when performing a $t^{th}$ inverse wavelet transform, performing an update operation and a prediction operation on an approximation subband $P_{N+1-t}$ and a detail subband $I_{(N+1-t)1}$ to obtain a first processed subband and a second processed subband, and obtaining an intermediate approximation component based on the first processed subband and the second processed subband, wherein an odd column coefficient or an odd row coefficient of the intermediate approximation component comes from the first processed subband, and an even column coefficient or an even row coefficient of the intermediate approximation component comes from the second processed subband;

performing the update operation and the prediction operation on a detail subband $I_{(N+1-t)2}$ and a detail subband $I_{(N+1-t)3}$ to obtain a third processed subband and a fourth processed subband, and obtaining an intermediate detail component based on the third processed subband and the fourth processed subband, wherein an odd column coefficient or an odd row coefficient of the intermediate detail component comes from the third processed subband, and an even column coefficient or an even row coefficient of the intermediate detail component comes from the fourth processed subband; and performing the update operation and the prediction operation on the intermediate detail component and the intermediate approximation component to obtain a fifth processed subband and a sixth processed subband, and obtaining an approximation subband $P_{t-1}$ based on the fifth processed subband and the sixth processed subband, wherein an odd row coefficient or an odd column coefficient of the approximation subband $P_{t-1}$ comes from the fifth processed subband, and an even row coefficient or an even column coefficient of the approximation subband Pt-1 comes from the sixth processed subband, wherein resolutions of the detail subband $I_{(N+1-t)1}$, the detail subband $I_{(N+1-t)2}$, and the detail subband $I_{(N+1-t)3}$ are the same as a resolution of the approximation subband $P_{N+1-t}$, and when the $t^{th}$ inverse wavelet transform is a last wavelet transform, the approximation subband $P_{t-1}$ is the reconstructed image.

8. An apparatus, comprising:

at least one processor; and one or more memories coupled to the at least one processor and storing programming instructions for execution by the at least one processor to cause the apparatus to:

perform entropy decoding on a compressed bitstream to obtain a reconstructed wavelet coefficient;

dequantize the reconstructed wavelet coefficient to obtain a dequantized wavelet coefficient; and perform N inverse wavelet transforms on the dequantized wavelet coefficient based on a wavelet transform model to obtain a reconstructed image, wherein the wavelet transform model is implemented based on a convolutional neural network (CNN), and N is an integer greater than 0;

wherein the performing entropy decoding on the compressed bitstream to obtain the reconstructed wavelet coefficient comprises:

performing entropy decoding on the compressed bitstream based on an entropy decoding model to obtain the reconstructed wavelet coefficient, wherein the entropy decoding model is implemented based on a deep neural network;

wherein the compressed bitstream comprises bitstreams of 3N+1 subbands, and the reconstructed wavelet coefficient comprises 3N+1 reconstructed subbands; and wherein the performing entropy decoding on the compressed bitstream based on the entropy decoding model to obtain the reconstructed wavelet coefficient comprises:

inputting a reconstructed subband corresponding to an $s^{th}$ subband into the entropy decoding model to obtain a parameter of a cumulative probability distribution function of a to-be-decoded coefficient through calculation, wherein a bitstream of the to-be-decoded coefficient is a part of a bitstream of the $s^{th}$ subband, and the reconstructed subband corresponding to the $s^{th}$ subband is any one of the 3N+1 reconstructed subbands;

obtaining the cumulative probability distribution function of the to-be-decoded coefficient based on the parameter of the cumulative probability distribution function of the to-be-decoded coefficient;

obtaining a probability distribution of the to-be-decoded coefficient based on the to-be-decoded coefficient and the cumulative probability distribution function of the to-be-decoded coefficient; and performing, based on the probability distribution of the to-be-decoded coefficient, entropy decoding on the bitstream of the to-be-decoded coefficient by using an arithmetic decoder, to obtain the to-be-decoded coefficient, wherein the 3N+1 reconstructed subbands comprise the to-be-decoded coefficient.

9. The apparatus according to claim 8, wherein the $s^{th}$ subband is a first subband of the 3N+1 subbands, the entropy decoding model is implemented based on a pixel convolutional neural network (pixelCNN), the entropy decoding model comprises M convolution layers, M is an integer greater than 0, and the inputting the reconstructed subband corresponding to the $s^{th}$ subband into the entropy decoding model to obtain the parameter of the cumulative probability distribution function of the to-be-decoded coefficient through calculation comprises:

when M is equal to 1:

performing, based on a window function corresponding to a first convolution layer, a windowing operation on a convolution kernel corresponding to the first convolution layer, to obtain a first windowed convolution kernel; and performing, based on the first windowed convolution kernel, a convolution operation on the reconstructed subband corresponding to the $s^{th}$ subband, to obtain the parameter of the cumulative probability distribution function of the to-be-decoded coefficient;

or when M is greater than 1:

during an operation of a $j^{th}$ convolution layer, performing, based on a window function corresponding to the $j^{th}$ convolution layer, a windowing operation on a convolution kernel corresponding to the $j^{th}$ convolution layer, to obtain a second windowed convolution kernel; and performing a convolution operation on input data of the $j^{th}$ convolution layer based on the second windowed convolution kernel to obtain $j^{th}$ output data, wherein:

when j is equal to 1, the input data of the $j^{th}$ convolution layer is a reconstructed subband corresponding to the first subband; or when j is greater than 1 and not greater than M, the input data of the $j^{th}$ convolution layer is output data of a $(j-1)^{th}$ convolution layer; or when j is equal to M, the $j^{th}$ output data comprises the parameter of the cumulative probability distribution function of the to-be-decoded coefficient.

10. The apparatus according to claim 8, wherein the sth subband is not a first subband of the 3N+1 subbands, wherein the entropy decoding model comprises a first entropy decoding model, a second entropy decoding model, and a third entropy decoding model, wherein both the first entropy decoding model and the second entropy decoding model are implemented based on a pixel convolutional neural network, wherein the third entropy decoding model is implemented based on a recurrent neural network (RNN), wherein the first entropy decoding model comprises T1 convolution layers, the second entropy decoding model comprises T2 convolution layers, both T1 and T2 are integers greater than 0, and wherein the inputting the reconstructed subband corresponding to the sth subband into the entropy decoding model to obtain the parameter of the cumulative probability distribution function of the to-be-decoded coefficient through calculation comprises:

inputting a reconstructed subband corresponding to an $(s-1)^{th}$ subband into the third entropy decoding model for calculation, to obtain a first output result, wherein the reconstructed subband corresponding to the $(s-1)^{th}$ subband is obtained by performing entropy decoding on a bitstream of the $(s-1)^{th}$ subband, the first output result is input data of the second entropy decoding model, and the reconstructed subband corresponding to the $s^{th}$ subband is input data of the first entropy decoding model; and wherein:

when both T1 and T2 are equal to 1, performing, based on a convolution layer C1 and a convolution layer C2, a combination operation on the first output result and the reconstructed subband corresponding to the $s^{th}$ subband, to obtain a second output result, wherein the second output result is the parameter of the cumulative probability distribution function of the to-be-decoded coefficient, and the convolution layer C1 and the convolution layer C2 are convolution layers in the first entropy decoding model and the second entropy decoding model respectively; or when T1 is greater than 1 and T2 is equal to 1, performing, based on a convolution layer C1 and a convolution layer C2, a combination operation on the first output result and the reconstructed subband corresponding to the $s^{th}$ subband, to obtain a second output result, wherein the convolution layer C1 is a $q^{th}$ convolution layer in the first entropy decoding model, the convolution layer C2 is a convolution layer in the second entropy decoding model, and if q is equal to T1, the second output result is the parameter of the cumulative probability distribution function of the to-be-decoded coefficient, or if q is greater than 0 and less than T1, the second output result is input data of a $(q+1)^{th}$ convolution layer in the first entropy decoding model; or when both T1 and T2 are greater than 1, performing, based on a convolution layer C1 and a convolution layer C2, a combination operation on the first output result and the reconstructed subband corresponding to the $s^{th}$ subband, to obtain a second output result, wherein the convolution layer C1 is a $q1^{th}$ convolution layer in the first entropy decoding model, the convolution layer C2 is a $q2^{th}$ convolution layer in the second entropy decoding model, and if q1 is equal to T1 and q2 is equal to T2, the second output result is the parameter of the cumulative probability distribution function of the to-be-decoded coefficient, or if q1 is greater than 0 and less than T1 and q2 is greater than 0 and less than T2, the second output result is input data of a $(q1+1)^{th}$ convolution layer in the first entropy decoding model, and an output result of the convolution layer C2 is input data of a $(q2+1)^{th}$ convolution layer in the second entropy decoding model.

11. The apparatus according to claim 10, wherein a resolution of the reconstructed subband corresponding to the $(s-1)^{th}$ subband is different from a resolution of the reconstructed subband corresponding to the $s^{th}$ subband, and wherein the inputting the reconstructed subband corresponding to the $(s-1)^{th}$ subband into the third entropy decoding model for calculation, to obtain the first output result comprises:

performing, based on the third entropy decoding model and a state variable of the third entropy decoding model, a convolution operation on the reconstructed subband corresponding to the $(s-1)^{th}$ subband, to obtain a convolution result;

performing upsampling on the convolution result to obtain the first output result, wherein a resolution of the first output result is the same as the resolution of the reconstructed subband corresponding to the $s^{th}$ subband; and after the performing upsampling on the convolution result to obtain the first output result, performing upsampling on a convolved state variable to obtain a sampled state variable, wherein a resolution of the sampled state variable is the same as the resolution of the $s^{th}$ subband.

12. The apparatus according to claim 10, wherein the performing, based on the convolution layer C1 and the convolution layer C2, the combination operation on the first output result and the reconstructed subband corresponding to the $s^{th}$ subband, to obtain the second output result comprises:

performing a windowing operation on a first convolution kernel based on a first window function to obtain a windowed first convolution kernel, wherein the first convolution kernel is a convolution kernel corresponding to the convolution layer C1;

performing a convolution operation on first input data based on the windowed first convolution kernel to obtain a first convolution result, wherein when the convolution layer C1 is a first convolution layer in the first entropy decoding model, the first input data is the reconstructed subband corresponding to the $s^{th}$ subband, or when the convolution layer C1 is a non-first convolution layer in the first entropy decoding model, the first input data is obtained by performing a convolution operation on the reconstructed subband corresponding to the $s^{th}$ subband;

inputting second input data into the convolution layer C2 and performing a convolution operation to obtain a second convolution result, wherein when the convolution layer C2 is a first convolution layer in the second entropy decoding model, the second input data is the first output result, or when the convolution layer C2 is a non-first convolution layer in the second entropy decoding model, the second input data is obtained by performing a convolution operation on the first output result; and performing an addition or concatenation operation on the first convolution result and the second convolution result to obtain the second output result.

13. The apparatus according to claim 10, wherein the performing, based on the convolution layer C1 and the convolution layer C2, the combination operation on the first output result and the reconstructed subband corresponding to the $s^{th}$ subband, to obtain the second output result comprises:

performing a windowing operation on a first convolution kernel based on a first window function to obtain a windowed first convolution kernel, wherein the first convolution kernel is a convolution kernel corresponding to the convolution layer C1;

performing a windowing operation on a second convolution kernel based on a second window function to obtain a windowed second convolution kernel, wherein the second convolution kernel is a convolution kernel corresponding to the convolution layer C2, and the first window function and the second window function are complementary to each other;

performing a convolution operation on first input data based on the windowed first convolution kernel to obtain a first convolution result, wherein when the convolution layer C1 is a first convolution layer in the first entropy decoding model, the first input data is the reconstructed subband corresponding to the $s^{th}$ subband, or when the convolution layer C1 is a non-first convolution layer in the first entropy decoding model, the first input data is obtained by performing a convolution operation on the reconstructed subband corresponding to the $s^{th}$ subband;

performing a convolution operation on second input data based on the windowed second convolution kernel to obtain a second convolution result, wherein when the convolution layer C2 is a first convolution layer in the second entropy decoding model, the second input data is the first output result, or when the convolution layer C2 is a non-first convolution layer in the second entropy decoding model, the second input data is obtained by performing a convolution operation on the first output result; and performing an addition or concatenation operation on the first convolution result and the second convolution result to obtain the second output result.

14. The apparatus according to claim 8, wherein performing N inverse wavelet transforms on the dequantized wavelet coefficient based on the wavelet transform model to obtain the reconstructed image comprises:

when performing a $t^{th}$ inverse wavelet transform, performing an update operation and a prediction operation on an approximation subband $P_{N+1-t}$ and a detail subband $I_{(N+1-t)1}$ to obtain a first processed subband and a second processed subband, and obtaining an intermediate approximation component based on the first processed subband and the second processed subband, wherein an odd column coefficient or an odd row coefficient of the intermediate approximation component comes from the first processed subband, and an even column coefficient or an even row coefficient of the intermediate approximation component comes from the second processed subband;

performing the update operation and the prediction operation on a detail subband $I_{(N+1-t)2}$ and a detail subband $I_{(N+1-t)3}$ to obtain a third processed subband and a fourth processed subband, and obtain an intermediate detail component based on the third processed subband and the fourth processed subband, wherein an odd column coefficient or an odd row coefficient of the intermediate detail component comes from the third processed subband, and an even column coefficient or an even row coefficient of the intermediate detail component comes from the fourth processed subband; and performing the update operation and the prediction operation on the intermediate detail component and the intermediate approximation component to obtain a fifth processed subband and a sixth processed subband, and obtain an approximation subband $P_{t-1}$ based on the fifth processed subband and the sixth processed subband, wherein an odd row coefficient or an odd column coefficient of the approximation subband $P_{t-1}$ comes from the fifth processed subband, and an even row coefficient or an even column coefficient of the approximation subband $P_{t-1}$ comes from the sixth processed subband, wherein resolutions of the detail subband $I_{(N+1-t)1}$, the detail subband $I_{(N+1-t)2}$, and the detail subband $I_{(N+1-t)3}$ are the same as a resolution of the approximation subband $P_{N+1-t}$, and when the $t^{th}$ inverse wavelet transform is a last wavelet transform, the approximation subband $P_{t-1}$ is the reconstructed image.

15. A non-transitory computer-readable storage medium storing computer instructions, that when executed by one or more processors, cause the one or more processors to:

perform entropy decoding on a compressed bitstream to obtain a reconstructed wavelet coefficient;

dequantize the reconstructed wavelet coefficient to obtain a dequantized wavelet coefficient; and perform N inverse wavelet transforms on the dequantized wavelet coefficient based on a wavelet transform model to obtain a reconstructed image, wherein the wavelet transform model is implemented based on a convolutional neural network (CNN), and N is an integer greater than 0;

wherein the performing entropy decoding on the compressed bitstream to obtain the reconstructed wavelet coefficient comprises:

performing entropy decoding on the compressed bitstream based on an entropy decoding model to obtain the reconstructed wavelet coefficient, wherein the entropy decoding model is implemented based on a deep neural network;

wherein the compressed bitstream comprises bitstreams of 3N+1 subbands, and the reconstructed wavelet coefficient comprises 3N+1 reconstructed subbands; and wherein the performing entropy decoding on the compressed bitstream based on the entropy decoding model to obtain the reconstructed wavelet coefficient comprises:

inputting a reconstructed subband corresponding to an $s^{th}$ subband into the entropy decoding model to obtain a parameter of a cumulative probability distribution function of a to-be-decoded coefficient through calculation, wherein a bitstream of the to-be-decoded coefficient is a part of a bitstream of the $s^{th}$ subband, and the reconstructed subband corresponding to the $s^{th}$ subband is any one of the 3N+1 reconstructed subbands;

obtaining the cumulative probability distribution function of the to-be-decoded coefficient based on the parameter of the cumulative probability distribution function of the to-be-decoded coefficient;

obtaining a probability distribution of the to-be-decoded coefficient based on the to-be-decoded coefficient and the cumulative probability distribution function of the to-be-decoded coefficient; and performing, based on the probability distribution of the to-be-decoded coefficient, entropy decoding on the bitstream of the to-be-decoded coefficient by using an arithmetic decoder, to obtain the to-be-decoded coefficient, wherein the 3N+1 reconstructed subbands comprise the to-be-decoded coefficient.

* * * * *

UNITED STATES PATENT AND TRADEMARK OFFICE

CERTIFICATE OF CORRECTION

PATENT NO. : 12,175,713 B2
APPLICATION NO. : 17/576575
DATED : December 24, 2024
INVENTOR(S) : Wu et al.

It is certified that error appears in the above-identified patent and that said Letters Patent is hereby corrected as shown below:

In the Claims

Claim 3: Column 62, Line 57: "wherein the first entropy decoding model comprises TI" should read as -- wherein the first entropy decoding model comprises T1 --.

Signed and Sealed this
Tenth Day of June, 2025

Coke Morgan Stewart
*Acting Director of the United States Patent and Trademark Office*